(12) United States Patent
Rathod

(10) Patent No.: US 11,334,897 B2
(45) Date of Patent: May 17, 2022

(54) ENABLING TO CREATING, SELECTING AND ASSOCIATING TAGS OR HASHTAGS WITH CONTENTS

(71) Applicant: Yogesh Rathod, Mumbai (IN)

(72) Inventor: Yogesh Rathod, Mumbai (IN)

( * ) Notice: Subject to any disclaimer, the term of this patent is extended or adjusted under 35 U.S.C. 154(b) by 0 days.

(21) Appl. No.: 17/001,874

(22) Filed: Aug. 25, 2020

(65) Prior Publication Data
US 2020/0387914 A1 Dec. 10, 2020

Related U.S. Application Data

(60) Division of application No. 12/954,564, filed on Nov. 24, 2010, now abandoned, which is a continuation of application No. PCT/IB2008/000425, filed on Jul. 4, 2008.

(51) Int. Cl.
*G06Q 30/02* (2012.01)
*G06F 3/048* (2013.01)
*G06F 16/58* (2019.01)

(52) U.S. Cl.
CPC .............. *G06Q 30/02* (2013.01); *G06F 3/048* (2013.01); *G06F 16/58* (2019.01)

(58) Field of Classification Search
None
See application file for complete search history.

(56) References Cited

U.S. PATENT DOCUMENTS

| 8,108,359 | B1 | 1/2012 | Cooley et al. | |
| 2002/0107829 | A1* | 8/2002 | Sigurjonsson | G06F 16/9535 |
| 2006/0048059 | A1 | 3/2006 | Etkin et al. | |
| 2006/0242137 | A1 | 10/2006 | Shah et al. | |
| 2006/0242178 | A1* | 10/2006 | Butterfield | G06F 16/447 |
| 2008/0046458 | A1 | 2/2008 | Tseng et al. | |
| 2008/0082381 | A1* | 4/2008 | Muller | G06Q 10/10 705/344 |
| 2008/0282198 | A1* | 11/2008 | Brooks | G06F 16/9562 715/854 |
| 2009/0150406 | A1 | 6/2009 | Giblin et al. | |
| 2009/0222755 | A1* | 9/2009 | Drieschner | G06F 16/9562 715/776 |

FOREIGN PATENT DOCUMENTS

WO 2007052285 A2 5/2007

OTHER PUBLICATIONS

Belle Be Ih Cooper—The Surprising History of Twitter's Hashtag Origin and 4 Ways to Get the Most out of Them—Source: https://buffer.com/resources/a-concise-history-of-twitter-hashtags-and-how-you-should-use-them-properly.
Jaiku Launches Channels Feature for Topical Messaging—https://mashable.com/2007/06/20/jaiku-launches-channels-feature-for-topical-messaging/.
Chris Messina—Groups for Twitter; or A Proposal for Twitter Tag Channels—https://factoryjoe.com/2007/08/25/groups-for-twitter-or-a-proposal-for-twitter-tag-channels/.
Support for each claim—10 Pages.

* cited by examiner

*Primary Examiner* — Tuan S Nguyen

(57) ABSTRACT

Displaying graphical user interfaces for selecting or preparing one or more types of contents, selecting and associating system and/or user provided readymade tags with contents, publishing or sharing content and tags and viewing said published or shared or received contents and tags comprises displaying tag related or associated contents or displaying contents and associated tags.

17 Claims, 35 Drawing Sheets

FIG. 11

BRANDS SOCIAL NETWORKS (BSN)
WHO USE AND WANT TO USE WHAT, WHERE, WHEN, HOW AND WHY

SEARCH: [_____] ALL BSN (CONTENTS) ▸ / BRANDS NETWORKS / PEOPLE ▾  [SEARCH]  ENGLISH ▸

HOME  BROWSE  SEARCH & MATCH  INVITE — 1100
—1105

| PROFILE | ACCOUNT | PRIVACY | LOGOUT | HELP |

MEMBERS JOINED: 20,00,000
BRAND NETWORKS: 6500
MY BRANDS RESOURCE BOOK  APPLICATIONS

WELCOME YOGESH,
EMAIL: RATHODYOGESHC@GMAIL.COM
PASSWORD: ***********
☐ REMEMBER ME
[LOGIN]  [SIGN UP]
FORGET YOUR PASSWORD?

—1101

| NEW | POPULAR | FEATURED | MY MATCHES |

BROWSE BRANDS SOCIAL NETWORKS (BSN) CATEGORIES BRAND NETWORKS DIRECTORY (JOIN, CONTENTS & ACTIONS):

| ALL | GROCERY | PERSONAL |
| TRAVEL | ELECTRONICS | SPORTS |
| EDUCATION | FOOD | PROFESSIONAL SERVICES |
| FURNITURE | HOTELS | AUTOMOTIVE |
| COMPUTER | ENTERTAINMENT | GIFTS |
| SOFTWARE | HEALTH | GAMES |
| HOME | MEDICINE | BOOKS —1103 |
| BUSINESS | BEAUTY & FASHION | JEWELRY |
| CLOTHS | | MORE... |

BROWSE BRANDS SOCIAL NETWORKS (BSN) POPULAR, GENERAL GROUP WISE AND LOCAL BRANDS NETWORKS DIRECTORY:

| KIDS | LOCATION WISE | AGE WISE | EDUCATION WISE |
| STUDENTS | HOME | SERVICE WISE | CATEGORY WISE —1104 |
| WOMAN | GENERAL | PROFESSION WISE | BUSINESS WISE |
| MAN | DAY TO DAY | HOBBY/INTEREST WISE | CUSTOMER TYPES |
| | | | MORE... |

USE BRANDS SOCIAL NETWORKS (BSN) PRODUCTS AND SERVICES RELATED BRAND NETWORKS TO KNOW....

| WHAT'S NEW & UPDATES | EVERYTHING ABOUT USER USAGE | NEAR FUTURE |
| LOCATION OF AVAILABILITY | DISCOUNTS AND OFFERS | CUSTOMER SPECIFIC SERVICES |
| COMPARISONS | SAMPLES & PROMOTIONS | PREFERENCE MATCHING |
| COMPETITORS | CONTENTS AND INFORMATION | SEARCH |
| MORE ADVANCE | KNOWLEDGE BASE | BEFORE YOU SPEND... |
| USEFUL | CUSTOMER TO CUSTOMER SUPPORT | GUIDANCE & EXPERIENCE |
| FRIEND USERS | HEALTH RELATED | KNOWLEDGE/INFORMATION |
| | | MORE... |

SPONSORS ADVERTISEMENTS

GET STARTED ON BRANDS
SOCIAL NETWORKS (BSN) 4
EASY STEPS:
STEP 1: SIGN UP OR SIGN IN
STEP 2: JOIN OR CREATE
BRAND NETWORKS & INVITE
FRIENDS AND MEMBERS
STEP 3: PUBLISH OR USE
RESOURCES & APPLICATIONS
STEP 4: USE & ACTIONS

SIGN UP FOR BRANDS SOCIAL NETWORKS (BSN)
IT'S FREE AND ANYONE CAN JOIN.
FULL NAME: [_____]
NICK NAME: [_____]
YOUR EMAIL: [_____]
PASSWORD: [_____]
CONFIRM: [_____]
BIRTHDAY: [MONTH ▾] [DAY ▾] [YEAR ▾]
GENDER: ○ FEMALE  ⦿ MALE
COUNTRY: [INDIA ▾]
1106 — STATE: [--PLEASE SELECT-- ▾]
POSTAL CODE: [_____]
SECURITY CHECK
ENTER BOTH WORDS BELOW, SEPARATED BY A SPACE.
CAN'T READ THE WORDS BELOW? TRY DIFFERENT WORDS
[  gents  Con  ]
VERIFICATION: [_____]
BY CLICKING SIGN UP, YOU ARE INDICATING
☐ THAT YOU HAVE READ AND AGREE TO THE
TERMS OF USE AND PRIVACY POLICY
[SIGN UP] —1102

BRANDS SOCIAL NETWORKS (BSN)
INTERNATIONAL:
AUSTRALIA  BRAZIL  CANADA  CHINA  FRANCE  GERMANY  HONG KONG  INDIA  JAPAN  UNITED STATE  UNITED KINGDOM  INTERNATIONAL  LOCAL

ABOUT | ADVERTISERS | PARTNERS | BRAND OWNERS | DEVELOPERS | EXPERTS | PREMIUM SERVICES | FAQ | BLOG | PRESS | JOBS | HELP
COPYRIGHT © 2008 BRANDS SOCIAL NETWORKS (BSN) INC. ALL RIGHTS RESERVED. PRIVACY POLICY | TERMS OF SERVICE | COPYRIGHT/IP POLICY | COMMUNITY GUIDELINES

FIG. 13

BRANDS SOCIAL NETWORKS (BSN) EMAIL@DOMAIN.COM
WHO USE AND WANT TO USE WHAT, WHERE, WHEN, HOW AND WHY

MY SEARCH: [_____]

YOGESH'S HOME [PRIVACY]

PROFILE: [MY NETWORKS AND FRIENDS ▲ / FRIENDS OF FRIENDS / SOME FRIENDS / ONLY FRIENDS / EXCEPT THESE PEOPLE / NONE OF MY NETWORKS / SOME OF MY NETWORKS / CUSTOMIZE... ▼] — 1601

SEARCH: — 1602
CONTROL WHO CAN SEARCH FOR YOU, AND HOW YOU CAN BE CONTACTED.

SEARCH VISIBILITY: [EVERYONE ▲ / MY NETWORKS AND FRIENDS OF FRIENDS / MY NETWORKS AND FRIENDS / FRIENDS OF FRIENDS / ONLY FRIENDS / NONE OF MY NETWORKS / SOME OF MY NETWORKS / CUSTOMIZE ▼] — 1600

BASIC INFO: [MY NETWORKS AND FRIENDS ▼]
PERSONAL INFO: [MY NETWORKS AND FRIENDS ▼]
STATUS UPDATES: [MY NETWORKS AND FRIENDS ▼]
ONLINE STATUS: [MY NETWORKS AND FRIENDS ▼]
FRIENDS: [MY NETWORKS AND FRIENDS ▼]
EDUCATION INFO: [MY NETWORKS AND FRIENDS ▼]
WORK INFO: [MY NETWORKS AND FRIENDS ▼]
IM SCREEN NAME: [ONLY FRIENDS ▼]
MOBILE PHONE: [ONLY FRIENDS ▼]
LAND PHONE: [ONLY FRIENDS ▼]
CURRENT ADDRESS: [ONLY FRIENDS ▼]
WEBSITE: [ONLY FRIENDS ▼]
EMAIL: [ONLY FRIENDS ▼]
BLOCK USERS: [_____]
[BLOCK USERS] — 1608

HOW PEOPLE WHO CAN'T SEE YOUR PROFILE ARE ALLOWED TO CONTACT YOU. — 1604
☐ SEE YOUR PICTURE
☐ SEND YOU A MESSAGE
☐ ADD YOU AS A FRIEND
☐ VIEW YOUR FRIEND LIST

MY NEWS & ACTIONS:
☐ REMOVE PROFILE INFO
☐ COMMENTS ON CONTENTS
☐ ADD A FRIEND — 1605
☐ LEAVE A NETWORK
☐ APPLICATION SPECIFIC...

INBOX: — 1606
[ALL NETWORKS' ALL CONTENTS FROM ALL MEMBERS ▲ / SELECTIVE NETWORKS / SELECTIVE NETWORKS' SELECTIVE FRIENDS\MEMBERS / SELECTIVE NETWORKS' SELECTIVE FRIENDS\MEMBERS' SELECTIVE CONTENTS / NONE / CUSTOMIZE... ▼]

PUBLISH: — 1607
[EVERYONE ▲ / MY NETWORKS AND FRIENDS OF FRIENDS / MY NETWORKS AND FRIENDS\MEMBERS / FRIENDS OF FRIENDS / ONLY FRIENDS / ONLY MEMBERS / NONE OF MY NETWORKS / SOME OF MY NETWORKS / EXCEPT THESE PEOPLE / CUSTOMIZE ▼]

PHOTOS: ☐ ALLOW MY PHOTOS TO BE SHARED, EMAILED & PUBLISHED

TO FIG. 16B

[SAVE CHANGES] [CANCEL]

COPYRIGHT © 2008 BRANDS SOCIAL NETWORKS (BSN) INC. ALL RIGHTS RESERVED. PRIVACY POLICY | TERMS OF SERVICE | COPYRIGHT/IP POLICY

*FIG. 16A*

| MY HOME | BRANDS SOCIAL NETWORKS (BSN) HOME | LOGOUT | HELP

MY BRANDS RESOURCES ▲
MY BRANDS NETWORKS     [SEARCH]  ADVANCE SEARCH
MY FRIENDS/MEMBERS   ▼

APPLICATIONS:
CONTROL WHAT INFORMATION IS AVAILABLE TO APPLICATIONS — 1603
YOU USE ON BRANDS SOCIAL NETWORKS (BSN).

| APPLICATION NAME | LOGIN STATUS | REMOVE |
|---|---|---|
| SURVEY (SETTING) | LOGGED IN (LOGOUT) | ☐ REMOVE |
| E-COMMERCE (SETTING) | LOGGED IN (LOGOUT) | ☐ REMOVE |

APPLICATIONS SPECIFIC SETTINGS:

MY NETWORKS AND FRIENDS ▲
FRIENDS OF FRIENDS
SOME FRIENDS
ONLY FRIENDS
EXCEPT THESE PEOPLE
NONE OF MY NETWORKS
SOME OF MY NETWORKS
CUSTOMIZE... ▼

☐ ALLOW THIS APPLICATION TO CONTACT ME VIA EMAIL.
☐ PUBLISH APPLICATION RELATED STORIES

[BLOCK APPLICATIONS]
[IGNORE APPLICATIONS INVITATIONS]

1610

BRAND NETWORKS:
SELECT BRAND NETWORK: [MY BRAND NETWORK (PRIVATE) ▼]

EVERYONE (ALL FRIENDS AND MEMBERS) ▲
ONLY FRIENDS
ONLY MEMBERS
FRIENDS OF FRIENDS
EXCEPT THESE PEOPLE
CUSTOMIZE (SOME OF MY FRIENDS - SELECT FROM LIST OF FRIENDS) ▼

1609

BRANDS GROUP LISTS (SHARING TO AND SUBSCRIPTIONS FROM):
SELECT BRANDS GROUP LISTS: [MY PERSONAL BRANDS GROUP LIST ▼]

EVERYONE (PUBLIC) ▲
MY NETWORKS AND FRIENDS OF FRIENDS
MY NETWORKS AND FRIENDS\MEMBERS
FRIENDS OF FRIENDS
ONLY FRIENDS
ONLY MEMBERS
NONE OF MY NETWORKS
SOME OF MY NETWORKS
EXCEPT THESE PEOPLE
CUSTOMIZE ▼

1611

| COMMUNITY GUIDELINES

FROM FIG. 16A

*FIG. 16B*

EMAIL@DOMAIN.COM | MY HOME | BRANDS SOCIAL NETWORKS (BSN) HOME | LOGOUT | HELP

MY BRANDS RESOURCES
MY BRANDS NETWORKS   [SEARCH]  ADVANCE SEARCH
MY FRIENDS/MEMBERS

FROM FIG. 17A

| INBOX (NEW) (CONTRIBUTED BY MEMBERS) | PUBLISH (NEW) (BY ADMINS) | INVITE REQUEST TO MEMBERS | INVITE REQUEST ACCEPT BY MEMBERS | ADMIN AND NETWORK STATUS | ATTACHED APPLICATIONS AND SERVICES |
|---|---|---|---|---|---|
| 20 | 12 | 1000 | 120 | YOGESH (PUBLISHED) | PHOTOS AND SLIDE<br>FREE POST<br>TOP CONTRIBUTORS<br>GROUPS<br>EVENTS<br>SHOPPING<br>ANSWER<br>SURVEY<br>CONTESTS<br>POLL<br>BLOGS AND ARTICLES<br>VIDEOS |
| 10 | 55 | 150 | 50 | YOGESH (PUBLISHED) | PHOTOS AND SLIDE<br>FREE POST<br>TOP CONTRIBUTORS<br>GROUPS<br>EVENTS<br>SHOPPING<br>ANSWER<br>BLOGS AND ARTICLES<br>VIDEOS |
| 40 | 80 | 350 | 80 | YOGESH (PUBLISHED) | PHOTOS AND SLIDE<br>FREE POST<br>TOP CONTRIBUTORS<br>GROUPS<br>EVENTS<br>SHOPPING<br>ANSWER<br>BLOGS AND ARTICLES<br>VIDEOS |

—1702

| COPYRIGHT/IP POLICY | COMMUNITY GUIDELINES

*FIG. 17B*

BRANDS SOCIAL NETWORKS (BSN)

JDOE@EMAIN.COM | MY HOME | BRANDS SOCIAL NETWORKS (BSN) HOME | LOGOUT | HELP

WHO USE AND WANT TO USE WHAT, WHERE, WHEN, HOW AND WHY  MY SEARCH: [____]  [SEARCH] ADVANCE SEARCH

MY BRANDS RESOURCES
MY BRANDS NETWORKS
MY FRIENDS/MEMBERS

JOHN DOE'S [BRAND NETWORKS MANAGEMENT -> BROWSE MY ALL NETWORKS] — 1902

| | NAME OF BRAND NETWORK (CATEGORY) | TYPE OF BRAND NETWORK | CREATED DATE | NO. OF MEMBERS (DEMO-GRAPHY, CATEGORY WISE) | NO. OF HITS & VISITES (DAILY, MONTHLY, PAGE VIEWS) | TOTAL NO. OF RESOURCES | INBOX (NEW) | PUBLISH (ALL) | JOINED MY FRIENDS | MEMBERS INVITED |
|---|---|---|---|---|---|---|---|---|---|---|
| MY ALL BRAND NETWORKS | | | | | | | | | | |
| CREATE NEW BRAND NETWORK | XYZ (FASHION & CLOTHS) | PUBLIC (CREATE BY ME) | 18/04/2008 | 20,000 | 2,00,000 | TOTAL: 2,00,000 STRUCTURED: 1,00,000 -TEXT: 85,000 -VIDEO: 500 -PHOTOS: 5,500 -FILES: 9,000 UNSTRUCTURED: 50,000 APPS. RELATED: 50,000 MORE DETAILS... | 20 | 12 | 100 | 400 |
| EDIT MY BRAND NETWORKS | | | | | | | | | | |
| JOIN EXISTING BRAND NETWORKS | | | | DETAILS... | DETAILS... | | | | | |
| BRANDS NETWORKS GROUP LISTS GENERATOR | XYZ (FASHION & CLOTHS) | PRIVATE (MY) | 20/04/2008 | 380 | 800 | TOTAL: 8,00 STRUCTURED: 3,00 -TEXT: 1,50 -VIDEO: 10 -PHOTOS: 50 -FILES: 90 UNSTRUCTURED: 2,50 APPS. RELATED: 1,50 MORE DETAILS... | 10 | 55 | 50 | 150 |
| BRAND LISTS MANAGEMENT -SHARED BRANDS LISTS -CUSTOM BRANDS LISTS -CROSS BRANDS LISTS -FEDERATED BRANDS LISTS | | | | DETAILS... | DETAILS... | | | | | |
| BRANDS NETWORKS/ MEMBERS & MY FRIENDS MANAGEMENT — 1901 | XYZ (COMPUTER) | PUBLIC CREATED BY FRIEND | 10/03/2008 | 80,000 | 6,00,000 | TOTAL: 40,000 DETAILS... | 40 | 80 | 35 | 80 |
| | XYZ (LAPTOP) | PRIVATE (MY FRIEND'S) | 12/04/2008 | 450 | 950 | TOTAL: 1,500 DETAILS... | 10 | 85 | 78 | 20 |
| | XYZ AIRLINE (TRAVEL) | PRIVATE (CREATED BY EXPERD) | 17/02/2008 | 25,000 | 80,000 | TOTAL: 1,20 DETAILS... | 5 | 5 | 15 | - |
| | ABC MOBILE (COMMUNICATION) | PUBLIC (BRAND OWNER) | 10/04/2008 | 48,000 | 1,20,000 | TOTAL: 7,800 DETAILS... | 5 | - | - | - |

1900

COPYRIGHT © 2008 BRANDS SOCIAL NETWORKS (BSN) INC. ALL RIGHTS RESERVED. PRIVACY POLICY | TERMS OF SERVICE | COPYRIGHT/IP POLICY | COMMUNITY GUIDELINES

BRANDS SOCIAL NETWORKS (BSN)    JDOE@EMAIL.COM | MY HOME | BRANDS SOCIAL NETWORKS (BSN) HOME | LOGOUT | HELP

WHO USE AND WANT TO USE WHAT, WHERE, WHEN, HOW AND WHY    MY SEARCH: [        ] [SEARCH] ADVANCE SEARCH
                                                                              MY BRANDS RESOURCES
                                                                              MY BRAND NETWORKS
                                                                              MY FRIENDS/MEMBERS

JOHN DOE'S [ ALL BRANDS RESOURCE BOOK - > COMPOSE BRAND]

COMPOSE BRAND
BRAND INBOX (90)          PUBLICATION TITLE: [                    ]
BRAND PUBLISH BOX (520)   PUBLISH TO: [<SELECT BRAND NETWORK>]  [CREATE NEW BRAND NETWORK]  [JOIN NEW BRAND NETWORK]
BRAND DRAFTS (20)         COMPOSITON TYPE: [STRUCTURED RESOURCE]                VIEW SELECTED BRAND NETWORK'S DETAILS...
ALL BRAND (JOURNAL)                        [FREE FORM RESOURCE]
MESSAGE                                    [APPLICATIONS]
MANAGEMENT (12)           RESOURCE TYPE: [TEXT]    STRUCTURED TAGS: [<READYMADE>]   [<USER CREATED>]
 -MESSAGE INBOX                          [VIDEO]                    [REVIEW]       [PRICE]
 -SENT MESSAGE                           [AUDIO]                    [COMPARE]      [AVAILABILITY]
 -NOTIFICATIONS                          [PHOTOS]                   [FEATURES]     [SUGGESTION]
 -ALL UPDATES                            [FILES]                    [ALTERNATIVE]  [RECIPE]
 -COMPOSE MESSAGES                       [OTHER]                    [ADVANCE]      [CREATE NEW TAGS]
TRASH                                                                            APPLICATIONS:
SPAM                     COMPOSE BRAND EDITOR:                                   [BLOG]
ARCHIVE                  [                                    ]                 [ARTICLE/STORY/WIKI]
SEARCH BOX                                                                       [VIDEO/SLIDE SHOW]
CONTACTS BOOK                                                                    [POD CASTING]
HISTORY                  [ADD ANOTHER RESOURCE]                                  [NEWS]
BOOKMARK                 COLLABORATION SETTINGS: ☑ PUBLISH FOR COLLABORATIVE COMPOSITION (EDITING ALLOWED)  [MORE...]
                         PRIVACY SETTINGS: [PUBLIC]
                                           [PRIVATE (MY NETWORK ONLY)]
                                           [SELECTIVE CONTACT ONLY]
                         SECURITY CHECK
                         ENTER BOTH WORDS BELOW, SEPARATED BY A SPACE. CAN'T READ THE WORDS BELOW? TRY DIFFERENT WORDS
                                                           [AGENTS    CON]
                                           VERIFICATION: [AGENTS CON]
                         ☑ BY CLICKING PUBLISH YOU ARE INDICATING THAT YOU HAVE READ AND
                           AGREE TO THE COPYRIGHT/IP POLICY, TERMS OF USE AND PRIVACY POLICY.
                         [PUBLISH]  [SAVE & PREVIEW]  [SAVE AS DRAFT]  [DISCARD]

SPONSORS
ADVERTISEMENTS 2501
2502
2500

COPYRIGHT © 2008 BRANDS SOCIAL NETWORKS (BSN) INC. ALL RIGHTS RESERVED. PRIVACY POLICY | TERMS OF SERVICE | COPYRIGHT/IP POLICY | COMMUNITY GUIDELINES

FIG. 26A

BRANDS SOCIAL NETWORKS (BSN)  JDOE@EMAIL.COM | HOME | BRAND SOCIAL NETWORKS (BSN HOME) | LOGOUT | HELP
WHO USE AND WANT TO USE WHAT, WHERE, WHEN, HOW AND WHY
MY SEARCH: [ ] — 2601
MY BRANDS RESOURCES
MY BRANDS NETWORKS     [SEARCH] [ADVANCE SEARCH]
MY FRIENDS/MEMBERS

JOHN DOE'S [ ALL BRANDS RESOURCE BOOK -> BRAND PUBLISHBOX ]

| | NAME OF BRAND NETWORK & CATEGORY | TYPE OF BRAND NETWORK | RESOURCE PUBLISH DATE | RESOURCE AUTHOR | RESOURCE TYPE | RESOURCES | DETAILS |
|---|---|---|---|---|---|---|---|
| COMPOSE BRAND | | | | | | | |
| BRAND INBOX (90) | ☐ XYZ CLOTHING (FASHION & CLOTHES) | PUBLIC (CREATED BY ME) | 18/04/2008 | JDOE | STRUCTURED | -TEXT: COMPARISON RANGE<br>-VIDEO: FASHION SHOW 1<br>-VIDEO: FASHION SHOW 2<br>-PHOTOS (20)<br>-FILES (2) | NETWORK HITS: 2,00,000<br>MEMBER: 20,000<br>SUBSCRIBERS: 120<br>AUTHOR RANK/LEVEL: 3<br>CONTENT TOTAL POINTS: 3 |
| --- PUBLIC (75)<br>--- MY (20)<br>--- JOINED (45) | | | | | | | |
| BRAND PUBLISH (520) | ☐ XYZ CLOTHING (FASHION & CLOTHES) | PRIVATE (MY) | 20/04/2008 | XYZ | UNSTRUCTURED | MY XYZ CLOTHING EXPERIENCE... | NETWORK HITS: 3,80<br>MEMBER: 8,00<br>SUBSCRIBERS: 75<br>AUTHOR RANK/LEVEL: 1<br>CONTENT TOTAL POINTS: 25 |
| BRAND DRAFTS (20) | | | | | | | |
| --- PRIVATE (25)<br>--- MY (10)<br>--- JOINED (15) | | | | | | | |
| ALL BRAND (JOURNAL) | ☐ ABC COMPUTER (COMPUTER) | PUBLIC (CREATED BY FRIEND) | 10/03/2008 | JANE | UNSTRUCTURED | ABC COMPUTER FRIENDS DETAILS -MY VIEW POINT.. | NETWORK HITS: 80,000<br>MEMBER: 6,00,000<br>SUBSCRIBERS: 120<br>AUTHOR RANK/LEVEL: 4<br>CONTENT TOTAL POINTS: 70 |
| MESSAGE MANAGEMENT (12) | | | | | | | |
| --- GROUP LISTS | | | | | | | |
| -MESSAGE INBOX<br>-SENT MESSAGE<br>-NOTIFICATIONS<br>-ALL UPDATES<br>-COMPOSE MESSAGE | ☐ ABC COMPUTER (LAPTOP) (COMPUTER) | PRIVATE (MY FRIEND'S) | 12/04/2008 | JANE | STRUCTURED | -TEXT: COMPARISON, FEATURES, DISCOUNT<br>-VIDEO: PRESENTATION<br>-PHOTOS (8) | NETWORK HITS: 4,50<br>MEMBER: 9,50<br>SUBSCRIBERS: 52<br>AUTHOR RANK/LEVEL: 4<br>CONTENT TOTAL POINTS: 55 |
| COMMENTS<br>RANK/POINTS — 2604<br>REPORT ABUSE<br>BLOCK USER<br>SORTING<br>APPLICATIONS<br>SUBSCRIPTIONS | | | | | | | |
| TRASH<br>SPAM<br>ARCHIVE<br>SEARCH BOX<br>CONTACTS BOOK<br>HISTORY<br>BOOKMARKS<br>2602 | ☐ XYZ AIRLINE (TRAVEL) | PRIVATE (CREATED BY EXPERT) | 17/02/2008 | MARY | APPLICATION | POLL: TODAY'S POLL<br>SURVEY: CUSTOMER SERVICE<br>BLOG: COMPARATIVE ANALYSIS<br>ARTICLE: QUALITY OF SERVICE<br>CONTEST: WIN A CAR<br>YOUR ANSWER: YES YOU<br>DISCOUNT ON AIR TICKETS IF... | NETWORK HITS: 25,000<br>MEMBER: 80,000<br>SUBSCRIBERS: 26<br>AUTHOR RANK/LEVEL: 5<br>CONTENT TOTAL POINTS: 115 |
| OPEN<br>PRINT — 2603<br>REPLAY<br>FORWARD<br>CATEGORIES<br>SEARCH/FIND<br>JUNK<br>DELETE<br>MOVE | | | | | | | |

TO 26B →

| | | | | |
|---|---|---|---|---|
| ☐ ABC MOBILE (COMMUNICATION) | PUBLIC (BRAND OWNER) | 18/04/2008 | BILL | APPLICATION | E-COMMERCE: BUY ONLINE MARKETPLACE: SALE 2ND HAND MICRO SITE: DETAILS, VIDEO... | NETWORK HITS: 48,000 MEMBER: 1,20,000 SUBSCRIBERS: 32 AUTHOR RANK/LEVEL: 3 CONTENT TOTAL POINTS: 185 |
| ☐ ABC MOBILE (COMMUNICATION) | PUBLIC (BRAND OWNER) | 21/04/2008 | BILL (SUPPORT) | APPLICATION | SUPPORT SERVICE ANSWER VOIP/CHAT/MESSENGER | NETWORK HITS: 48,000 MEMBER: 1,20,000 SUBSCRIBERS: 20 AUTHOR RANK/LEVEL: 3 CONTENT TOTAL POINTS: 325 |
| ☐ HOTEL XYZ (HOTELS) | PUBLIC (BRAND OWNER) | 22/04/2008 | JOHN (MARKETING) | STRUCTURED | -TEXT: COMPARISON, RANGE -VIDEO: HOTEL XYZ -PHOTOS (30) -FILES: FORMS (2) | NETWORK HITS: 9,000 MEMBER: 90,000 SUBSCRIBERS: 40 AUTHOR RANK/LEVEL: 3 CONTENT TOTAL POINTS: 220 |

FROM 26A →

2600

PRIVACY POLICY    TERMS OF SERVICE    COPYRIGHT/IP POLICY    COMMUNITY GUIDELINES

BRANDS SOCIAL NETWORKS (BSN)　　　　　JDOE@EMAIL.COM | HOME | BRAND SOCIAL NETWORKS (BSN HOME) | LOGOUT | HELP
WHO USE AND WANT TO USE WHAT, WHERE, WHEN, HOW AND WHY

MY BRANDS RESOURCES ◁
MY BRANDS NETWORKS ▷   [SEARCH]   ADVANCE SEARCH
2702 —     MY SEARCH: [          ]     MY FRIENDS/MEMBERS

JOHN DOE'S [ ALL BRANDS RESOURCE BOOK -> BRAND PUBLISHBOX ]    2701

| | NAME OF BRAND NETWORK & CATEGORY | TYPE OF BRAND NETWORK | RESOURCE PUBLISH DATE | RESOURCE TYPE | RESOURCES | DETAILS |
|---|---|---|---|---|---|---|
| COMPOSE BRAND | | | | | | |
| BRAND INBOX (90) | | | | | | |
| — PUBLISHBOX (520) | | | | | | |
|   ⊟ PUBLIC (350) | | | | | | |
|     — MY (80) | ☐ XYZ CLOTHING (FASHION & CLOTHES) | PUBLIC (CREATED BY ME) | 18/04/2008 | STRUCTURED | -TEXT: COMPARISON RANGE -VIDEO: FASHION SHOW 1 -VIDEO: FASHION SHOW 2 -PHOTOS (20) -FILES (2) | MY READERS: 120 MY PUBLICATION HITS/VISITS: 450 MY PUBLICATION TOTAL POINTS: 85 TOTAL PARTICIPANTS: 55 TOTAL ACTIONS: 220  MORE... |
|     — JOINED (270) | | | | | | |
|   ⊟ PRIVATE (170) | | | | | | |
|     — MY (80) | ☐ XYZ CLOTHING (FASHION & CLOTHES) | PRIVATE (MY) | 20/04/2008 | UNSTRUCTURED | MY XYZ CLOTHING EXPERIENCE... | MY READERS: 20 MY PUBLICATION HITS/VISITS: 200 MY PUBLICATION TOTAL POINTS: 15 TOTAL PARTICIPANTS: 10 TOTAL ACTIONS: 35  MORE... |
|     — JOINED (90) | | | | | | |
| ALL BRAND (JOURNAL) — ALL NETWORKS | | | | | | |
| MESSAGE MANAGEMENT (12) | | | | | | |
| -MESSAGE INBOX | | | | | | |
| -SENT MESSAGE | | | | | | |
| -NOTIFICATIONS | REPORT ABUSE   2703 | | | | | |
| -ALL UPDATES | BLOCK USER | ☐ ABC COMPUTER (COMPUTER) | PRIVATE (MY FRIEND'S) | 10/03/2008 | UNSTRUCTURED | ABC COMPUTER FRIENDS REVIEWS | MY READERS: 120 MY PUBLICATION HITS/VISITS: 340 MY PUBLICATION TOTAL POINTS: 25 TOTAL PARTICIPANTS: 22 TOTAL ACTIONS: 56  MORE... |
| -COMPOSE MESSAGE | SORTING | | | | | |
| | READERS STATISTICS | | | | | |
| TRASH | ACTIONS ANALYSIS | ☐ ABC COMPUTER (LAPTOP) (COMPUTER) | PRIVATE (MY FRIEND'S) | 12/04/2008 | STRUCTURED | -TEXT: COMPARISON, FEATURES, DISCOUNT -VIDEO: PRESENTATION -PHOTOS (8) | MY READERS: 212 MY PUBLICATION HITS/VISITS: 670 MY PUBLICATION TOTAL POINTS: 35 TOTAL PARTICIPANTS: 40 TOTAL ACTIONS: 120  MORE... |
| SPAM | PUBLICATION PRIVACY | | | | | |
| ARCHIVE | | | | | | |
| SEARCH BOX | OPEN   2704 | | | | | |
| CONTACTS BOOK | PRINT | | | | | |
| HISTORY | FORWARD | ☐ XYZ AIRLINE (TRAVEL) | PRIVATE (CREATED BY EXPERT) | 17/02/2008 | APPLICATION | POLL: MY TODAY'S POLL SURVEY: MY SURVEY BLOG: MY SUGGESTION ARTICLE: COMPARE AIRLINES SERVICE MY ANSWER SERVICE | MY READERS: 80 MY PUBLICATION HITS/VISITS: 125 MY PUBLICATION TOTAL POINTS: 30 TOTAL PARTICIPANTS: 38 TOTAL ACTIONS: 24  MORE... |
| BOOKMARKS | CATEGORIES | | | | | |
|    2705 | SEARCH/FIND | | | | | |
| | DELETE | ☐ ABC MOBILE (COMMUNICATION) | PUBLIC (BRAND OWNER) | 18/04/2008 | APPLICATION | MARKETPLACE: SALE 2ND HAND | MY READERS: 20 MY PUBLICATION HITS/VISITS: 105 MY PUBLICATION TOTAL POINTS: 20 TOTAL PARTICIPANTS: 15 TOTAL ACTIONS: 20  MORE... |
| | MOVE | | | | | |

2700

PRIVACY POLICY　TERMS OF SERVICE　COPYRIGHT/IP　POLICY　COMMUNITY GUIDELINES

BRANDS SOCIAL NETWORKS (BSN)
WHO USE AND WANT TO USE WHAT, WHERE, WHEN, HOW AND WHY
SEARCH: [____] ALL BSN (CONTENTS) ◁▷ [SEARCH]  2900  [ENGLISH ▷]  ACCOUNT PRIVACY LOGOUT HELP
BRAND NETWORKS                                              MEMBERS JOINED: 20,00,0000
PEOPLE                                                      BRAND NETWORKS: 65000

HOME BROWSE SEARCH & MATCH INVITE MY BRANDS RESOURCE BOOK APPLICATIONS

2901

| NAME OF BRAND NETWORK | BRAND NETWORK CATEGORY | TYPE OF BRAND NETWORK | LOCATION | CREATED DATE | NO. OF MEMBERS (DEMOGRAPHY, CATEGORY WISE) | NO. OF HITS & VISITS (DAILY, MONTHLY, PAGE VIEWS) | TOTAL NO. OF RESOURCES |
|---|---|---|---|---|---|---|---|
| XYZ CLOTHING | (FASHION & CLOTHES) | PUBLIC (CREATED BY ME) | USA | 18/04/2008 | 20,000 DETAILS... | 2,00,000 | TOTAL: 2,00,000 STRUCTURED: 1,00,000 -TEXT: 85,000 -VIDEO: 5,00 -PHOTOS: 5,500 -FILES: 9,000 UNSTRUCTURED: 50,000 APPS RELATED: 50,000 MORE DETAILS... |
| XYZ CLOTHING | (FASHION & CLOTHES) | PRIVATE (MY) | USA | 20/04/2008 | 380 DETAILS... | 800 DETAILS... | TOTAL: 8,00 STRUCTURED: 3,00 -TEXT: 1,50 -VIDEO: 10 -PHOTOS: 50 -FILES: 90 UNSTRUCTURED: 2,50 APPS RELATED: 1,50 MORE DETAILS... |
| ABC COMPUTER | (COMPUTER) | PUBLIC (CREATED BY FRIEND) | USA | 10/03/2008 | 80,000 | 6,00,000 | TOTAL: 40,000 DETAILS... |
| XYZ AIRLINE | (TRAVEL) | PRIVATE (CREATED BY EXPERT) | INDIA | 17/02/2008 | 25,000 | 80,000 | TOTAL: 1,20 DETAILS... |
| ABC MOBILE | (COMMUNICATION) | PUBLIC (BRAND OWNER) | INDIA | 10/04/2008 | 48,000 | 1,20,000 | TOTAL: 7,800 DETAILS... |

1 2 3 4 5 NEXT ▷

SET BROWSE CRITERIA:
BRAND NETWORK TYPE:
⦿ FULL NETWORKS ○ FRIENDS NETWORKS
   (PUBLIC)              (PRIVATE)
BRAND CATEGORY: [____▷]
BRAND LOCATION:
COUNTRY: INDIA [▷]
STATE: -PLEASE SELECT- [▷]
CITY: -PLEASE SELECT- [▷]
SORT RESULTS BY:
○ RECENTLY UPDATED ○ LAST LOGIN
○ NEW TO BSN       ○ CATEGORY WISE
○ POPULAR(HITS/VISITS) ○ CREATED
                        ○ LOCATION
RESULTS PER PAGE: [30 ▷]  2902
              [UPDATE]

CONTENTS:
FRIENDS/
MEMBERS:           COMMENTS
SENT EMAIL         RANK/RATING
ADD TO FRIENDS     BOOKMARK
ADD TO FAVORITE    PARTICIPATE
INVITE                       2904
BRAND       2903
NETWORKS:       2905
JOIN
RANK/RATING
FAVORITE

PRIVACY POLICY | TERMS OF SERVICE | COPYRIGHT/IP POLICY | COMMUNITY GUIDELINES

ENABLING TO CREATING, SELECTING AND ASSOCIATING TAGS OR HASHTAGS WITH CONTENTS

FIELD OF INVENTION

The present invention relates generally to a user interface for preparing one or more types of contents and selecting and associating tags with said prepared contents. User can publish said contents with tags and can view tag associated contents, contents and associated tags and tag specific contents published by users of network.

BACKGROUND OF THE INVENTION

The present invention generally relates to a novel Internet-based method of and system for managing portfolio of user's brands and user or brand owner created brand networks and marketing branded products and services thereto. The present invention relates to a web-based information sharing system; and more particularly, to a computer interface enabling companies and consumers to share brand information, knowledge and offer services like sales, e-commerce, marketing and promoting brands over the World Wide Web. BSN platform facilitates B2B, B2C, C2B and C2C sales, marketing, promotions and e-commerce transactions.

Brands or trademarks serve as identifiers of products and services, and serve to distinguish a products and services of one source provider from another. The owner of a brand uses it to ensure that customers recognize the source of products and that it is an indication of a consistent level of the product's quality. Consumers can rely on a given brand to indicate the nature and quality to which the consumer has become accustomed. In recent years consumer choices among branded good have expanded enormously. It is well recognized that branded goods and services are of significant and increasing importance in trading in the growing global economy.

Brands were originally developed as labels of ownership: name, term, design, and symbol. However, today it is what they do for people that matters much more, how they reflect and engage them, how they define their aspiration and enable them to do more. Powerful brands can drive success in competitive and financial markets, and indeed become the organization's most valuable assets.

A trademark or trade mark or service mark (represented by the Symbol™) or mark is a distinctive sign or indicator of some kind which is used by an individual, business organization or other legal entity to identify uniquely the source of its products and/or services to consumers, and to distinguish its products or services from those of other entities. A trademark is a type of intellectual property, and typically a name, word, phrase, logo, symbol, design, image, or a combination of these elements. There is also a range of non-conventional trademarks comprising marks which do not fall into these standard categories.

Terms such as "mark", "brand" and "logo" are sometimes used interchangeably with "trademark". However, the terms "brands" and "branding" raise distinct conceptual issues and are generally more appropriate for use in marketing or advertising context.

The Internet has become a new medium for finding and/or displaying information of all types, including information about products, services, and locations. The most common process through which information on the Internet (collectively referred to as "Content") is discovered is using Internet Search Engines ("Search Engines"). Content includes but is not limited to all information, communications, media, leaders, websites, images, tags, meta tags, domain names, applications, and the like, whether displayed on or through the Internet or through other methods and media. Search Engines are typically operated by major Internet companies ("Search Companies") that specialize or provide internet search ("Internet Search" or "Search") as all or a portion of their content and value to internet users, such as Google, Yahoo, and MSN. Search Companies operate Search Engines in order to present Internet users ("Internet Users") relevant information ("Search Results") on search engine results pages and other Internet pages.

Internet Search has created several new industries described below, yet it is still in its infancy, and, for a variety of reasons, Internet Search is arguably less effective today than it was a few years ago. As discussed in more detail below, Search Companies face many new and daunting challenges trying to ensure that their Search Engines provide Internet Users relevant and compelling Search Results. These challenges include: a) the prolific, exponential growth in both the depth and breadth of Content, b) the rapid pace of changing Content, c) the difficulty of interpreting (or parsing) search requests ("Search Requests") by a variety of Internet Users, d) the depth, breadth and dynamic nature of terms, keywords, phrases, and/or other search terms ("Search Terms") used in Search Requests, e) the need to develop and maintain a taxonomy of Search Terms, and g) the increase in the number and complexity of Content pages that are generated dynamically instead of containing static, and more easily crawlable and/or indexable Content. All of these challenges are associated with providing relevant and optimized Search. One of the increasingly popular types of Internet Searches are local Internet searches ("Local Searches") that are focused on finding local stores, products, and/or information near a specific location, usually near the Internet User conducting the Search. In most cases, these types of Internet Users are seeking information about where to buy products and services at stores near where the Internet Users are or are going to be. Location adds a new element to Internet Searches, and Search Companies are just now focusing on the unique nature and challenges of Local Searches.

Presently, an enormous amount of time, money and effort are expended daily by thousands of manufacturers and retailers to market, brand, advertise and sell their products and services to consumers in both regional and global markets. Billions of dollars are spent each year by manufacturer brands to inform, influence, and persuade consumers to buy and consume their branded products and services.

To create demand for their products and services, Client/brands enlist advertising and marketing agencies to achieve greater leverage and capacity to reach and influence empowered consumers to buy their products and consume their services.

While the potential for marketing efficacy is highest at the retail point-of-sale, manufacturer brands typically have little or no control over the consumer experience with their branded products, and this aspect of brand control resides with the online retailer. And as consumers turn to their favorite retail websites to find product information, promotions, and ultimately to purchase products, the opportunity for brands to truly engage consumers at the online retail point of sale is neither available or possible, unless the manufacturer brand controls and operates its own e-commerce enabled retail site.

To make online marketing even more difficult for client/brands and their agencies, most online retailers avoid the use of push-type marketing technologies such as pop-up and banner advertisements on their e-commerce sites, as these marketing technologies are general. They are annoying to consumers, and fail to deliver relevant messaging to the consumer considering a product purchase.

With the growing ineffectiveness of traditional marketing mediums and the unrealized potential of online retail point of sale, a great need has arisen in the global marketplace for a better way of, and means for enabling manufacturer client/brands and their marketing agencies to more effectively and efficiently reach, serve and influence empowered consumers at online points of purchase consideration and sale, so as to provide consumers with improved service and better brand experiences at the online point of sale, while helping online retailers build their own brands, reduce online store overhead, and drive sales, while avoiding the shortcomings and drawbacks of prior art systems and methodologies.

Since the development of the WWW and its enabling information file formats and communication protocols, a number of Internet-based advertising systems and networks have been developed and deployed in the world of consumer product and service advertising and promotion. Examples of commercially-available Internet-based advertising and promotion systems include: (http://www.realmedia.com); the DoubleClick"Internet Advertising Sales, Advertising—Management And Media Services Network by DoubleClick, Inc. (http://www.doubleclick.com) which employ its proprietary DART'technology for collecting and analyzing audience behavior, predicting which ads will be most effective, measures ad effectiveness, and providing data for Web publishers and advertisers; the Adfusion'"Integrated Advertising Marketing, Sales and Management System by Adfusion, Inc. (http://www.adfusion.com) which integrates all phases of the media buying process including media research and planning, media inventory and yield management, secure online negotiation, the transaction execution, and tracking and post-campaign reporting; and the Promotions. On-Line Promotion System by Promotions.com, Inc. (http://www.promotions.com) formerly Webstakes.com, which develops customized online promotions for clients providing technology and consulting services necessary to run the promotions on clients' own Web sites, and offering direct marketing e-mail services using a database of customer profiles.

Consumers are now ready for an online environment in which they can creatively express and communicate their feelings about products as members of a virtual community.

The manufacturer, distributor, and/or producer (hereinafter, the "promoter") of products or services, particularly consumer products or services, generally seeks to have its products available to the consumer in as many purchasing environments as possible at a competitive price.

A brand community is a community formed on the basis of attachment to a product. Recent developments in marketing and in research in consumer behavior result in stressing the connection between brand, individual identity and culture. Among the concepts developed to explain the behavior of consumers, the concept of a brand community focuses on the connections between consumers. A brand community can be defined as an enduring self-selected group of actors sharing a system of values, standards and representations (a culture) and recognizing bonds of membership with each other and with the whole. It is a specialized, non-geographically bound community, based on a structured set of social relations among admirers of a brand. Brand communities are characterized in shared consciousness, rituals and traditions, and a sense of moral responsibility. "Brand community" is the term used to describe like-minded consumers who identify with a particular brand and share significant traits, which describe as "shared consciousness, rituals, traditions, and a sense of moral responsibility." The researchers show that consumers may organize into these communities to share their experiences of a brand. Conversely, consumers in an identifiable brand community represent a cohesive group that reflects the brand's values. A brand community model for marketing includes prospects considering a brand choice, non-committals who choose out of convenience or habit with no real preference, brand admirers who truly prefer a brand, and brand enthusiasts who both prefer and refer. In a world where advertising is losing credibility, consumers are looking for other sources of trust—communities provide an answer. Friendship is one of the strongest bonds of trust. We trust our friends' recommendations, advice and experience. Think about the last movie you saw, restaurant you ate at or book that you read. Chances are a friend recommended them, and you may very likely recommend them to another. The future of those brands that take their market seriously and question the influence of traditional above-the-line advertising, will be considering establishing a brand community where word-of-mouth will do the talking. These personal testimonials will guarantee the results, and media money will be spent on people rather than on creating ads and commercials. When managed properly, brand communities could prove to be that elusive new tool to tackle the ever growing competition. Brand communities not only allow companies to collaborate with customers in all phases of value creation—product design, pricing, places of availability, and phases of promotion—but also provide companies an effective platform on which to engage customers and create loyalty towards the brand. Some of these qualities are shared vision and mission with customers, A platform for customer partnership, A platform for brand community, An emerging brand value network, Openness and accessibility, 1:1 customer relationships, Active customer participation.

Direct marketing is a sub-discipline and type of marketing. It attempts to send its messages directly to consumers, without the use of intervening media. This involves commercial communication (direct mail, e-mail, and telemarketing) with consumers or businesses, usually unsolicited and is focused on driving purchases that can be attributed to a specific "call-to-action." This aspect of direct marketing involves an emphasis on trackable, measurable positive (but not negative) responses from consumers (known simply as "response" in the industry) regardless of medium.

Database marketing is a form of direct marketing using databases of customers or potential customers to generate personalized communications in order to promote a product or service for marketing purposes. The method of communication can be any addressable medium, as in direct marketing. Database marketing emphasizes gathering all available customer, lead, and prospect information into a central database and using statistical techniques to develop models of customer behavior, which are then used to select customers for communications.

Personalized marketing (also called personalization, and sometimes called one-to-one marketing) is an extreme form of product differentiation. Whereas product differentiation tries to differentiate a product from competing ones, personalization tries to make a unique product offering for each customer. Personalized marketing had been most practical in interactive media such as the internet. A web site can track a customer's interests and make suggestions for the future. Many sites help customers make choices by organizing information and prioritizing it based on the individual's liking. In some cases, the product itself can be customized using a configuration system.

Direct response marketing is a form of marketing designed to solicit a direct response which is specific and quantifiable. The delivery of the response is direct between the viewer and the advertiser, that is, the customer responds to the marketer directly. This is in contrast to direct marketing in which the marketer contacts the potential customer directly. In direct marketing (such as telemarketing), there is no intermediary broadcast media involved (which is why it is called direct). In direct response marketing, marketers use broadcast media to get customers to contact them directly. It is direct response marketing because the communications from the customer to the marketer is direct, and this differentiates it from direct marketing in which the communications from the marketer to the customer is direct.

Internet marketing, also referred to as online marketing, Internet advertising, eMarketing (or e-Marketing), is the marketing of products or services over the Internet. When it applies to the subset of website based ad placements it is commonly referred to as Web advertising (Webvertising), and/or Web Marketing. The Internet has brought many unique benefits to marketing including low costs in distributing information and media to a global audience. The interactive nature of Internet marketing, both in terms of instant response and in eliciting response, are unique qualities of the medium. Internet marketing ties together creative and technical aspects of the internet, including design, development, advertising and sales. Internet marketing methods and strategies encompass a wide range of services such as search engine marketing (SEM) which can be broken down into search engine optimization (SEO) and pay per click (PPC), display advertising, text-based advertising, behavioral marketing, software-based ads, e-mail marketing, newsletter marketing, Customer Relationship Management Marketing affiliate marketing, web press releases, interactive advertising, online reputation management (ORM), online market research, and also Social Media Marketing Methods such as blog marketing, multivariate testing or optimization and viral marketing. When compared to the ratio of cost against the reach of the target audience, Internet marketing is relatively inexpensive. Companies can reach a wide audience for a small fraction of traditional advertising budgets. The nature of the medium allows consumers to research and purchase products and services at their own convenience. Therefore, businesses have the advantage of appealing to consumers in a medium that can bring quick results. Emphasize business goals and use methods such as CVP analysis when determining strategy and the overall effectiveness of marketing campaigns. Benefits of It includes One-to-one approach i.e. The targeted user is typically browsing the Internet alone, so the marketing messages can reach them personally. This is seen in search marketing, where the advertisements are based on keywords entered by the user in a search engine and appeals to a specific behavior or interest, instead of broadly reaching out at a defined demographic.

Social media describes the online technologies and practices that people use to share opinions, insights, experiences, and perspectives with each other. Social media can take many different forms, including Internet forums, message boards, weblogs, wikis, podcasts, pictures and video. Technologies include: blogs, events, social bookmarking, social news, opinion sites, photo and video sharing, livecasting, podcasting, publishing, game sharing, virtual world, social ads., picture-sharing, vlogs, wall-postings, email, instant messaging, music-sharing, crowd sourcing, and voice over IP, to name a few. Examples of social media applications are Google Groups (reference, social networking), Wikipedia (reference and collaboration), MySpace (social networking), Facebook (social networking), YouTube (social networking and video sharing), Second Life (virtual reality), Flickr (photo sharing), Twitter (social networking and microblogging).

Electronic commerce, commonly known as e-commerce or eCommerce, consists of the buying and selling of products or services over electronic systems such as the Internet and other computer networks. The amount of trade conducted electronically has grown extraordinarily since the spread of the Internet. It is also called "e-business," "e-tailing" and "I-commerce." E-commerce is a type of business model, or segment of a larger business model, that enables a firm or individual to conduct business over an electronic network, typically the internet. Electronic commerce operates in all four of the major market segments: business to business, business to consumer, consumer to consumer and consumer to business. Ecommerce has allowed firms to establish a market presence, or to enhance an already larger market position, by allowing for a cheaper and more efficient distribution chain for their products or services.

Brand Engagement is a term loosely used to describe the process of forming an attachment (emotional and rational) between a person and a brand. It comprises one aspect of brand management. What makes the topic complex is that brand engagement is partly created by institutions and organizations, but is equally created by the perceptions, attitudes, beliefs and behaviors of those with whom these institutions and organizations are communicating or engaging with. As a relatively new addition to the marketing and communication mix, brand engagement sits in the space between marketing, advertising, media communication, social media, organizational development, internal communications and human resource management.

Brand engagement between a brand and its consumers/potential consumers is a key objective of a brand marketing effort. In general, the ways a brand connects to its consumer is via a range of "touchpoints"—that is, a sequence or list of potential ways the brand makes contact with the individual. Examples include retail environments, advertising, word of mouth, online, and the product/service itself.

Spend management is the way in which companies control and optimize the money they spend. It involves cutting operating and other costs associated with doing business. Whether it is the money spent on goods or services for direct inputs, indirect material or products and services.

A buyer (i.e. an individual at a company that has determined a need for a particular product) will develop a document that lists the need (i.e. the type of product they need and why), specifications, the bidding process (how the process will work and how suppliers will be scored), rules for the bidding process, and other factors. Buyers will then invite suppliers to register online, and open the event for a set period of time so that suppliers can bid. At the end, the buyer awards the contract to one of several suppliers. The award can be based on price, delivery time (the time it takes the supplier to fulfill an order), or other factors such as quality or how closely the product meets the needs.

A reverse auction (also called procurement auction, e-auction, sourcing event, e-sourcing or eRA) is a tool used in industrial business-to-business procurement. It is a type of auction in which the role of the buyer and seller are reversed, with the primary objective to drive purchase prices downward.

CRM (customer relationship management) is an information industry term for methodologies, software, and usually Internet capabilities that help an enterprise manage customer relationships in an organized way. For example, an enterprise might build a database about its customers that described relationships in sufficient detail so that management, salespeople, people providing service, and perhaps the customer directly could access information, match customer needs with product plans and offerings, remind customers of service requirements, know what other products a customer had purchased, and so forth.

Customer relationship management (CRM) is a multifaceted process, mediated by a set of information technologies that focuses on creating two-way exchanges with customers so that firms have an intimate knowledge of their needs, wants, and buying patterns. In this way, CRM helps companies understand, as well as anticipate, the needs of current and potential customers. Functions that support this business purpose include sales, marketing, customer service, training, professional development, performance management, human resource development, and compensation. Customer service (also known as Client Service) is the provision of service to customers before, during and after a purchase. Customer Intelligence Management can be defined as the act of capturing, managing, analyzing and applying customer information for profitable growth.

Customer relationship management (CRM) generally relates to existing customer base of branded products or services. Data of customer base is generally private and not available to public. Customers cannot communicate, collaborate and share their experience, thought, idea with each other in social way. It does not identify new customer base and identify new or competitors market share or customer base of same line of products or services and communicate and attract them. BSN platform provides universal online social customers relation, retention and readymade new customer base management system including finding new customer base from existing market segmentation, multi social brands networks with application and services provides all-in-one source services to customer for their before, during and after purchase requirement and end to end buying or shopping or service subscription or use solution.

Now generally each Brand Owners maintain their online presence via corporate full features web site or portal which covers everything like products and services information, sales, e-commerce, marketing and promoting the brands. But customers or prospective customers or branded products and/or services users have to visit each time all different sites for their different products and services needs. What is needed, therefore, are methods and systems for bottom to top approach where user disclose which branded products and service they use and want to use or future use via creating portfolio of brands and manage brands group lists and related brand owner's brands networks which provide services to customer or prospective customers including sales, e-commerce, support, promotion and marketing of branded products and/or services.

Thus, it is clear that there is great need in the art for an improved method of and apparatus for enabling multiple brand owners to manage brands social networks and provide one source products and services related sales, e-commerce, promotion, support and marketing communications to customers or prospective customers anywhere along the World Wide Web (WWW), while avoiding the shortcomings and drawbacks of prior art systems and methodologies.

OBJECT OF THE INVENTION

The principal object of the present invention is to provide Global Online Platform and Framework for Brands Social Networks (BSN) where brand owners and users or customers or prospective customers can create or generate categories Brands Groups Lists or disclose or submit or publish portfolio of use or want to use brands and create or join brands related brand networks and communicate and collaborate with other same or same line or same category brands users or brand customers or brand networks members and share knowledge, information, experience. Users or members or customers or prospective customers can transact with all needed brands in one place for their wide range of purchase requirements like pre(before)-purchase requirements including knowledge, information, comparison, search, match, guidance, suggestion, review, feedback, experience, enquiry, presentation and answer, during purchase requirements including presentation, negotiation, comparison, training and learning, e-commerce, sales and marketing, promotion, product locators and post(after)-purchase requirements including support, notifications of updates, new arrivals, exchange offers.

Another significant objective of the present invention is to provide one source universal collaborative and federated social customers relationships, retention and readymade target customer base management (SCRM) and customers brands use management for multiple brands related products and services from multiple sources.

Yet another important objective of the present invention is to provide one source all services and supports require for implementing each steps or phase of Collaborative and Federated Customers Services Life Cycle (CSLC) for multiple brands networks or branded products and services owners. Customers Services Life Cycle (CSLC) phase includes Requirements Phase to Identify a need for a products and services, Determine the requirements for the product, Find the product that will meet the requirements. It Provides answers to What is this thing, Why would I want it, Which one is right for me, How much will I need. BSN Platform facilitates in Product and Services Advertising, Product Demonstration, Product Comparison/evaluation, Product requirements/specs. In Acquisition Phase, Identify the product sources, Evaluate the products in the market, Order the product, Pay for the product, Test and accept the product. It Provides answers to Where do I get it, How do I order it, How do I take possession, How do I pay for it, How do I test and install it. BSN Platform facilitates in Finding source & availability, Malls, Search engines, Advertising, Online customization, ordering, payment, Product delivery, Online delivery of digital products, linkage to carrier for physical delivery, Product installation, FAQ's for troubleshooting & installation. In Ownership Phase, Learn to use the product effectively, Monitor use of the product, Upgrade the product, maintain the product. It Provides answers to How do I train people to use it, How do I maintain it, Where do I take it for maintenance, How do I get an upgrade. BSN Platform facilitates to provide online tutorials and training sessions to learn to use the product, Provide online troubleshooting support, Get online feedback from customer for product design enhancements, Monitor the use and remind for upgrade or replenishment, Aftersales service. In Retirement Phase, Dispose the product—resell or return, Account for the resources, Replace the retired product, Evaluating the product. BSN Platform facilitates to create a used product market to facilitate reselling, Provide accounting service and discounts for usage, Create options for returning old product for a new one. Thus Multi Brand Customers Services Life Cycle (MCSLC) supports customers in Pre-purchase including Products and services search & discovery, Comparison shopping & selection, Negotiation—price, delivery etc., while Purchase including order placement, payment, receipt and Post-purchase including customer service, warranty, return etc. BSN Platform facilitates Presales interaction including Customer inquiry & order planning, Cost estimation and pricing, while purchase and Products and services delivery including order receipt & entry, order selection, prioritization, order scheduling, order fulfillment and delivery and Post sales including Order billing & payment management, Customer service and support.

Yet another important objective of the present invention is to provide one source products and services supports, information, knowledge, comparison, advertising, marketing, sales, promotion, e-commerce services to the customers.

Yet another significant aspect of the present invention is to provide Search, Match and Compare Engine to search the Branded products and services and related contents resources.

Yet another significant aspect of the present invention is to provide multiple brands communities or brand social networking capability to users to easily share, communicate and collaborate with other same product and services line brand users and brand owners.

Yet another significant aspect of the present invention is to provide platform to facilitate creation of brands related User Generated or Created Contents (UGC) or Consumer Generated Content (CGC) including blog, article, comments, video, photos, presentation, stories and other resources.

Yet another significant aspect of the present invention is to enable brand users to create or generate brands user specific personalized Portfolio of Brands Use List or Need or Wish List in form of categories Brands Group Lists which are shared, private and public editable and relate brands networks which provide Knowledgebase, information, support, social network resource like which friend uses my same brand and discuss and share ideas, opinions, suggestion and experience with members. Users get all-in-one multiple services and resources from multiple sources including brand owners, experts, brand network members, friends, friends' friends, Brands Social Networks (BSN) and $3^{rd}$ party partners.

Yet another significant aspect of the present invention is to provide benefits to Users so that users can use global online brands social networks platform in multiple useful way before, during and after purchase of products and services including what's new, alternative and best, location of availability, comparative analysis, what is advance, friend users, knowledge, experience, guidance, suggestions, answers, information, features, how to use, User to User or Customer to Customer support, health related issues in products and services use by users. User can participate actively with brand social networks and share thoughts with other user or prospective users.

Yet another significant aspect of the present invention is to provides benefits to Brand owner so that Brand owner of products and services knows and retains their customer base and attracts new customers by providing support, sales, promotion, marketing, e-commerce, contest, survey, poll, article, blogs and other services and activities. Brand owner can start or integrate corporate brand related social networking for existing customers or prospective customers.

Yet another significant aspect of the present invention is to provide advertisers a new type of advertising and brand building systems that include targeted advertising system, collaborative advertising system, competitive advertising system, advertising partnership via new advertising network system where selected brands social networks integrate with partners' portals or sites or products as per preferences and sites contents and services match-making with brand networks category and contents.

Another significant objective of the present invention is to understand Consumer behavior including how people buy, what they buy, when they buy and why they buy. It attempts to understand the buyer decision making process, both individually and in groups. It studies characteristics of individual consumers such as demographics, psychographics, and behavioral variables in an attempt to understand people's wants. It also tries to assess influences on the consumer from groups such as family, friends, reference groups, and society in general. BSN platform facilitates searching for, selecting, purchasing, using, evaluating, and disposing of products and services so as to satisfy their needs and desires including the consumer searches for information required to make a purchase decision from personal sources, commercial sources, public sources and personal experience, to compare various brands and products, to decide which brand to purchase and to evaluate their purchase decision.

Another significant objective of the present invention is to facilitate engagement of customers with one another, with a company or a brand. The initiative for engagement can be either consumer or company-led and the medium of engagement can be online. Leveraging customer contributions is an important source of competitive advantage—whether through advertising, user generated product reviews, customer service FAQs, forums where consumers can socialize with one another or contribute to product development. Customers engage via Bookmarking, Tagging, Adding to group, Collaborative Filtering like Rating, Voting, Commenting, Endorsing, Favouritising, Content Creation like Upload (User Generated Content), Blogging, Fan community participation, Create mash-ups, Podcasting, Vlogging and Adding Friends, Networking, Create Fan Community and like. Highly engaged customers are loyal and can give valuable recommendations for improving quality of offering, filter, categorize and rate the market from head to tail and help in tagging, reviewing, rating and recommending and word of Mouth advertising. BSN facilitates customers engagement via Encouraging collaborative filtering, Community development, Community participation, Help consumers engage with one another, Solicitation of user generated content, Customer self-service and provides customer engagement metrics like Root metrics including Duration of visit, Frequency of visit, % repeat visits, Recency of visit, Depth of visit (% of site visited), CTR, Sales, Lifetime value and Action metrics including RSS feed subscriptions, Bookmarks, tags, ratings, Viewing of high-value or medium-value content. 'Depth' of visit can be combined with this variable to include Inquiries, Providing personal information, Downloads, Content, re-syndication, Customer reviews, Comments (their quality is another indicator of the degree of engagement) and Ratio between posts and comments plus trackbacks and is useful for planning like identify where CE-marketing efforts should take place; which of the communities that the target customers participate in are the most engaging?, specify the way in which target customers engage, or want to engage, with the company or offering and measuring effectiveness and how successful CE-marketing efforts have been at engaging target customers.

Another significant objective of the present invention is to facilitate market segment identification, segment characterization, segment evaluation and target segment selection. The overall intent is to identify groups of similar customers and potential customers; to prioritize the groups to address; to understand their behavior; and to respond with appropriate marketing strategies that satisfy the different preferences of each chosen segment. Improved segmentation can lead to significantly improved marketing effectiveness. Variables Used for Segmentation include Geographic variables like region of the world or country, East, West, South, North, Central, coastal, hilly, etc., country size like Metropolitan Cities, small cities, towns, Density of Area like Urban, Semi-urban, Rural, climate like Hot, Cold, Humid, Rainy, Demographic variables like age, gender (Male and Female), family size, family life cycle, education (Primary, High School, Secondary, College, Universities), income, occupation, socioeconomic status, religion, nationality/race, language, Psychographic variables like personality, life style, value, attitude, Behavioral variables like benefit sought, product usage rate, brand loyalty, product end use, readiness-to-buy stage, decision making unit, Profitability, income status.

Another significant objective of the present invention is to facilitate co-branding via federated brands networks including co-branding with a single product or service with more than one brand name. Co-branding is same-company co-branding i.e. when a company with more than one product promotes their own brands together simultaneously, Joint venture co-branding when two or more companies going for a strategic alliance to present a product to the target audience. E.g. British Airways and Citibank formed a partnership offering a credit card where the card owner will automatically become a member of the British Airway's Executive club and multiple sponsors co-branding. This form of co-branding involves two or more companies working together to form a strategic alliance in technology, promotions, sales, etc. e.g. Citibank/American Airlines/Visa credit card partnership.

Another significant objective of the present invention is to provide Market research facility for systematically gathering, recording and analyzing data and information about customers, competitors and the market. Its uses include helping create a business plan, launch a new product or service, fine tune existing products and services, and expand into new markets.

Another significant objective of the present invention is to integrate BSN platform with partners' web sites or portal or products or services as per preferences and mutual agreements and integrate as a services with 3rd party products, services and business process including ERP, spend management, customer relationship management (CRM) and like.

DETAIL DESCRIPTION OF THE PREFERRED EMBODIMENT

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Moreover, the present invention makes use of the following terms, definitions, acronyms, and abbreviations for describing the Global Online Brands Social Networks (BSN) Platform and Framework.

Content: Generally, content refers to virtually any material that may be provided for use within an internet website, including, but not limited to text, music, pictures, graphics, cartoons, audio narratives, videos, movies, or the like. Additionally, in one or more embodiments, the content can further include articles and/or images. For example, the content can also include videos, pictures, logos, illustrations, animations, music, audio recordings, source code, pseudo code, messages, emails, alerts, instant messages, or virtually any other type of content that can be digitally represented. Moreover, content may be considered to be independent of its format. Thus, content may include any of a variety of formats, including, without limit, image files, video files, audio files, documents, database files, spreadsheets, Hypertext Markup Language (HTML) files, or the like. Content may also be classified as user generated content "UGC."

User: Various entities may perform actions, or assume particular roles. While typically, an entity may assume a single role, the invention is not so constrained, and an entity may also assume a plurality of roles or personae. Thus, within the present invention, a "User" is member of one or more Brand Networks or "User" is "Friends" of other user or "User" is Brand Owner's administrator or "User is "Experts" or "User" is developer of the applications and services or "User" is partner of the Global Online Brands Social Networks. The terms "administrator" or "admin" refer to those entities whose primary role includes establishing the editorial workflows and/or creating accounts, and managing the architecture for the BSN for use by editors and/or authors. The terms "end-user," and "user" refer to those entities that may register for use of the BSN, and typically provide "user generated contents". While an entity typically represents a person, the invention is not so limited. Thus, an entity may include virtually any person, group of persons, businesses, organizations, or even a computing structure including a program, or the like.

Global Online Brands Social Networks: Is a platform and framework for managing the profiles of platform users and brand networks, multiple brands related networks, brand network's members, brand network related "user generated contents" or publications, brand network specific application and platform applications and services.

Brand: Brand comprises plurality of products and services, products and services line within a product and service category used by users from any retailer, manufacturer, sellers, firm, company, institute, college, schools, organization, web site, shop, mall and enabled by any legal entities including patent, copyright and trademark, collective trademarks, certification mark, logo, known, locally popular, and other country specific legal laws.

Brand Network and Brand Network Page: Brand network is user or expert or brand owner administrator or BSN system administrator-created brand-specific public or private or trusted social networks. Any user of global brands networks platform can join existing public network or join or create new or private networks. Brand network includes brand network page and details, administrators' activities, news and notifications, statistics, joined network members' profiles, publications of user or expert or brand-owner-generated contents and attached applications and services. Brand network owner's administrator invites users to join, become a member of the network, advertise and promote the brand network. Network members can submit or publish the contents or use contents published by other members, participate in the brand network specific applications e.g. survey, poll, contest, use custom applications for authoring blogs, articles, stories and use services provided by brand owners like e-commerce, support, marketing, answer.

User and User Page: User is a Registered User of Global Social Brands Networks Platform and can be general, premium, partner, expert user and brand owner's administrators including one or more individuals, team or association, collaboration of one or more pre-identified individuals and one or more entities including but not limited to company, associations, organization, professional bodies, social bodies, shops, manufacturer, wholesaler, supplier, dealers and distributor, web site, portal, research agency, governmental bodies and enterprises or an entity that exists as a particular and discrete unit. Each user has a home page and a profile page. User administration of profile page includes editing profiles and extended profiles, accounting settings, setting privacy for search, profile and content publishing, distribution, subscribing, communication and collaboration. Users search, find, add and invite friends. User can create and/or generate (N) number of Brands Group Lists, create and become a member of (N) numbers of public and private brand networks and publish and subscribe network specific contents, participate with network specific activities like polls, survey, events, contest. Profile page includes user's all friends, friends lists, all user's created and joined public and private networks, friends in other networks, profile details, user's and friends status and news, profile statistics, user's publications list, applications attached with profile page e.g. events, notes, photos, videos, groups, answer, blog.

Brand Network Member: Users of Global Social Brands Networks Platform, when join or create specific brand network, they become member of that particular brand networks. Member has rights to use network page, view, publish and subscribe contents, services and applications of all or particular members or experts or brand network's administrator, participate to particular groups, events, survey, poll, contest applications, provide human services to other network members like answer, analysis, guidance and use services provided by brand owner like e-commerce, answer, support and other services. Members can communicate and invite their friends and friends' friends to join particular brand networks.

Friend: Social Brands Networks Platform Users can search, find, add, suggest, confirm and invite their friends to join Social Brands Networks Platform, related social brand networks and user's friends group.

Friends of Friends: Social Brands Networks Platform Users can view the profile of friends' friends and invite them to join user's friends groups.

Brands Resource Book: Brands Resource Book is a content management interface where users of Social Brands Networks Platform can compose structured, free-form and application related contents via compose brand interface, user can publish contents or publications to particular brand networks and all publications of user are shown in publish box of Brands Resource Book. User can receive all contents from all joined brand networks in brand Inbox interface based on users' inbox privacy settings including receiving contents from selected brand networks or form selected publishers. User can take actions on contents including rank, comments and report abuse and participate.

Brand Compose: Member of any brand network including Social Brands Networks Platform's user or expert or brand owner can compose brand related contents including structures (tag specific contents including review, suggestion, answer, FAQ, experience, features, health), free form and application specific contents like text, photo, video, music, blog, articles, animation, news, presentation, graphics, files and other digital resources and publish the contents as per privacy policies set by publisher i.e. user including publish publication to one or more networks or restricted to particular groups of members. User can also draft the publication and publish later.

Brand Publish Box: All published publications of all joined brand network of publisher i.e. user is shown to brand publish box. User can see publication related statistics including number of readers or subscribers, hits, visits, comments, actions and points earned.

Brand Inbox: All publications of all joined networks' all subscribed publishers come in Inbox. Network member can read publications and related statistics including number of subscribers, hits, visits, comments and points and level of authors. Member can take actions on contents like give comments and feedbacks, assign points and ranks, unsubscribed or block contents, mark as top or favorite publisher.

Brand Users Generated Contents and services: General Users of Global Social Brands Networks Platform's can submit user's generated contents including structured, free form and application specific contents in the form of text, audio, movie, animation, images, graphics, video, files, slide and other digital resources. Online general users can provide services to other members of network like answer, support, guidance, suggestion, analysis, collaborative search and other human mediated services.

Brand Experts Generated Contents and services: Global Social Brands Networks Platform's registered domain specific expert provides value added services and contents to brand network's members or subscribers including expert contents, support, answer, analysis, promotion, sales, marketing, referrer and other expert services.

Brand owners' Administrators: is an administrator user or representative appointed by of brand owners to manages the brand networks including members, contents, publication, analysis, creating new administrators, attaching applications, offering services, filtering or censoring content publications and other all administrative and management activities.

Brand owners and admin Generated Contents and services: Brand owner provides all members or subscribers of brand network quality contents including reliable contents like products and services details, catalogue, videos, photos, presentation, article, FAQ, white papers, demo, training, information, knowledge and valuable services to customers and prospective customers includes e-commerce, replay, support, answer, support.

Structured Tags: System or user or expert created Structured Tags provide readymade tags like review, features, price, quality, specification, suggestion, comments, guidance, health, warning, how, why, compare, alternative etc. to write or author tag specific contents or relate content with particular tags.

Structured Content: Structured Content is divided into multiple predefined forms like photos, videos, music slides, presentation, text resources and contents, file resources. Structured and organized content is useful for viewing, searching, matching, comparing, storing, analyzing, filtering and sorting.

Free Form & Unstructured Content: Free Form content includes any types of combination of resources in any form including text, photos, videos, music, files, links and blog or article in any style, language and format.

Application related Content: Application related Contents are full feature applications for specific needs like blog, article, stories, slide show, presentation, podcasting, catalogue, demo and training.

Brand Network and Profile Page Applications: Application type includes (1) Content authoring and publishing, (2) applications for network members to participate including poll, contest, survey, games, fill-form, u-to-u answer (3) service specific applications including e-commerce, promotion, sales, marketing, gifts, news, support, inquiry, answer. Applications can be developed by controller or authorized developers or expert or general users and applications can be integrated with profile page or brand network page.

Brand Network Experts: Brand Network Experts is a person or company or organization or any other entity that qualifies as an expert for one or brand network and provides value added contents and services to all members of one or more brand networks.

Brand Owner: Brand Owner is a person or company or organization or any legal entity who owns the brand of particular products or services or web site or any other things. Brand Owner's appointed representative administrators can manage the brand network. Brand owner can request the controller to acquire the readymade brand network for support, advertising, e-commerce, sales, marketing and promotion activities based on mutual agreements and payment system including pay per member or pay per action or pay per lead or pay per click or pay per impression. Brand owner can integrate brand specific network with their corporate site or portal.

Brand Public Network: All users of Global Social Brands Networks Platform can join or create public brand network. One unique brand has only one public network. Public brand network is always owned and managed by brand owner or controller or system. All members of public brand network can read contents, give comments and points, participate and use applications, publish and subscribed contents.

Brand Private Network: All users of Global Social Brands Networks Platform can join or create private brand network with the permission and privacy policies of brand network owner or creator or administrator. Multiple users can create multiple private networks for a unique brand and invite friends and users to join or become member of network. Member of network can subscribe and publish the contents, give comments and assign points.

Brand Trusted Network: Trusted Brand Network creator and all joined members register via trusted official e-mail, mobile phone, paid identity and any other trusted identifications.

Brand User: Brand User is a user of particular brand and brand category related products and services e.g. Colgate brand toothpaste user where Colgate is a brand name and toothpaste is a brand category.

Brand Category: Brand Category is a taxonomy wise category and sub-category of brand network.

Brand User to Brand User: In Brand User to Brand User, Brand User can share information and knowledge including contents with other same Brand Users and provide supports, answers, suggestion, experience, guidance, alternatives, best line of products and services, training, presentation.

Brand User to Brand Owner: In Brand User to Brand Owner, Brand User joins the network of Brand Owner, participate the events, application and services of Brand Owner, contribute and share the knowledge, information and contents, purchase or shop products and services, give feedbacks and suggestions, invite friends to join the network, read or subscribe the publication of Brand Owner.

Brand Owner to Brand User: In Brand Owner to Brand User, Brand Owner creates brand network, invites users of brands, publishes quality contents and news, analyzes members data related to poll, survey and contest and provide applications and services for e-commerce, sales, marketing, advertising, brand building, promotion, supports, content publishing, communication and collaboration.

Brand Network Partners: Brand Network Partners including any individual or company or marketing agency or research agency or distributor or retail shop or mall or any other entity request the controller for partnership regarding integrating brand networks with web sites, services, products and portals and owning brand networks for marketing, competitors research, promoting, sales, e-commerce and advertising multiple brands products and services based on predefined filtered criteria including brand category, location, preferences, age group, gender and selected brand networks with mutual agreements and payment system.

Brands Networks Generator Templates: User can use multiple user or expert or system-generated, readymade brands-group lists-generated templates to create or generate Brands Group Lists including shared, public and collaborative Brands Group Lists for easily joining multiple brands networks as per user preferences, location, gender, career, status, education, interest, hobby, age, income range, life style, living standard, cast, work, on demand information and based on extended profiles.

Extended Profiles: Extended Profiles is domain and subject specific readymade system or experts or users created profile templates or form or wizard for acquiring users domain or subject specific details to identify the preferences, prospective customers for particular brands and helps in presenting brand group list generated templates and generating or creating suggestive brands group lists.

Brand Social Graph: A brand social graph is global mapping of brand users with brand owners.

Brands Database: Pre-created brand database includes all updated popular brands name list and use for validating the user created brand network name with brands name list database.

Friends List: User can manually create categories friends list and System automatically generates and updates brand, brand category and brand networks' specific confirmed friends list.

Brands Group Lists: Global online brands social networks' user's profiles comprise domain and subject specific extended profile details which are used for automatically or manually generating list of user's prospective and suggestive portfolio of brands based on categories subject and domain specific selected brands templates. User can select multiple brands of products and services used by user and quickly identify and join or create related brand networks. System also applies artificial intelligence for generating user specific suggestive brand lists.

My News: My news feature Global online brands social networks platform including all actions news and updates of user and all friends and all joined brand networks like who join which brand network, who publish what, who install which application, what's new in products, services, events etc.

Cross Brand Networks Lists: Cross Brand Networks Lists is system and user generated cross brand networks lists for related taxonomies and categories e.g. toothpaste related competitors or alternative related brands list.

Federated Brand Networks Lists: Federated Brand Networks Lists are brand list of collaborative or federated partnership related to one or more brands and brands networks. User and system can also generate plurality of federated brand networks lists based on custom need, task, job, program, events, activities and workflow.

Multi Brand Customers Services Life Cycle (MCSLC): are multi brands and brands networks related Collaborative and Federated Customers Services Life Cycle Platform of BSN which provides end to end supports services to customers or users or prospective customers for products and services they used or want to buy & use or buy in near future. BSN platform supports in each stage or step or phase of Customer Services Life Cycle process of one or more branded products or services including in Requirements Stage, Establish Requirements: Helping the customer to understand what a product or service does and how it can meet their particular need. Specifying: Determining the specific features or model of the product or service that is appropriate for the particular customer. In Acquisition Stage, Sourcing: Making it easy for the customers to find a location to obtain the product or service. Ordering: The customer accepts the suppliers offer to sell the product or service and provides specifics regarding features and delivery. Paying: Pay For: The mechanism by which the customer pays for the product and the means by which that payment is authorized. Obtaining: Taking ownership of the product or beginning to receive the particular service. Refers to the means by which the product or service is distributed to the customer. Test & Accept: Demonstrating product or service meets the customer's requirement. Information based products or services can often be tested prior to purchase. In Ownership Stage, Training: The process that supports resource utilization by making the customer capable of making use of the resource to its full extent. Maintaining: Helping the customer to analyze, diagnose, and repair problems with the product or service. Assist in tracking usage (how the product is being used, amount remaining, problems in usage, recommendations for more effective use). Upgrading to improved version. In Retirement Stage, Replace, Return & Dispose: Returning the product; reselling the product; recognizing the need to buy a new one; disposing of the product; trading the product in; returning a rental product. Replacing a product that has been consumed or beyond repair. Accounting for: Helping the customer to understand how much they are spending (or saving) on the product, the use of the product, and or other resources used in conjunction with the product. Evaluating: The final "tally" by the customer for the life-cycle experience. Were expectations met? Satisfied? Customers give feedbacks to brand owners and provide comments, ranks, reviews, suggestions, guidance, experience, tips & tricks, answer, support to other customers or users regarding products and services.

Universal Social Customers Relationship & Retention Management (SCRM): is social way of communication, collaboration, sharing between customers or prospective customers or past customers or users or members or subscribers or client base or public & guest user of all brand networks of branded products and services including all competitors for branded products and services in democratic or social way. Customer base includes all competitors' customers' base i.e. complete market of a particular products and services line or category e.g. "Pizza market" or "Mobile Market". Brand owner of particular products or services can reach whole market related prospective customers or customers. BSN is a multi model network environment which provides social customers relationship management where multiple networks of branded products and services of similar line or category or domain or subject exist and differs from conventional customer relationship management which covers only customers of brand owner's brands and not all competitors' brands or market or public base related prospective customer base. BSN provides holistic solution for identifying, attracting, differentiating, and retaining customers.

Briefly stated, the invention is directed to providing a system, method, and devices that enable general users to create or generate user's brands portfolio lists used or want to be used by users and creates or join related brand networks and invite friends to join brand networks, publish or subscribe to users or members or experts or brand owners publications, manage profile, brand networks, applications, contents and friends, view statistics, updates and all news of network, participate in activities or events of brand networks, take actions on brand networks, contents and members or users of brand networks.

Further, the invention is directed to providing a system, method, and devices that enable brand owners to create brand specific network, invite users of parent network i.e. Brands Social Networks (BSN) to become members of their brand networks, publish quality content publications for brand network, manage members, applications, users or members generated contents and services offered by brand owner to the members of brand network or customers or prospective customer of brands related products and/or services.

Further, the invention is directed to providing a system, method, and devices that enable experts to provide value added services to brand network members including answer, quality contents, supports and sales, marketing and promotion related services on behalf of brand owners or sponsors and to receive compensation for such actions.

Further, the invention is directed to providing a system, method, and devices that enable partners to integrate BSN platform with partner's web sites or portals or services or products to provide additional feature to their users and share revenue with BSN System. Additionally, since multiple Brands Networks integration with a multiple websites can attract large audiences, subsequent viewing of Brand Networks and published publications can also generate revenue or any other form of compensation with click-through on related advertisements, affiliates, e-commerce, lead generation, and other business methods. This user behavior can generate significant revenue or other compensation for the partners; and even for a website owner. The Revenue Share System (RSS) determines and enables a partner to receive a share of the revenue or other compensation that their integrated brands networks generate through the use of the BSN System. In one embodiment, the RSS may be implemented as a separate component, even on a distinct computing device; however, the RSS may also be implemented as a component integrated within the BSN, or within a same computing device.

In one embodiment, the RSS may determine compensation and revenue share based on click-through actions, a number of times a user's page is viewed, a mouse over by a viewer of the page over such as advertisements on the user's page, over portions of a defined content, or the like. The invention is not limited to these mechanisms for determining compensation and revenue share, however, and virtually any other mechanism may also be employed to provide revenue or other compensation to a expert user, and/or website owners, and to encourage the user to continue to provide content through use of the BSN.

Further, the invention is directed to providing a system, method, and devices that enable advertisers to better target advertising including collaborative, competitive and social advertising.

In one embodiment, the BSN also provides a suite of online or smart online or smart client or smart devices or visual or peer to peer enabled applications and default services like registration, search engine, payment system and tools that enable several administrative and management features as described below.

Successfully implementing brand network depends on Facilitation, Quality of community manager/community management team, Exclusive product and service offers for community members, Ability to search/recommend user-generated content, Ability for community members to connect with like-minded people, Ability for members to develop reputation within the community, Ability for members to help others, Ability to do transactions in community, e.g., buy products or support services, Ability to conduct time-limited activities, e.g., run brainstorming sessions, discuss hot topics, Community focused around a hot topic/issue, Attracting people to the community, Getting people to join, Getting people to engage, e.g., post, ask questions, Getting people to keep coming back, functionality/technology features, skilled community managers/facilitators.

BSN platform facilitates brand owners and administrators of brand networks in sales, e-commerce, support services, marketing and promotion activities including Deliver buzz/publicity value, Drive referral, Target new/specific audience, Support ad campaign, Seed influencers, Leverage a sponsorship or new news, Create novelty, Build better customer experience, Get noticed by bloggers/social media, Meet/go deeper with a tough-to-reach audience, Chase younger and more networked audience, Diffuse bad word of mouth, Improve credibility of message, Incubate a community of brand fans/ambassadors, Build brand love/affinity, Build a worthy cause, Drive brand loyalty/lifetime value of users, Accelerate sales, Launch a product/service, Build awareness/exposure, Deliver web traffic, Deliver live traffic, Drive overall marketing spend efficiency, Drive/upsell revenue, Launch in a specific geography, Reduce customer acquisition costs, Save operational costs, Create a new distribution channel, Participate in a dialogue/conversation, Target localization of international/national effort, Improve customer support, Create an account specific/alliance-based program, Ego/want personal brand to be noticed and talked about, Act as a sounding board/stimulus for a lot of ideas, Follow a competitor/improve on a competitive effort, Identify superior real world insight, Work with a new agency/get new ideas, Test market for the rest of the company, Convert competitive users/ask for reappraisal, Solve a problem, Skirt/circumvent regulations. The purpose of online brands communities or networks is Insights/market research, Customer support, New product development, Idea generation, Product testing, Customer/client loyalty, Market thought leadership/brand building, Developer relations, Amplifying word of mouth, Employee communication, Public relations, General marketing, Reputation management. Business objectives for brands communities or networks are: Reduce market research costs, Reduce customer acquisition costs, Reduce customer support costs, Bring outside ideas into organization faster, Increase customer loyalty, Improve new product success ratios, Increase product/brand awareness, Generate more word of mouth, Improve public relations effectiveness. Business measures to assess the effectiveness of the brands communities or networks are Increased sales attributable to the community, Improved Net Promoter score, Improved customer satisfaction scores, More referrals, Number of new leads, Number of new trials, Number of new ideas from community, Number of new ideas from community adopted by organization, Decline in emails/calls into service/support, Improved brand perception scores, Greater awareness, Repeat sales. Web analytic measures to assess the effectiveness of the brands communities or networks are Number of visitors, Number of repeat visitors, Number of registered users, Number of "active" users, How often people post/comment, How often people visit, Number of RSS feeds, Number of people who subscribe via email, Increase in search engine rank for your brand/company, Changes in traffic over time, e.g. doubling registered users in a month, Page views, Time on site, Citations on other sites.

BSN platform facilitates customers to Enable voice-of-customer, Assess trends and changes in customer needs, Gain customer insight on how to improve and develop products and services, Humanize brand through direct interactions with customers, Empower customers to solve their own and each other's problems, Identify and empower passionate customers as brand advocates, Connect prospects to a supportive and engaged customer community, Align community to strategic business and marketing goals, Achieve adoption and participation by targeted audience, Facilitate an environment of open discussion to encourage the free flow of information, Use community tools to obtain feedback and respond to customer advice, Define community ROI using management reporting mechanisms, Humanize brand through open, two-way dialogue with target audience, Obtain direct, immediate feedback on products and services, Provide a channel to deliver information and services to customers, partners and others, Enable target audience to interact, share best practices and create original content, Elevate brand by identifying and rewarding community participants who help to grow and nurture the community, Extend product reach and open new market opportunities, Improve operational efficiency to maintain a competitive edge, Foster innovation through team collaboration, Formally capture industry-leading expertise, knowledge and intellectual property (IP).

The BSN System employs a variety of algorithms to maintain the integrity of the system. For example, one or more fraud algorithms are provided to ensure that content generated by users is not fraudulently used to generate revenue or other compensation by either the content's author or third parties. There is also a mechanism for determining the value of a publication, and in turn the royalty payment to the user. This mechanism combines, amongst other factors, the popularity of the content, its quality, as well as the value its readers draw to an advertiser. Additional algorithms are in place to detect "junk" content. A user rating system can provide feedback on content and this rating can be employed by itself or with other factors to determine the content's value to other users and quality.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which are to be read in association with the accompanying drawings, wherein:

FIG. 11-29 show different screen shots of various embodiments of user interfaces for employing the Brands Social Networks (BSN) System, in accordance with the invention.

DETAILED DESCRIPTION OF THE DRAWINGS

Illustrative Operating Environment

Figure 1:
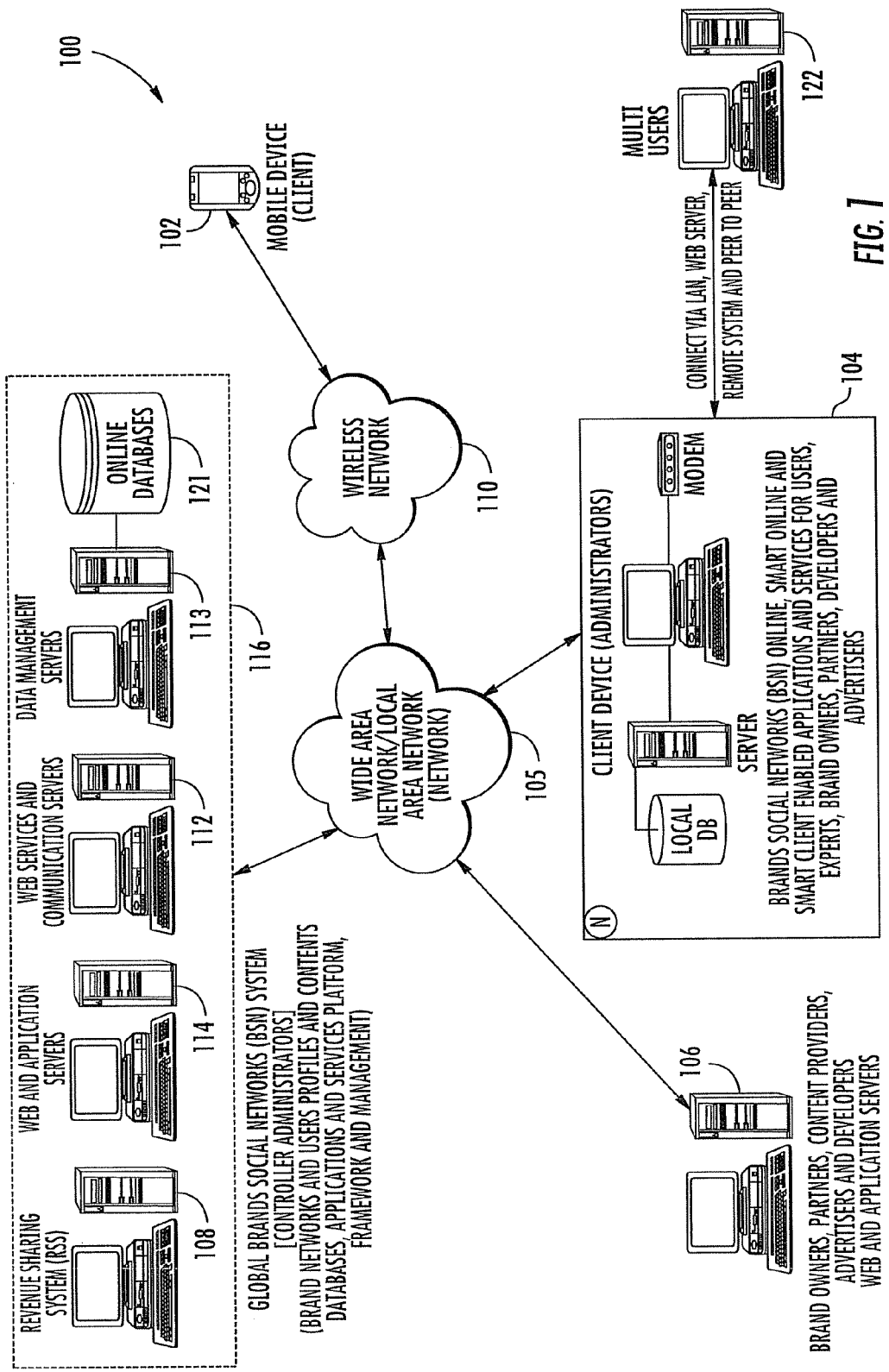
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, mobile device (client device) 102, client device 104, third party partner server 106, and Brands Social Networks (BSN) System 116. BSN Platform 116 further includes Revenue sharing System 108, Data Management Server 113, Web Services and Communication Server 112, and Web and Application Server 114.

One embodiment of a client device is described in more detail below in conjunction with FIG. 2. Generally, however, mobile device 102 is one example of a client device that is portable, and may include virtually any portable computing device capable of receiving and sending a message over a network, such as network 105, wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. As such, mobile device 102 typically ranges widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Mobile device 102 also may include at least one other client application that is configured to receive content from another computing device. The client application may include a capability to provide and receive textual content, multimedia information, or the like. The client application may further provide information that identifies itself, including a type, capability, name, or the like. In one embodiment, mobile device 102 may uniquely identify themselves through any of a variety of mechanisms, including a phone number, Mobile Identification Number (MIN), an electronic serial number (ESN), network address (such as an IP address, port number, and/or the like), or other device identifier. The information may also indicate a content format that the mobile device is enabled to employ. Such information may be provided in a message, or the like, sent to client device 104, BSN Platform 116, or other computing devices.

Mobile device 102 may also be configured to communicate a message, such as through Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Mobile device 102 may further be configured to include a client application that enables the end-user to log into an end-user account that may be managed by another computing device, such as BSN Platform 116. Such end-user account, for example, may be configured to enable the end-user to receive emails, send/receive IM messages, SMS messages, RSS feeds, to access selected web pages, create and/or publish content, receive compensation, feedback, or the like.

Client device 104 may include virtually any computing device capable of communicating over a network to send and receive information, including email messages, IM messages, SMS messages, RSS feeds, or the like. Furthermore, client device 104 may be configured to enable a user to manage brands networks, members, friends, application and contents including create and/or publish content, to receive comments or other feedback or actions associated with the content and/or to receive compensation based in part on the content, advertisements associated with the content, or the like for expert users.

The set of such devices may include devices that typically connect using a wired communications medium such as personal computers, multiprocessor systems, microprocessor-based or programmable consumer electronics, network PCs, or the like. Similarly, client device 104 may include one or more applications as described above in conjunction with mobile device 102.

Wireless network 110 is configured to couple mobile device 102 and its components with network 105. Wireless network 110 may include any of a variety of wireless sub-networks that may further overlay stand-alone ad-hoc networks, or the like, to provide an infrastructure-oriented connection for mobile device 102. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for mobile devices, such as mobile device 102 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between mobile devices 102-104 and another computing device, network, or the like.

Network 105 is configured to couple BSN Platform 116 and/or RSS 108 with other computing devices, including, client device 104, and through wireless network 110 to mobile device 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between 106, client device 104, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of BSN Platform 116 is described in more detail below in conjunction with FIG. 4 and flowchart 5 and sitemap flowcharts 6 to 10. Briefly, however, BSN Platform 116 includes one or more network devices configured to enable content publishing for users to share content over a network with others.

As shown in FIG. 1, BSN Platform 116 includes a Data Management Server 113 which hosts multiple databases 121 including Brand List, BSN Users and Brand Networks Profile, Members, synchronization, log, statistics, transactions and actions, Contents that is configured to provide data storage and analytics for content, feedback to the content, reporting services, and/or revenue analysis. Data Management Server 113 may also include data about the user and users' profiles, including, but not limited to login, password, region information, preferences and brand networks contents, or the like.

Web Services 112 is configured to provide various web services to a user including various search tools, synchronization, communication, collaboration, user interfaces, accounting tools, registration services, security services, or the like, that enable a user or partners to access, edit, and/or otherwise publish, or maintain content useable for a BSN and integrate website or portal or products or services with BSN Platform.

Web and Applications Server 114 is configured to enable display and/or management of one of more brand networks online web sites or smart online or smart client enabled applications. In one embodiment, Web and Applications Server 114 may provide access to BSN and partners websites that enable integration, publishing and retrieval of brand networks and content for display. In one embodiment, Web and Applications Server 114 may include one or more websites controlled or otherwise managed for providing professional content. Such content may be written in multiple languages and configured to be executed on a variety of different computing platforms, and/or configurations. In one embodiment, automatic reformatting of the content may be performed to enable the content to be available through a variety of different communication mechanisms, including, but not limited to web pages, RSS feeds, emails, or like.

Thus, while Web and Applications Server 114 is illustrated as a single computing device, the invention is not so limited. For example, Web and Applications Server 114 may represent a plurality of different computing devices. Similarly, Web Services and Communication Server 112, and/or Data Management Server 113 may also represent a plurality of computing devices, rather than a single computing device. Therefore, devices that may operate as components of BSN Platform 116 include personal computers desktop computers, multiprocessor systems, microprocessor-based or programmable consumer electronics, network PCs, servers, network appliances, or the like.

3rd Party Partner Server 106 represents virtually any computing device configured to provide a plurality of third party services, including integration of BSN Brands Networks with partners or brand owners website, content and services, advertisement content, or the like. In one embodiment, RSS (Revenue Sharing System) 108 may be provided within 3rd Party Partner Server 106, to provide revenue and/or other compensation to the BSN Platform 116 based on different mechanisms, including pay per member, pay per action or lead or e-commerce commission or pay per clicks for advertisements, or the like. In one embodiment, 3rd Party Partner Server 106 may provide the advertisement content, or the like, and then receive information from RSS 108 indicating how much compensation to be provided, based on reports provided by RSS 108, or the like. Brand Owners integrate related brand networks with company web site or use online brand network on BSN platform and share revenue or pay based on per member or per action or per lead or per e-commerce transaction and like. Partners integrate related one or more brand networks with web site or portal or products or services and share revenue with BSN based on different advertising model and e-commerce or sales transactions. Devices that may operate as components of 3rd Party Partner Server 106 include personal computers desktop computers, multiprocessor systems, microprocessor-based or programmable consumer electronics, network PCs, servers, network appliances, or the like.

Illustrative Client Device

Figure 2:
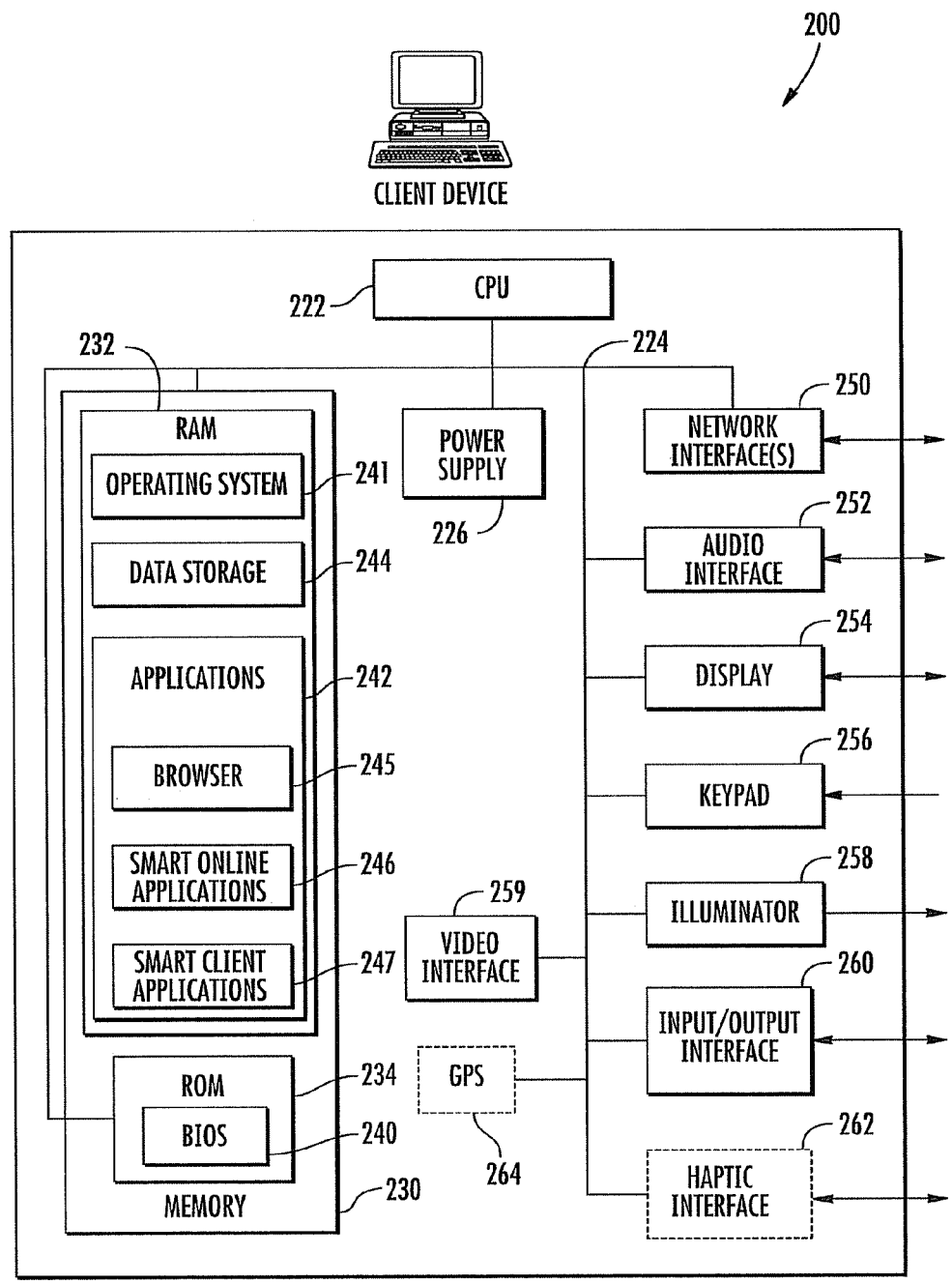
FIG. 2 shows a schematic diagram of one embodiment of a client device useable to interact within the environment of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 102 or 104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Optional haptic interface 262 is arranged to provide tactile feedback to a user of the client device. For example, the optional haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® Operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store multimedia information and/or content for later publication, editing, or the like, as well as other information including address lists, contact lists, personal preferences, or the like. At least a portion of the content may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), content, and enable telecommunication with another user of another client device. Other examples of application programs include calendars, editors, email clients, IM applications, SMS applications, VOIP applications, contact managers, task managers, transcoders, database programs, word processing programs, security applications, spreadsheet programs, games, search programs, and so forth. Applications 242 may further include browser 245. Browser 245 may include virtually any of a variety of client applications configured to receive and/or provide communications of web pages, and other content over a network. Browser 245 typically provides for a graphical display of various web pages, including user interfaces provided, in part, by another computing device over the network. Browser 245 may include a variety of security features, and/or other plug-in applications, modules, applets, scripts, or the like, to enable display of animation, videos, playing of audio files, or the like. Browser 245 and applications 242 are configured to enable a user to prepare content for publication to BSN Platform 116 of FIG. 1. Moreover, through one or more of applications 242, the user may receive notification of and/or compensation for their contributed content.

Illustrative Server Environment

Figure 3:
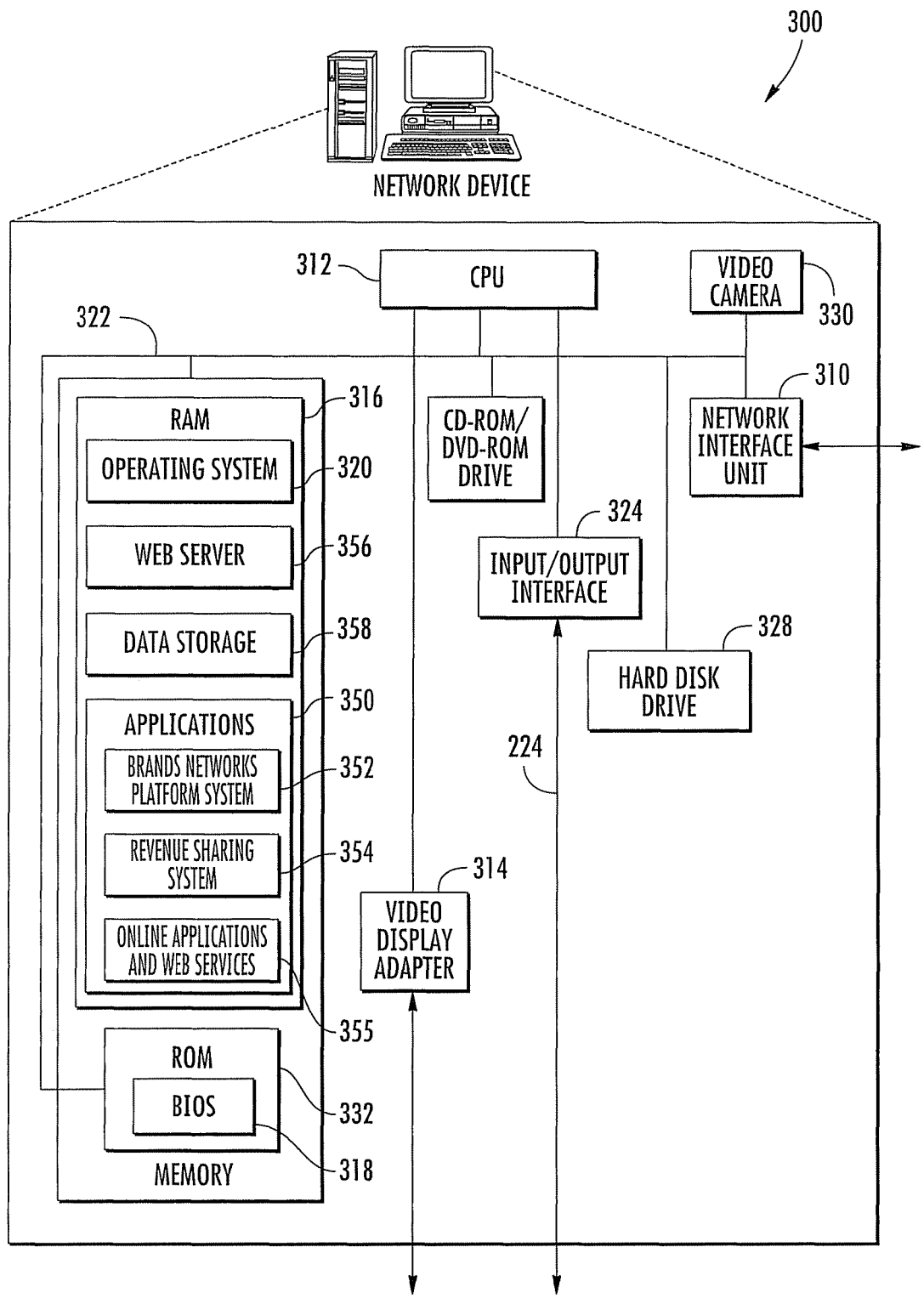
FIG. 3 illustrates a schematic diagram of one embodiment of a network device useable within the environment of FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, an integrated BSN Platform and Frameworks includes Users Profiles, Friends, Brand Networks, Applications and Contents Management System. Thus, in one embodiment, network device 300 may represent an integrated device for managing BSN Platform 116 and RSS 108 of FIG. 1. However, it should be clear from above, that such components also may be distributed across a plurality of different computing devices. Thus, FIG. 3 should not be construed as constraining or limiting the invention in any manner, but instead is intended as merely one of a variety of possible implementations.

In any event, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account managers, and so forth.

Mass memory further includes web server 356, data stores 358, and applications 350. Applications 350 are shown to include Brand Networks (BSN) Platform server 352 and Revenue Sharing System (RSS) server 354 and online applications and services server 355. Web server 356 includes virtually any application configured to delivers Web pages and other content to browsers and other client applications via at least the HTTP protocol. However, web server 356 may also be configured to provide scripts, user interfaces, accounting interfaces, editors, security, or the like, to the client application. Moreover, web server 356 may employ a variety of other communication protocols, beyond HTTP. For example, web server 356 may be configured to manage email communication protocols, SMS protocols, IM protocols, or the like. Moreover web server 356 may employ a variety of scripts, applets, programs, or the like, to enable communications of content with a client application. In one embodiment, web server 356 may represent, in part, web properties services provided through Web Properties Server 114 of FIG. 1 and described in more detail below in conjunction with FIG. 4. In one embodiment, web server 356 may also obtain the content and/or user interfaces, applications, or the like, from data stores 358.

Data stores 358 may include any of a variety of storage mechanisms, configured to store, and otherwise managed content, applications, scripts, applets, or the like. As such, data stores 358 may be a database, a file structure, or the like. Data stores 358 may store the content into a category structure, such as folders, albums, graphs, trees, or the like, based on a user account, a web service, or the like. In one embodiment, data stores 358 may represent the Data Management services illustrated in FIG. 1, and described in more detail below in conjunction with FIG. 4.

BSN Platform 352 is described in more detail below in conjunction with FIG. 4. Briefly, however, BSN Platform 352 includes a variety of components to provide web services to a user, including search tools, user interfaces, plug-and-play modules, or the like. Various embodiments of example user interface screens are described in more detail below.

RSS 354 is described in more detail below. Briefly, however, RSS 354 includes applications, and/or data configured to determine Revenue Sharing for partners including Brand Owners, Developers and Partners like $3^{rd}$ party web sites, portals, research agency, based on a variety of mechanisms, including but not limited to pay per member, pay per action or lead or sales transaction, impressions of the content by others, click-through activities of a viewer of the content, mouse overs by a viewer on a webpage including the content, or the like. Embodiments of various user interface screens are described in more detail below.

Illustrative Overview BSN Platform Architecture

Figure 4:
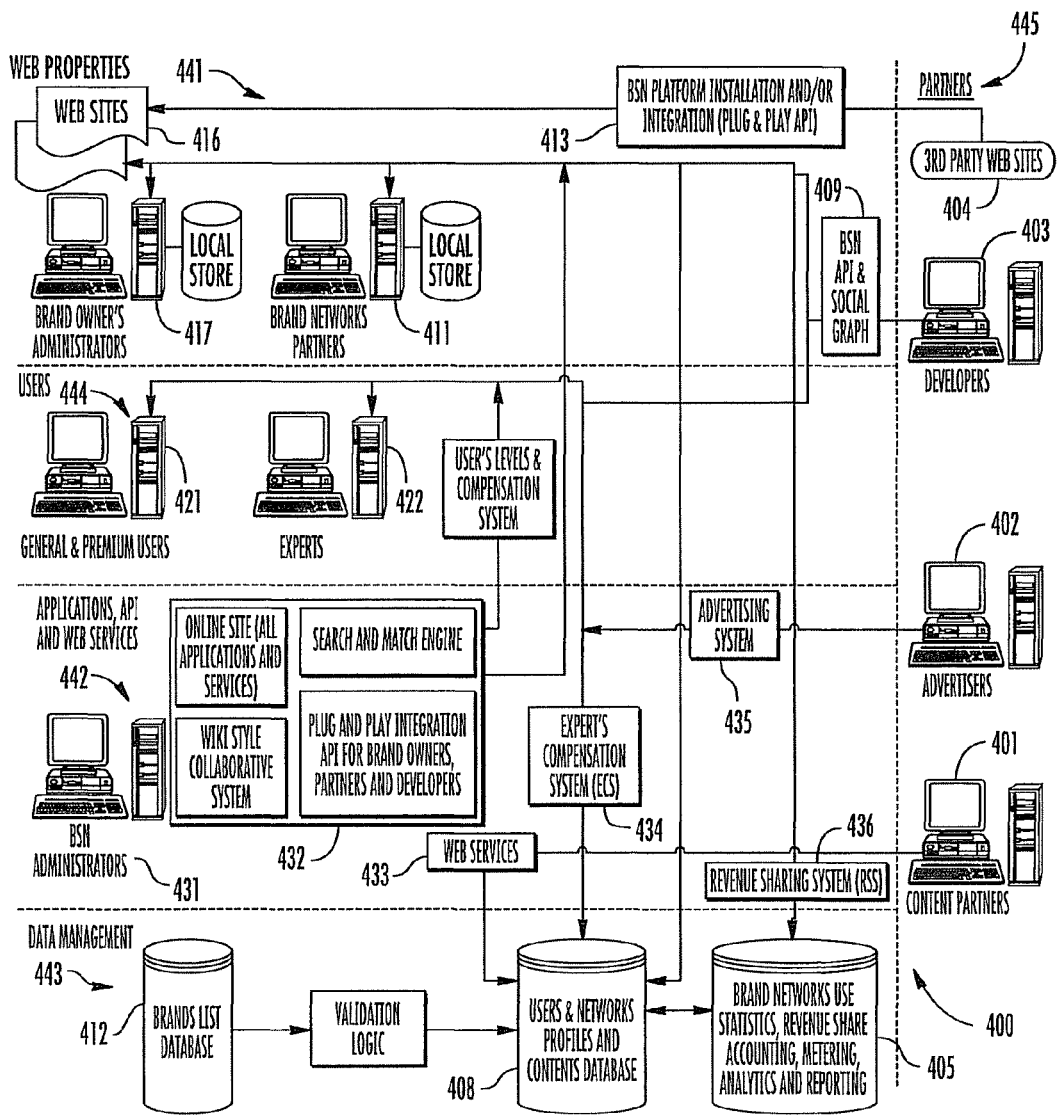
FIG. 4 shows an overview diagram of one embodiment of users Brands Social Networks Platform of the environment of FIG. 1.

FIG. 4 shows an overview diagram of one embodiment of a BSN platform for the environment of FIG. 1. As such, FIG. 4 provides an expanded illustration of BSN Platform 116 and third party Partner servers 106 of FIG. 1. BSN Platform Architecture 400 may include many more components than those shown. The components shown, however, are sufficient to disclose an illustrative embodiment for practicing the invention.

As shown, BSN Platform Architecture 400 includes web properties 441, which represents one embodiment of an expansion of Web Properties Server 114's architecture. BSN Platform Architecture 400 also includes web services 442, which represents one embodiment of an expansion of Web Services Server 112's architecture. BSN Platform Architecture 400 further includes Data Management 443, which represents one embodiment of an expansion of Data Management Server 113 of FIG. 1 and Users Management 444 which represents one embodiment of an expansion of client device 104 and 102 of FIG. 1. Moreover, as shown, BSN Platform Architecture 400 also includes Partners 445, which represents one embodiment of an expansion of 3rd Party Partner Server 106 of FIG. 1. In one embodiment, Web Properties 441, Web Services 442, and Data Management 443 represent BSN Platform 116 of FIG. 1.

As illustrated, Partners 445 may include Revenue Sharing Systems (RSS) 436, Brand Owners 417, Brand Network Partners (3rd party web sites, portals, products and services) 411, content partners 401, Advertise partners 402 and Developers Partners 403. However, Partners 445 is not constrained to include only these types of partner servers/services, and others may be included, without departing from the scope of the invention. Revenue Sharing Systems (RSS) 436, for example, may represent virtually any computing system configured to include third party advertisements, advertisement revenues, or other services that may provide and/or other compensation to BSN Platform 116 based on different mechanisms, including, but not limited to a number of advertisements displayed, pay per click (PPC), cost per thousand (CPM), cost per lead (CPL), cost per action for an advertisement (CPA), mouse over costs, impression fees and revenue sharing for integration of one or more brands networks with brand owners or partners website or portal including pay per join member, pay per sales or ecommerce transaction, pay per visit or action, or the like. BSN Platform 116, and its illustrated components in FIG. 4, may communicate with Revenue Sharing Systems (RSS) 401 using a variety of different protocols, including, but not limited to FTP, HTTP, SOAP, or the like. In one embodiment, information provided by Revenue Sharing Systems (RSS) 401 may be obtained, and/or provided to BSN 116 through Brand Networks Use Statistics, Revenue share Accounting, Metering, Analytics and Reporting and Revenue Share data store 405.

Contents partner 401 represents commerce partners that are in communication with the web services application 433 via one or more protocols, including, but not limited to, 3rd party APIs, FTP, HTTP, SOAP, or the like. Through contents partner 401, the web service application 433 may expose a plurality of e-commerce functions that can be used across multiple websites. It should be noted, that the invention is not limited to contents partners, and other content partners may also be included, such as audio partners, graphical partners, advertising or e-commerce or marketing partners or the like.

As shown, Data Management 443 includes Brands Networks' Use Statistics and Revenue Sharing related Accounting, Metering, Analytics, Reporting data store 405, Users & Networks Profile and Contents Database store 408, and Brand Database store 412.

Revenue Sharing related data 405 represents any storage mechanism that enables storage reporting, and related analytics. In one embodiment, Revenue Sharing related data 405 may include a database, a spreadsheet, program and data, or the like. In one embodiment, Revenue Sharing related data 405 is part of the data management layer of the BSN Platform 116 and can be arranged to run OLAP, or the like, and to provide reporting services. Revenue Sharing related data 405 may also be arranged to store detailed logs from defined partner's and brand owners websites and overlay the logs with revenue data and/or other compensation data that is retrieved from 3rd party advertisement revenue systems. The Revenue Sharing related data 405 can be used for reporting, accounting, and revenue share and/or other compensation sharing of brands networks, partner's websites, and/or other 3rd party websites. Thus, in one embodiment, at least a portion of Revenue Sharing related data 405 may be employed to provide at least some data or other support to RSS 108 of FIG. 1.

Users & Networks Profiles and Contents Database store 408 includes a local database, spreadsheet, file, program, or the like. Content retrieved, for example, by internet search 432 may be stored in content data store 408. The content can be exposed via an internal web application, script, applet, API, or the like, which can be used by a search mechanism to index or otherwise access the stored content.

Users & Networks Profiles and Contents Database store 408 includes a database, file, spreadsheet, program, or the like, for storing information, such as professional content (for some properties), individual and collaborative content, as well as user tips and comments, or the like. In at least one embodiment, the content can be stored in XML. However, the invention is not so constrained, and the content may also be stored in any of a variety of formats. User & content store 408 can also store user account information, transactions, actions, user security information, user profile data, or the like, and provide for retrieval of revenue and/or other compensation specific information from the Revenue Sharing related database 405.

Brands List database store 412 includes a database, file, spreadsheet, program, or the like, for storing information, such as Brands Name List for validating the user created Brand Network legal name. In at least one embodiment, the content can be stored in XML. However, the invention is not so constrained, and the content may also be stored in any of a variety of formats.

Applications, API and Web services 442 include BSN Platform Plug-and-play and integration API, Search Engine, Default and Developers Online, smart online and smart client applications and services 432, media web services 433, and Experts Compensation System (ECS) 434, Advertising System 435, Revenue Sharing System (RSS) 436.

Internet Search Engine 432 includes an internal search appliance, crawler application, and/or spider application, or the like, that crawls and indexes one or more network sites to find different types of content, e.g., "how to" content, or the like, on websites that may be controlled by the BSN Platform 116. The content may be stored locally in a database and made available via the Media web services 433. Internet search engine 432 may further allow users to search through the content generated by and residing in BSN Platform 116.

Media web services 433 is arranged to include content retrieval, tip/comment retrieval and submission, user registration and login, publication creation, publication edits and wiki functions, e-commerce products, internal searches, content searches across the web, or the like. Thus, in one embodiment media web services 433 is configured to provide user interface screens to enable a user to register for and use the invention to create and publish content. In one embodiment, media web services 433 provides the user interfaces such as those described in more detail below. Moreover, in one embodiment, media web services 433 can enable caching of content and other information for fast retrieval by a user, administrator, or the like.

Wiki platform 432 includes a wiki type platform to enable collaborative development of web content. In one embodiment, wiki platform 432 may operate substantially similar to the wiki media open source platform for creating brand specific collaborative content creation or editing, submission or publishing and filtering. In one embodiment, wiki platform 432 may provide editing, and/or formatting tools, version control tools, or the like, as well as rules, procedures, policies, security, or the like, for its use. In one embodiment, wiki platform 432 may be included within BSN plug-and-play 413. In one embodiment, a user may access wiki platform 432 though media web services 433.

BSN Platform plug-and-play integration API 413 provides a series of forms, scripts, code, applets, or the like. In one embodiment, the forms can be embedded in a client application, interface, or the like, such as through javascript, iFRAME, or as a hosted ASP application. BSN Platform plug-and-play 413 can communicate with the media web services 433 using SOAP, or virtually any other protocol, to enable its functions, including user registration and login, or content creation and submission. This layer of the system can maintain forms used to submit different content formats. It can also act as a central management server to manage logins across different websites.

Web properties 441 include websites 416, RSS 436, and Plug & Play API 413. RSS 436 includes virtually any mechanism configured to enable a website to log viewing traffic and/or clicks, mouse-overs, feedback, or the like. The RSS may, in one embodiment, be continuously written to cache and/or periodically written as XML, or the like, to disk. In one embodiment, a separate service may access the logs from disk and write them to a logging database, such as Revenue sharing related data store 405, or the like.

Websites 411 represents websites that employs BSN Platform 116 to enable retrieval of content and to perform related BSN Platform functions via communication with the media web services 433. In one embodiment, plug and play code may be employed by websites 411 and 417 to manage user logins, and/or related account services. Websites 411 and 417 can also be used for creating new brands networks, registration of new members and generating new content and enabling users to edit existing content collaboratively using various tools and user interfaces provided by web services 431.

One embodiment of code 413 includes client side javascript code configured to enable "injection" of forms, or the like, into a client's website i.e. brand owner or partners web site or portal or products or services. In one embodiment, code 413 may perform such injections using one or more mechanisms, including, for example, iFRAME. Code 413 may be further configured to enable management of user logins, sessions, and/or content creation. Once code 413 is injected or otherwise provided to the website, the user can customize parameters associated with its use. Use of code 413 may then provide the user with access to user interface screens, such as those described below, for use in managing brands networks and content publications through the BSN, and/or managing Revenue sharing through the RSS. In one embodiment, the BSN Platform may be configured using an Application Service Provider (ASP), or the like, where the brands networks and related publishing of various contents, applications and services may then be hosted on, for example, a 3rd level domain name and/or configured to hosts a user Interface of the client's website. In one embodiment, a user session may be maintained between the client website and the BSN Platform though use of cookies. However, the invention is not so constrained, and other mechanisms may also be employed. Moreover, in one embodiment, the communication between the user and the BSN Platform and/or BSN Platform interfaces may be over a secure network connection, using for example, SS/TLS, or other secure tunneling protocols.

Websites 416 include those websites that may be managed or otherwise controlled by the operators, administrators, or the like, for the BSN Platform. In one embodiment, website 416 may include a local data store 417. Local data store 417 may be employed, for example, to store and/or manage professional content that may be written in multiple languages for use in running on a plurality of different platforms. In one embodiment, websites 416 may be able to access media web services 433 to retrieve individual and collaborative content. Websites 416 may also access for use other components within online, smart client, API and web services 442, including for example, the BSN plug-and-play 413 to manage user logins, profiles, and/or to create new brands networks and publications or other content, and/or to comment on existing content.

Generalized Operation

Figure 5:
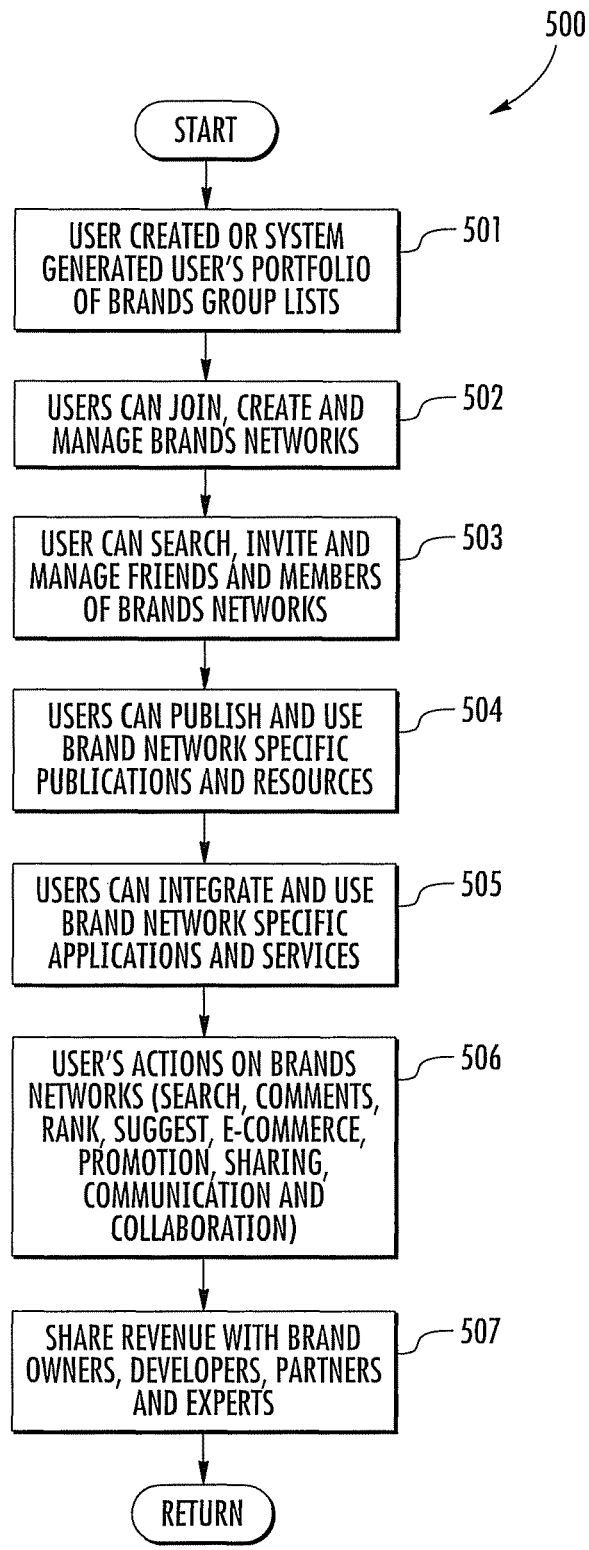
FIG. 5 illustrates a flow chart of an overview of a process for the Brands Social Networks (BSN) Platform.

The operation of certain aspects of the invention will now be described with respect to FIG. 5. FIG. 5 illustrates a flow chart of an overview of process 500 for the Brand Social Networks (BSN) Platform. Process 500 may be implemented within a single computing device, such as described above in conjunction with FIG. 3. Process 500 may also be distributed across a plurality of computing devices, such as described in conjunction with FIG. 1, above.

In any event, process 500 of FIG. 5, may begin, after a start block, where users manually or automatically create their Portfolio of Brands Groups Lists via Brands Groups Lists Generator and join or create related and selected brands networks 502. Further, BSN users can manage and invite friends and members of brands networks to grow the networks 503. Users or Members of brands networks can Publish and use other users Publications 504. In one embodiment, the user may initially interact with various user interfaces to the BSN Platform to access applications, services, API, scripts, tools, applets, or the like, for use in creating and managing Brands Networks, managing contents for publication 505 and registered user can take actions on brands networks and related contents including comments, rank, flag, review, and like 506. In one embodiment, the user may initially perform a registration as described in conjunction with the user interface screens below.

The user may then provide content to the BSN Platform using such additional screen interfaces, applications, or the like, provided by BSN Platform. In one embodiment, the user may provide the content using a variety of different formats, using a variety of different computing languages, or the like.

Processing then moves to block 504, where content may then be published onto and/or through the variety of Brands Networks, and/or other communication mediums, as described above. In one embodiment, the user providing the content may indicate where the content is to be published. In another embodiment, a website, or communication medium provider, or the like, might determine which content is to be published, where, and/or when. In still another embodiment, an advertisement provider, or other third party content providers, may also influence where, when, and/or how the user's content might be published.

Moving to block 507, Revenue Sharing tools are employed to monitor metrics useable in determining if and/or when to provide compensation to an expert content provider and revenue share to website owner including brand owners and partners websites or portals or products or services. Such determination, as noted above, may be based on a variety of metrics, including, but not limited to pay per actions or transactions or visits or leads, clicks, mouse overs, and feedback regarding the content, website, or the like.

Process 500 then flows to block 507, where compensation may be provided to the content provider of block 504. As noted above, the compensation may be provided based on exceeding a threshold value, exceeding a time period, or any of a variety of other defined criteria. While the above discussions may indicate that compensation may be provided in terms of a financial compensation, the invention is not so limited. For example, compensation may also be provided as discounts in other products and/or services. Moreover, in one embodiment, where an expert content provider has obtained a reputation for quality contributions of content, the expert content provider may also receive compensation in terms of being able to influence which advertisements might be associated with their published content, where the content is published, or the like. Thus, compensation may be reflected to the content provider in a plurality of different ways, without departing from the scope of the invention. In any event, process 500 then may return to perform other actions. For example, in one embodiment, process 500 may be repeated each time a user creates or generates Brands Group Lists, Creates or joins selected preferred brands networks, searches & invites friends and grows the brands networks, publishes brand network specific publications and uses other members publications, manages profiles and attaches-detaches application and services, takes actions on brand networks, members and publications like ranks, comments, blocks and removes. BSN shares revenue with partners web sites, Application provider Developers, Content providers, Experts and Brand owners, or the like. Moreover, process 500 may be performed per user, or collectively for a plurality for users.

It will be understood that each block of the flowchart illustration, and combinations of blocks in the flowchart illustration, can be implemented by computer program instructions. These program instructions may be provided to a processor to produce a machine, such that the instructions, which executed on the processor, create means for implementing the actions specified in the flowchart block or blocks. The computer program instructions may be executed by a processor to cause a series of operational steps to be performed by the processor to produce a computer implemented process such that the instructions, which executed on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative User Interfaces and Site Mapping

The operation of certain aspects of the invention will now be described with respect to various embodiments of user interfaces to the BSN Platform. FIGS. 6 to 10 shows a detail overview diagram of one embodiment of a process site map for the BSN platform. It should be noted that the BSN Platform may be employed by different brands, trade names, users, or the like. Thus, a plurality of different users may simultaneously and distinctly employ the BSN Platform in a variety of ways. In another embodiment, different websites and/or other communication mediums may be used. In one embodiment, arrangements of websites, or other communication mediums may be based on a third party's linking agreement, or the like, including agreements based on logo displays, link references, or the like. In several embodiments, a user may be provided a website based on tab interfaces, page templates, or the like.

Figure 6:
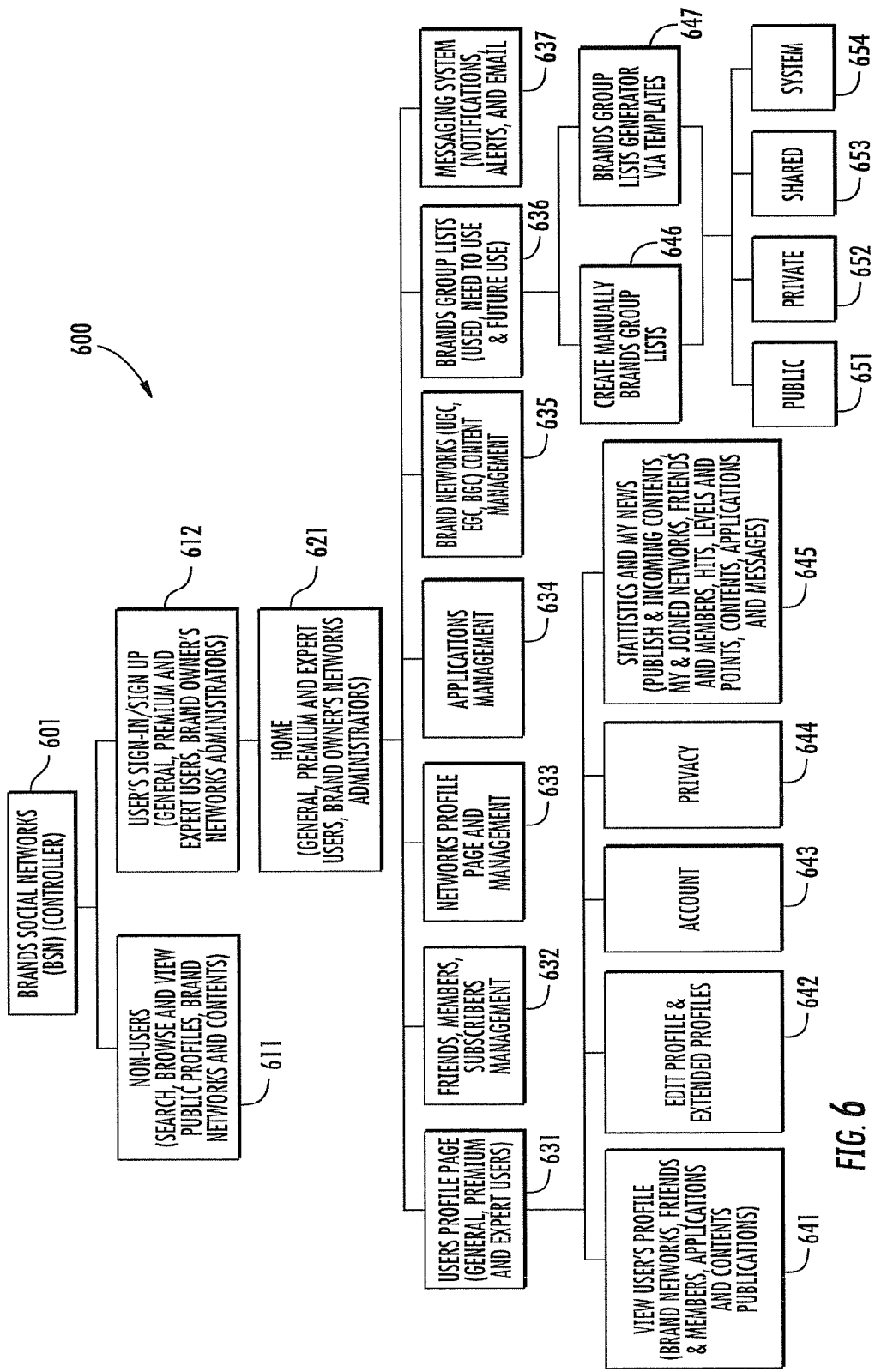
FIG. 6 illustrates a flow chart of a detail overview of a process for the Brands Social Networks (BSN) Platform.
Figure 7:
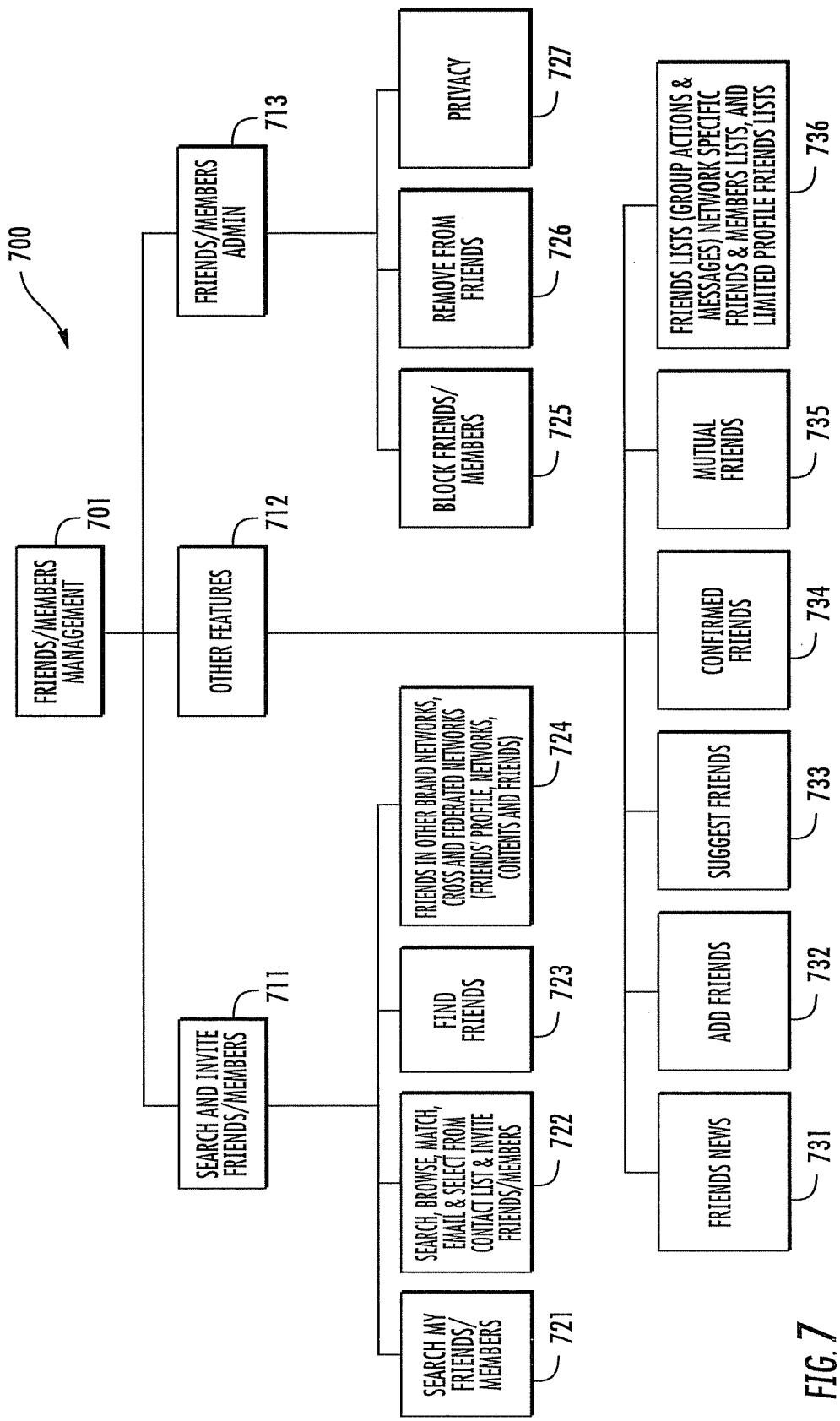
FIG. 7 illustrates a flow chart of a Friends and/or Members Management of a process for the Brands Social Networks (BSN) Platform.
Figure 8:
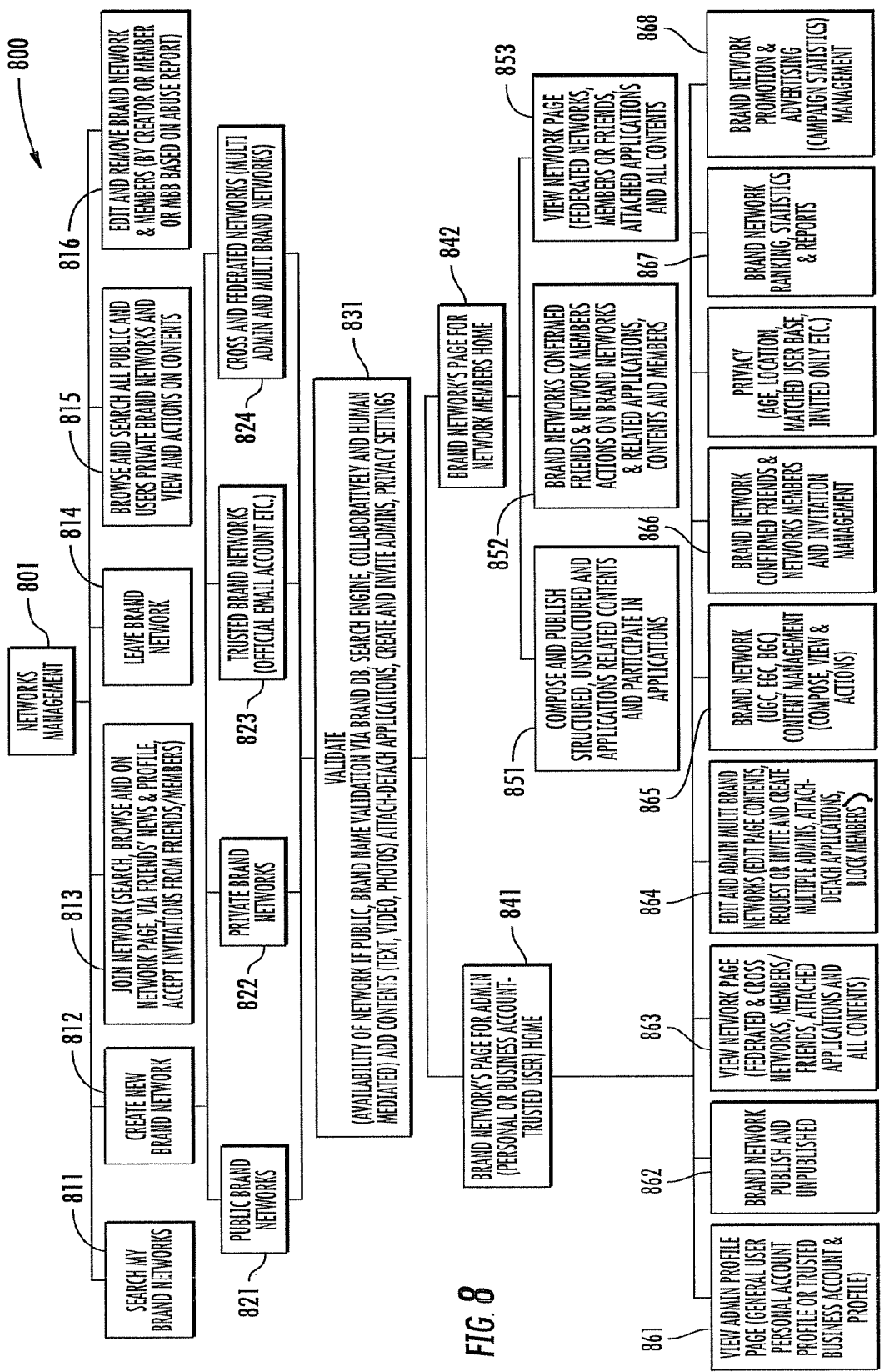
FIG. 8 illustrates a flow chart of a Brand Networks Management of a process for the Brands Social Networks (BSN) Platform.
Figure 9:
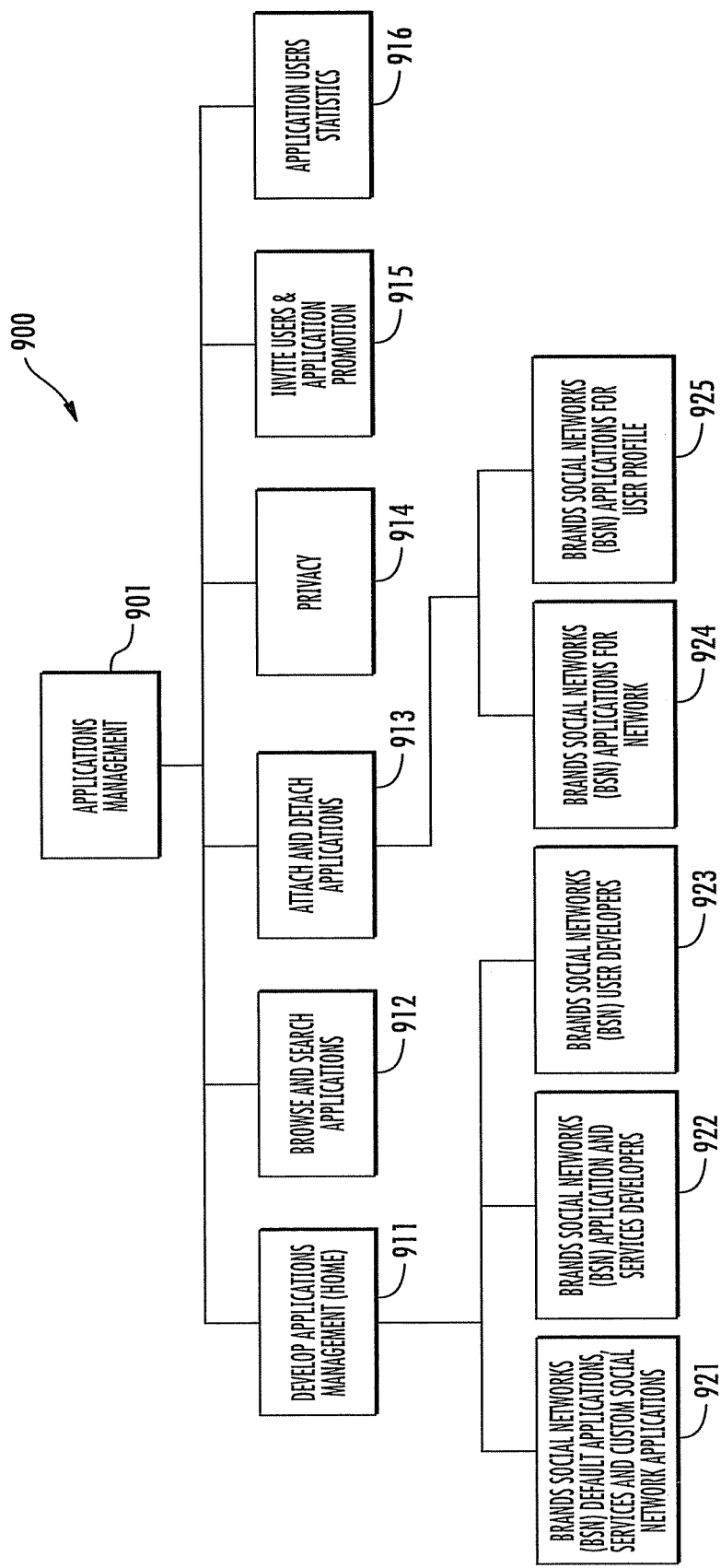
FIG. 9 illustrates a flow chart of an Applications Management of a process for the Brands Social Networks (BSN) Platform.
Figure 10:
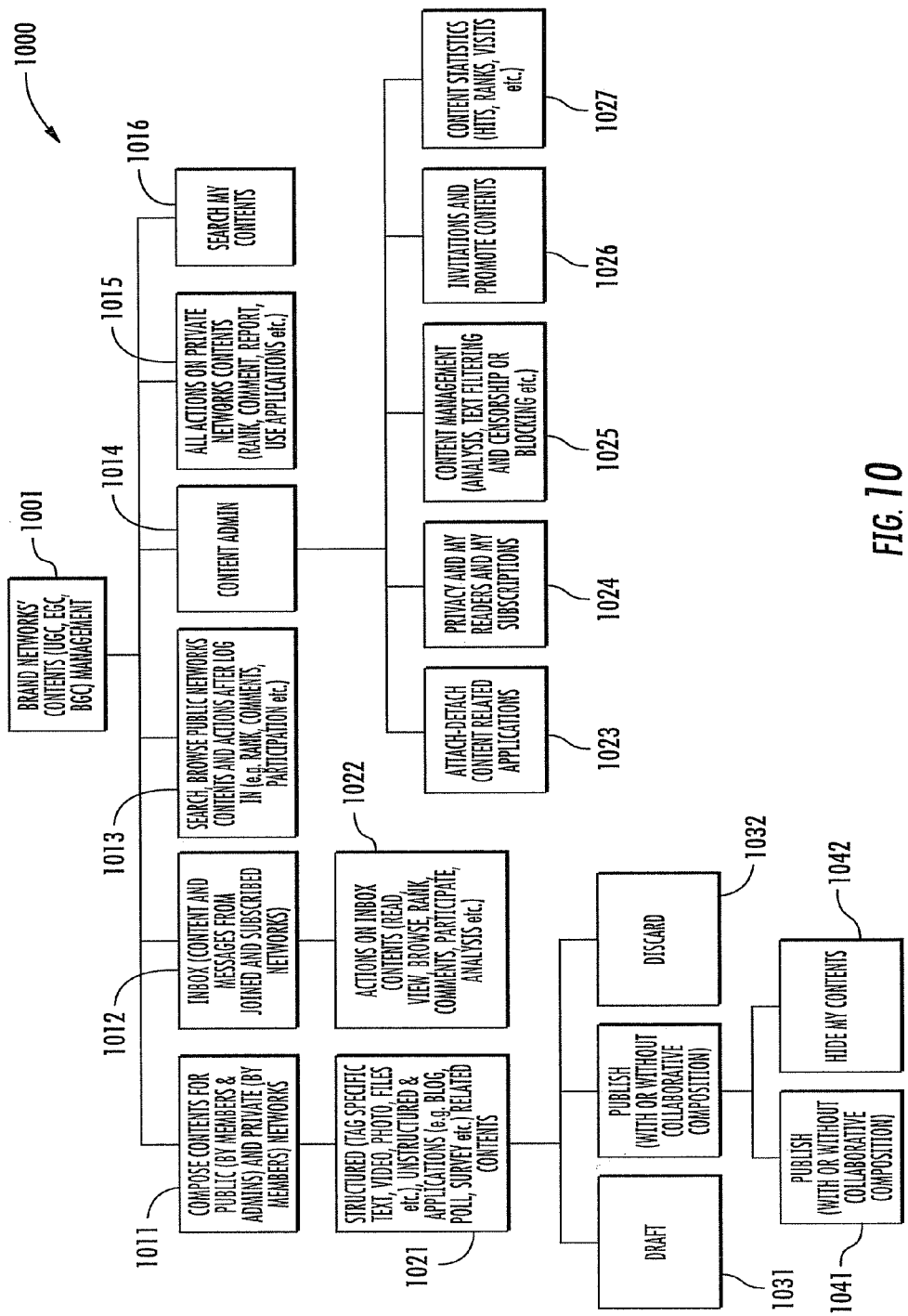
FIG. 10 illustrates a flow chart of a Brand Networks related Content Management of a process for the Brands Social Networks (BSN) Platform.

In any event, FIG. 6 provides an overview of various interfaces, and process actions that a user may employ while creating and managing Brand Networks and/or Publishing Content. Site map 600 of FIG. 6 shows an example of websites 601 useable for accessing, creating, and/or otherwise managing Brand Networks and content for publication. As noted, more or less websites, as well as a variety of other communication mediums may also be employed.

As shown, site map 600 identifies a holistic view of variety of possible actions of Brands Social Networks (BSN), including performing browsing and searching of Users Profiles, Brands Networks and related Contents by registered users as well as Non-Members 611 and obtaining search results, performing registration and performing logins 612, after login system displays User's Home Page 621 including management and all types of User Statistics, Friends and Members or subscribers management 632, Users Brand Networks management 633, Applications management 634, Publications contents management 635, Brand Group Lists management 636 including create Brands Group List manually 646 and Brands Group Lists generates via templates 647 and all Brands Group Lists of user's includes public 651, private 652, Shared 653 and public 654, messaging management 637 and User's Profile Page management including Profile's Public View 641, Edit Profiles 642, Account Settings 643, All Privacy Settings 644, All Statistics and News 645.

As shown, site map 700 identifies a variety of possible actions for Friends and Members Management, including search and invite friends or members to join the BSN or BSN Brands Networks or participate for any other activities or actions 711 including search user's friends or members from friend lists 721, various invitation logic or method or system to invite friends via e-mail or search or contact list and like 722, Find friends 723, Invite friends' friends or members from other brands networks 724, Other features 712 including all friends updated news 731, Add member as friend and request to accept as friend. If request accepted friend automatically add to users friends list 732, Suggest or introduce a particular friend to other friends of user 733, accept request from other users or members and confirmed them as friends 734, Mutual friends 735 and User created Friend Lists 736.

As shown, site map 800 identifies a variety of possible actions for Brand Networks Management, including Search User's all created or joined public or private Brand Networks 811, Create New Public 821 or Private 822 or Trusted 823 or Collaborative or Federated 824 Brands Networks, Anybody can create Public brand network and is unique network for particular brand, but brand network is owned by BSN administrator or brand owner. User can create (N) numbers of private brand network and invite friends or members to join a network. To access or create trusted network user has to provide official E-mail ID or any trusted identification information. Collaborative or federated brands networks are created by multiple brand owners via mutual collaboration agreements and user can also create federated brands group list. Before creating a particular Brand Network, BSN validate brand network name with Brand name database and via other logic or algorithm or method or system e.g. with popular search engine, human agents or collaborative users filtering or user flag or comment or complaint and confirm availability of Brand network 831. User can Join already existing public or private Brand Networks via Search and browse options and All types of News, invitation from users, members, experts, friends and brand owner's administrators 813, Leave Brand Network 814, Browse and search all public Brand Networks of BSN and read, review, rank, comment on contents for registered users of BSN and Non-Members or Public Guest User 815, Remove or hide or un-publish Brand network by creator of brand networks or BSN Administrators based on abuse report or Brand owners administrators 816. After creating Brand network successfully Brand Networks administrator can view administer profile 861, Publish or un-publish brand network 862, view brand network page including all brand related details, attached applications, list of members and publications 863, edit brand network page to create administrators, attach applications and services, publication and contents 864, Brand Network specific Publications Management, Analysis, User Action like comments, Ranks and Review 865, Invite members to join brand networks and related management 866, Set privacy settings regarding eligibility of membership of brand network like age restriction, particular location only and other preferences 866, View Brand Network's statistics including Brand Network Page Hits, Unique visitors for particular period and from particular location, application users, publication readers or subscribers 867 and promote Brand Network via BSN advertising systems. Brand Networks joined members 842 can compose structured, free form and application specific content publications 851 and participate or take actions including comments, ranks contents, communicate with members 852, view or access brand network and use related applications and services 853.

As shown, site map 900 identifies a variety of possible actions for Applications Management, including application development and deployment management 911 includes BSN default application and services for Users and Brand Networks Profile Page 921, BSN Developers 922, User created applications integration 923, Browse or search applications by User or Brand Network Profile Page (category and location wise) 912, attach or detach applications 913 with particular user's 924 or brand network's profile page 925, set privacy regarding application including Control what information is available to applications, share profile information, Block applications and ignore application invitations 914, Invite application users by application developers to all or related users via promotion 915, View applications related statistics including number of installation, hits, visits 916.

As shown, site map 1000 identifies a variety of possible actions for Users or Experts or Brand owner administrators or editors or partners Generated Content Publications Management including composing content publications 1011 including structures, free form and application specific composition systems 1021, publisher or user or author or writer or editor or administrator or expert can publish or draft 1031 or publish publication with or without collaboration settings 1041 or discard publication 1033 or hide published publication 1042, all incoming contents from all subscribed or joined brand networks come to Inbox 1012 and user can read, use and take actions on published contents like rank or comment or flag 1013 and 1015, user can search all published or Inbox publication contents 1016 and take actions or analysis of all incoming contents from all joined brand network sources 1022, content publication publisher can administer 1014 the all publications including attach application with publication 1023, set privacy for subscriptions 1024, Administrator can do Content Management function like user's comments and review analysis, user generated content filtering, censorship and block user 1025, invite members or readers or subscribers and promote the publication via BSN advertising systems 1026 and view or analyze statistics 1027.

Many of these actions are described below in conjunction with FIGS. 11-32.

FIG. 11-31 show different screen shots style drawings of various embodiments of user interfaces for employing the Brands Social Networks (BSN) Platform, in accordance with the invention. It should be noted that the following illustrations are not intended to limit the invention. Instead, they are intended to merely provide an overview non-exhaustive understanding of how the invention may be employed.

In one embodiment, a user may interact with the BSN Platform using virtually any browser application or smart client or smart online applications, including, but not limited to Internet Explorer (IE), Firefox, Opera, Safari, or the like. Moreover, as described above in conjunction with FIGS. 1-2, the user may use any of a variety of client devices.

As mentioned in conjunction with site map 600 of FIG. 6, a user may initially register for use of the BSN Platform. In one embodiment, one username/password can be provided to a user to allow access to all website properties of the BSN Platform including BSN international or BSN Country or region specific or BSN Local or Brand Owners or Partners' website or portal or products or services. In one embodiment, username and email addresses can be used as unique identifiers including trusted identifications like official e-mail id or mobile phone number or any other trusted id system for each registration. Moreover, a user may perform multiple concurrent logins to the BSN System.

As websites are acquired, the usernames/passwords of their customers/users can be imported into the BSN registration database as soon as it's appropriate to do so. In one embodiment, a customer messaging may take place before doing this. In one embodiment, self-registration in a defined website can be defined for "General User" or "Expert User" or "Brand Owner Admin" or "Network Member". In another embodiment, administrators could continue to be registered via an Administrator Tool. In one embodiment, however, to join or create brand networks, use user profile and contribute publications contents of any kind (article, tip or comment), a user may first self-register.

One embodiment of a screen shot of a login window 1100 is illustrated in FIG. 11. In one embodiment, a root level webpage for websites 601-1101 can have a prominent button or link called "Log in or Register." This link can be pervasive through all screens on the websites. Clicking on this button can generate the login screen, which can have a link or button to "Create a New Account". Clicking on this button, in one embodiment, produces the Registration Page. In one embodiment, if a user has not logged in and they attempt to contribute content (for example, by clicking on "My Brands Resource Book" or "Comment on Publication" or the like) the Login Page can appear. Logout links may take place of "Login" links after the user has successfully logged in. After clicking on logout, the user may be taken to the one of the website's Home Page. In one embodiment, the user's browser can prompt the user whether it wants to remember the username/password for the next visit.

FIG. 11 illustrates one embodiment of a screen shot of a registration interface 1102. If a required field is left empty in the quick registration interface, or if the password fields do not match, the fields that are to be fixed may be indicated in some manner, e.g., red text, entry area highlighted, or the like. Users may choose to view the Terms of Use and Privacy Policy before proceeding, in one embodiment. If the user clicks on either of these links, a new daughter window can appear with a "Close" button at the bottom of the text. Moreover, users can be told that their registration request failed if the birth date that they enter makes them less than some defined age, after they click on "Continue."

FIG. 1102 illustrates one embodiment of an interface useable for managing user registration. Thus, in one embodiment, after clicking on "Continue" on a previous page, an email is sent to the user's registered email account. Screen may then be displayed in the browser. All fields shown in screen may be optional. Clicking "Save" at bottom of a form generates an alert message interposed on the "Home Screen" for the site, telling the user to check their email for the confirmation message so they can log in.

If the user is not logged in after launching the confirmation page, then their first login can take place on their first attempt to create brands group lists, join Brands Networks or Publish and Subscribe Publications, whether it is a create new brand network or new publication or an update to their profile. Moreover, the BSN System provides for situations, where the user may have forgotten their password. Thus, a "Forgot Password?" link can appear next to the password entry field for login. Clicking on this link can produce a field requesting username OR email address they registered with and a submit button. Providing registered email address and clicking on "Submit" can cause the user's password to be sent to their registered email account.

Typically, collection of statistics begins for the registered user immediately upon completion of registration. All ratings, comments, publications submissions, or the like, may be traceable/displayable back to the user, as well as all revenue-generating activity related to the expert user (pageviews, click-throughs, or the like). In one embodiment, a mechanism for bulk importing a set of user registrations from an acquired company or brand owners or partners may be provided. The process can flag duplicate usernames and can allow for the acquired user to change their username to something unique to preserve their account history. Moreover, in one embodiment, logging subsystems of the BSN system may track abandoned registrations. User can also browse and search categories brands networks and related contents and people or user or member or friends profiles from home page 1103, 1104 and 1105.

Figure 12:
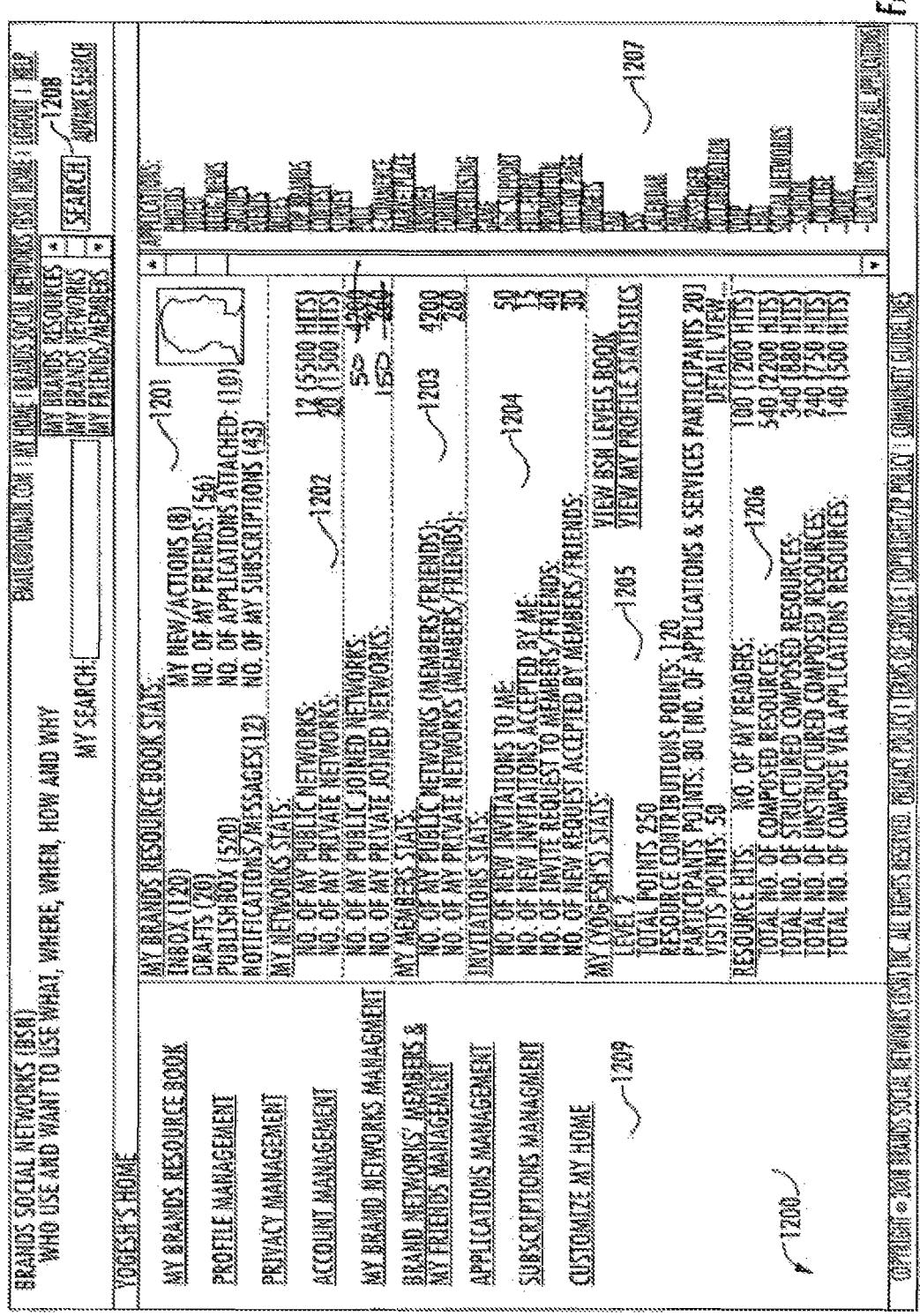

FIG. 12 illustrates one embodiment of a screen 1200 configured as a possible home screen of BSN registered User managed by the BSN Platform. Screen 1200 enables users to obtain an at-a-glance view into the parts of their presence on the site; and obtain a convenient means of managing Profile, Privacy and Account Settings, Brands Networks, Friends, Applications and Publications 1209 and All Statistics including User's Levels, Points and Ranks 1205, Number of Friends and joined Members 1203, Public and/or Private Brand Networks 1202, Publication Viewers or readers hits or visits 1206, Invitation accepted and requested 1204, publications in Inbox, publications published, Applications attached with profile, News, subscriptions, notification and messages and associate lists and invoking links 1201.

Figure 13:
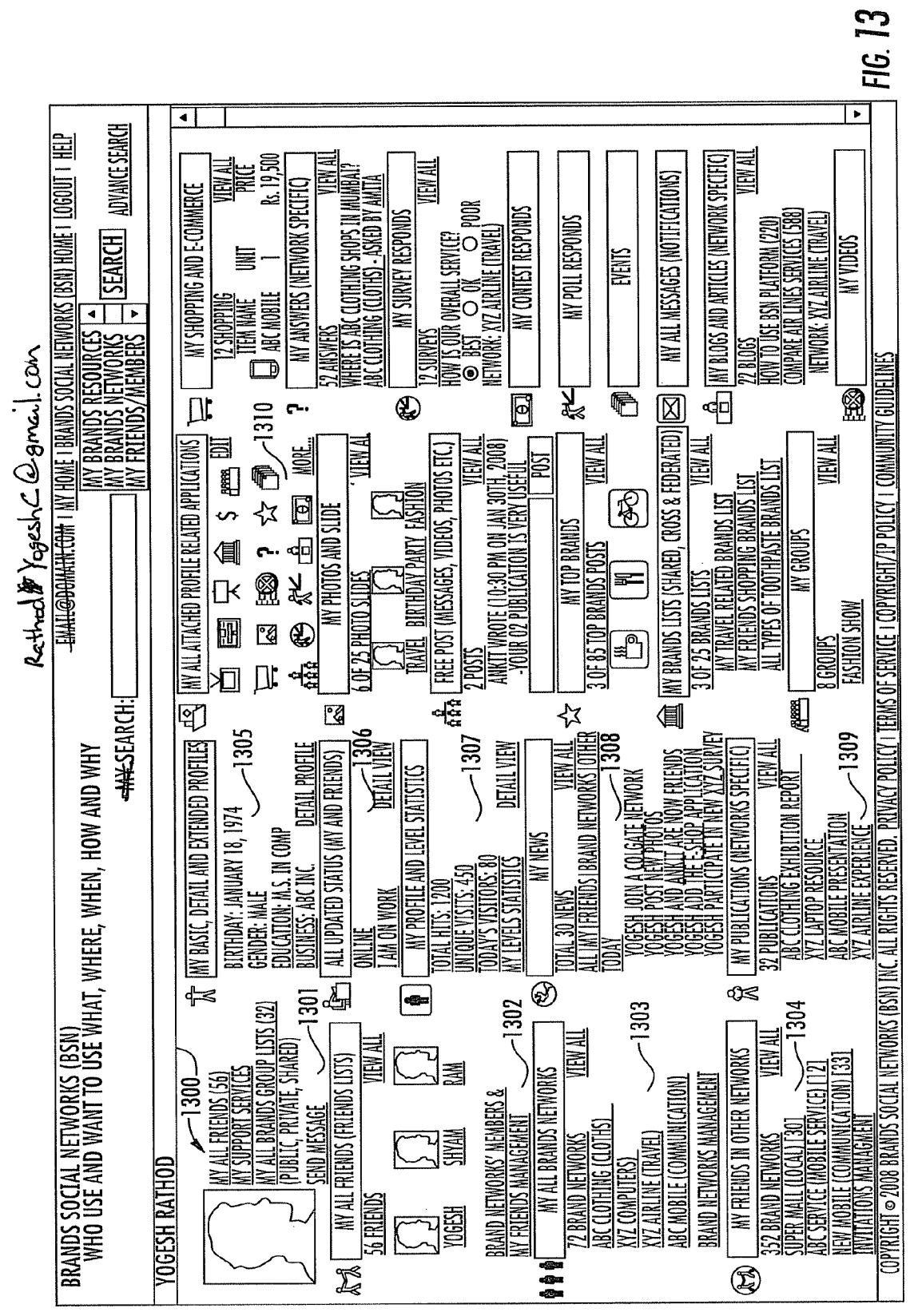

FIG. 13 illustrates embodiments of screens 1300 useable to public to view the user's profile page displaying profile picture and all Friends and Brands Group Lists link 1301 and list and profiles links of all friends 1302, Created and joined all public and private Brands Networks list 1303, Friends in other networks list and profiles links 1304, user's details, user's 1305 and all friends status 1306, updated statistics 1307, My News 1308, all types of publications 1309 and all attached applications and services 1310 including Photos, Top Brands, Groups, Answer, E-commerce, Survey, Contest, Poll, Events, Blogs and Videos and like with User's Profile Page. User can set privacy setting to control who can see profile page.

Figure 14:

FIG. 14 illustrates embodiments of screens 1400 useable to manage the user's 1401 and expert's profile 1405 and extended profiles 1403 including work profile 1402 and Education Profile 1406. Prior to publication, a process can be applied to the Location and Description fields to scan for HTML and/or offensive content. If the profile includes HTML, or offensive language/content, an alerts message can appear to the user after they click on "Save My Profile" telling them to check for at least one of these two conditions and resubmit after editing. Note that all uploaded images can be reviewed via a Picture Queue. Uploaded images can be published to the public site immediately with the finished profile, but if an image fails review, a generic placeholder image can be substituted on this page and the user's public profile page. The user can subsequently upload another image that meets the BSN System standards (published in a FAQ). An email can also be sent informing the user that this action took place against their submitted image 1407. User can also specify and updates relationships information 1404.

Figure 15:
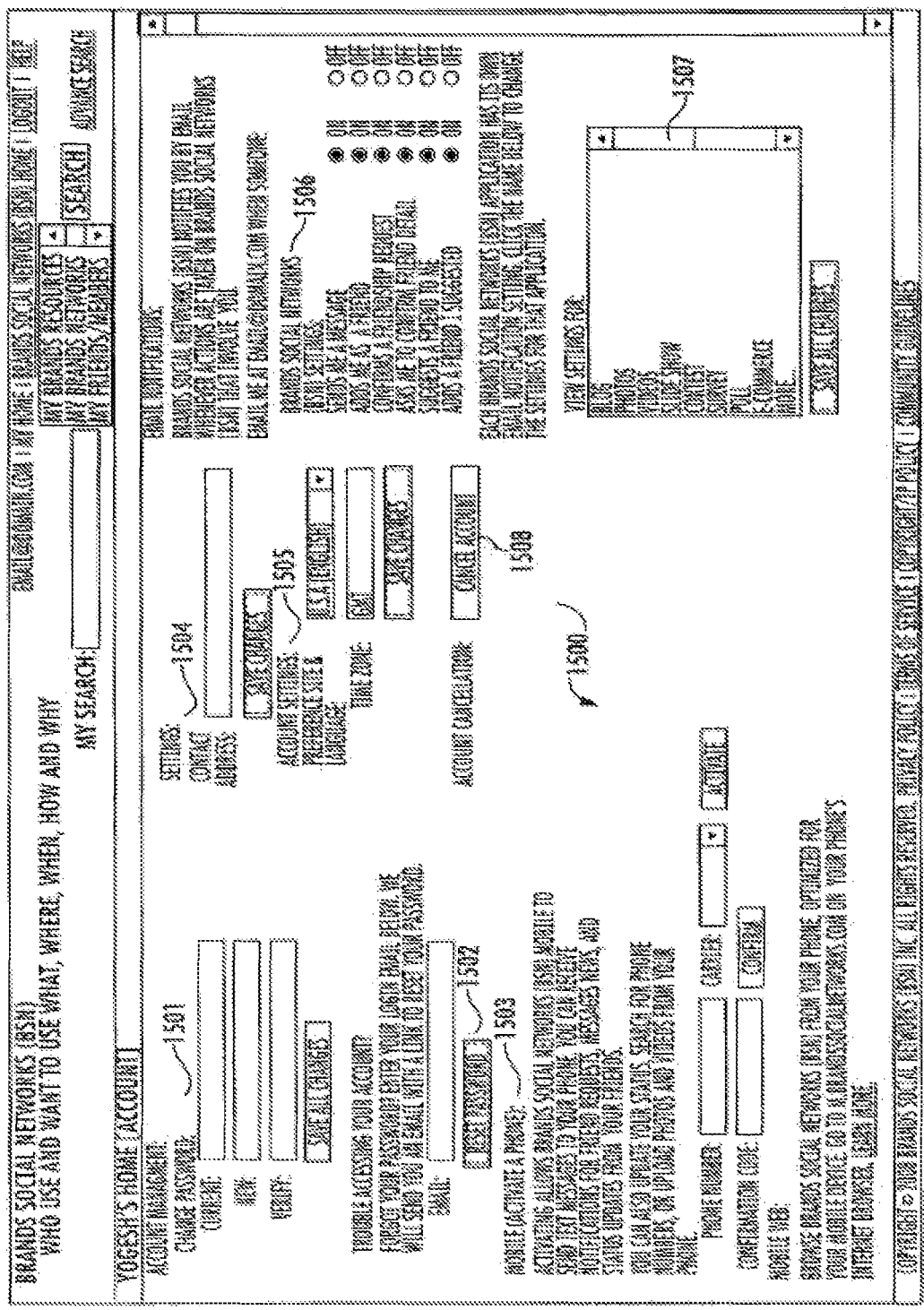

FIG. 15 illustrates embodiments of screens 1500 useable to manage the user's Account settings including change password 1501, reset password 1502, BSN mobile website activation settings 1503, change email contact address 1504, preferred site and language settings and time zone 1505, notifications related settings including sent notifications when add users as friend, when user confirm friendship request, suggest friends and like 1506 and all attached applications specific settings 1507. A facility may be provided to a user to remove their profile from the system 1508. When the user selects this option from their Profile Page, the following actions can take place: they are shown a confirmation alert that they click-through; if they click no, they are returned to the Profile Account Settings page; if they click yes, their profile is taken down off the public site, all publications and comments attributed to them can also subsequently revert to "site Friend;" account information, Brand Networks membership information and publication/comment attribution can still be stored in the database, but may only be displayable on the user's Control Panel; User can still login using their credentials and make their profile and attributions "public" again at any time. In one embodiment, expert user earnings from their services and publications can continue uninterrupted regardless of whether their profile is public or not.

FIG. 16 illustrates embodiments of screens 1600 useable to manage the user's Privacy settings including control who can see user's profile and related information. Users can customize privacy settings from the Privacy page from which user have total control over who can view all of contents. At most, only user's friends, their friends and the people or members on user's networks can see user's profile 1601. Users can adjust who can find user in searches and what they can see or do with users search result via settings for Search Privacy 1602. User can adjust Search privacy options by clicking on "Edit Settings" in the "Search" section of the Privacy page. From this page, user can restrict who can find user in many different ways. The default option is for everyone on BSN to be able to find user in searches. User's Profile privacy setting determines who can actually view user's full profile. BSN also offers more restrictive search privacy options, the only people who can find in searches are all the people in brands networks and all friends, some of the people in brands networks and all friends, or just user's friends. If user select "Some of my networks and all my friends" user will get to select which networks can find user in search and which cannot. From the Search privacy page, user can also establish what people can see about user. User can also restrict profile picture to appear in search results. User can also prevent the people who find user in searches from messaging user, adding user as a friend or viewing user's friends list. These settings only apply to people who are not permitted to see user's profile (i.e. people who are not friends or on any of brands networks). User can also set privacy settings for Publication i.e. who see or use which publications and subscription 1607. User can also control incoming publications i.e. who sent what publications to me 1606. User control brands networks membership i.e. who is eligible to join user's brand networks 1609. User set privacy setting for attached applications and generated data and actions 1603 and Block applications and ignores applications related invitations 1610. User can use the Block feature to end all interactions with a user on BSN by entering their name in the "Block Users" box 1608. Once user finds them in the search, click the "Block User" link to the right of their name. They will no longer be able to find user using BSN. By default, only users or members within user's brands networks and confirmed friends can view user's profile. On the most private setting, "Only Friends," only users who are confirmed friends will be able to view profile. User can restrict all news and actions related content 1605 and who contact user via see user's picture, send message, add user as friend and view friend list 1604. User can create private or personal brands groups lists or share selected Brands group lists or make them public for collaborative editing and updating and set privacy settings to control who see or update selected or particular brands group lists 1611.

Figure 17A:

FIG. 17 illustrates one embodiment of a screen 1700 configured as a possible home screen of BSN registered Brand Owner's Administrator managed by the BSN Platform. Screen 1700 enables Administrator Users to obtain an at-a-glance view into the parts of their presence on the site; and obtain a convenient means of managing All created brands networks including publish publications, attach and detach applications and services, censor and filter user or member created contents, analysis, Members or customers relationship management, customers services life cycle management, network invitation and promotion management and like 1702, All publications and incoming brand network specific contents from members, News, Notifications and Actions 1701 and managing Administrator's Profile, One or more Brand owner's Brand Networks, Privacy and Account Settings, Statistics, Levels or Points or Ranks, Brand Networks Members, Applications and Contents related Composition, Publications 1703.

Figure 18:
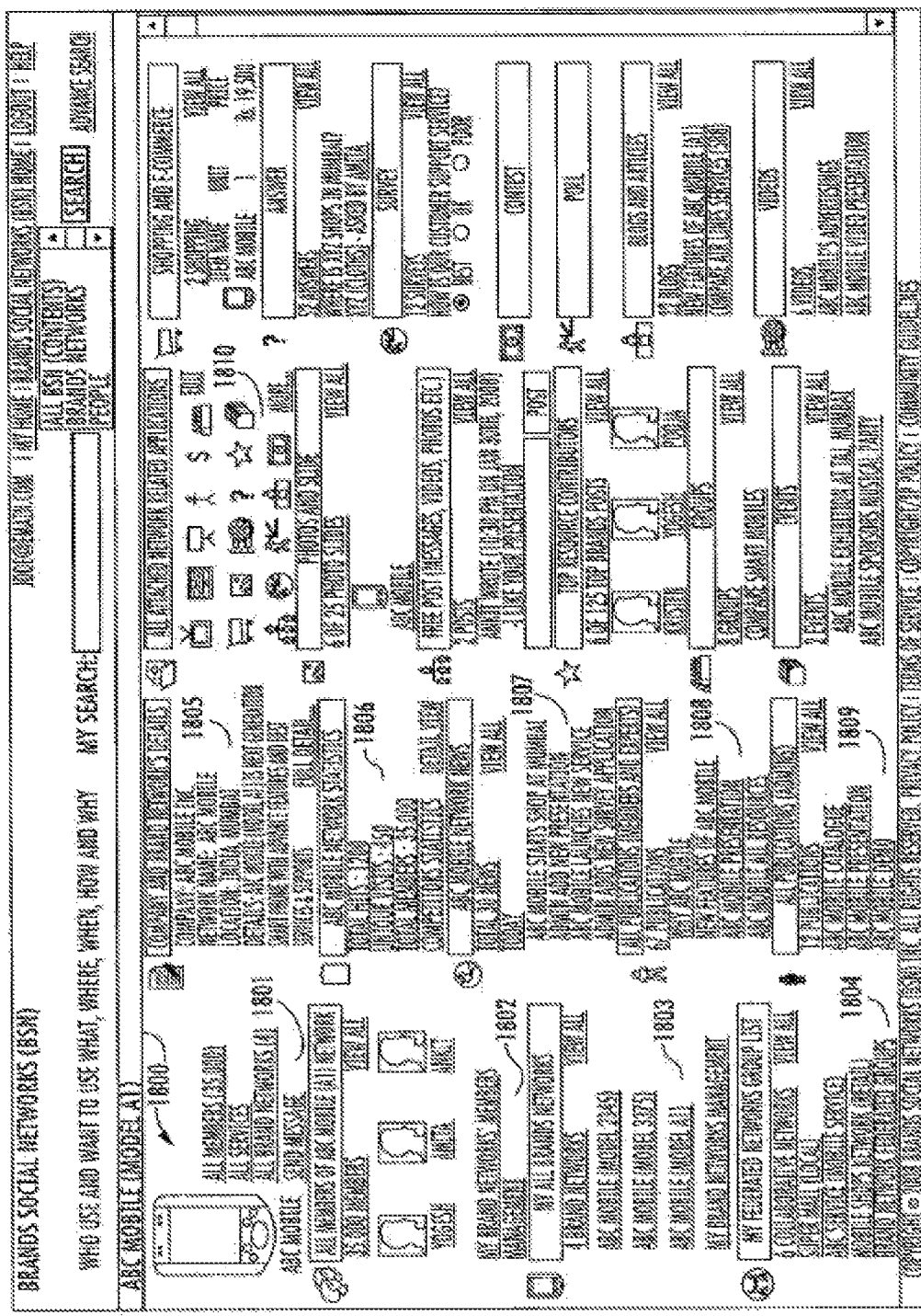

FIG. 18 illustrates embodiments of screens 1800 useable to public to view the Brand Network Page displaying product or service picture or image 1800, all Brand Network's Members list and profiles links 1802, All Public Brand Networks Group List of authorized Brand Owner 1803, Federated and Collaborative Brand Networks Group List 1804, Brand Owner and Brand's details 1805, Brand Network's Statistics 1806, News 1807 and all types of publications from all administrators 1809 and content authors, experts and members 1808 and all attached applications and services with Brand Network's Page 1810. Administrator can set privacy setting to control who can see what part of Brand Network Page.

FIG. 19 illustrates embodiments of screens 1900 useable to manage the user's portfolio of brands related brand networks and statistics, newly incoming publications and published publications and invited friends or member status. Interface facilitates user to browse all brand network of user and manage latest actions, publications, join members, request, massages, updates, notifications and news 1902.

Figure 20:
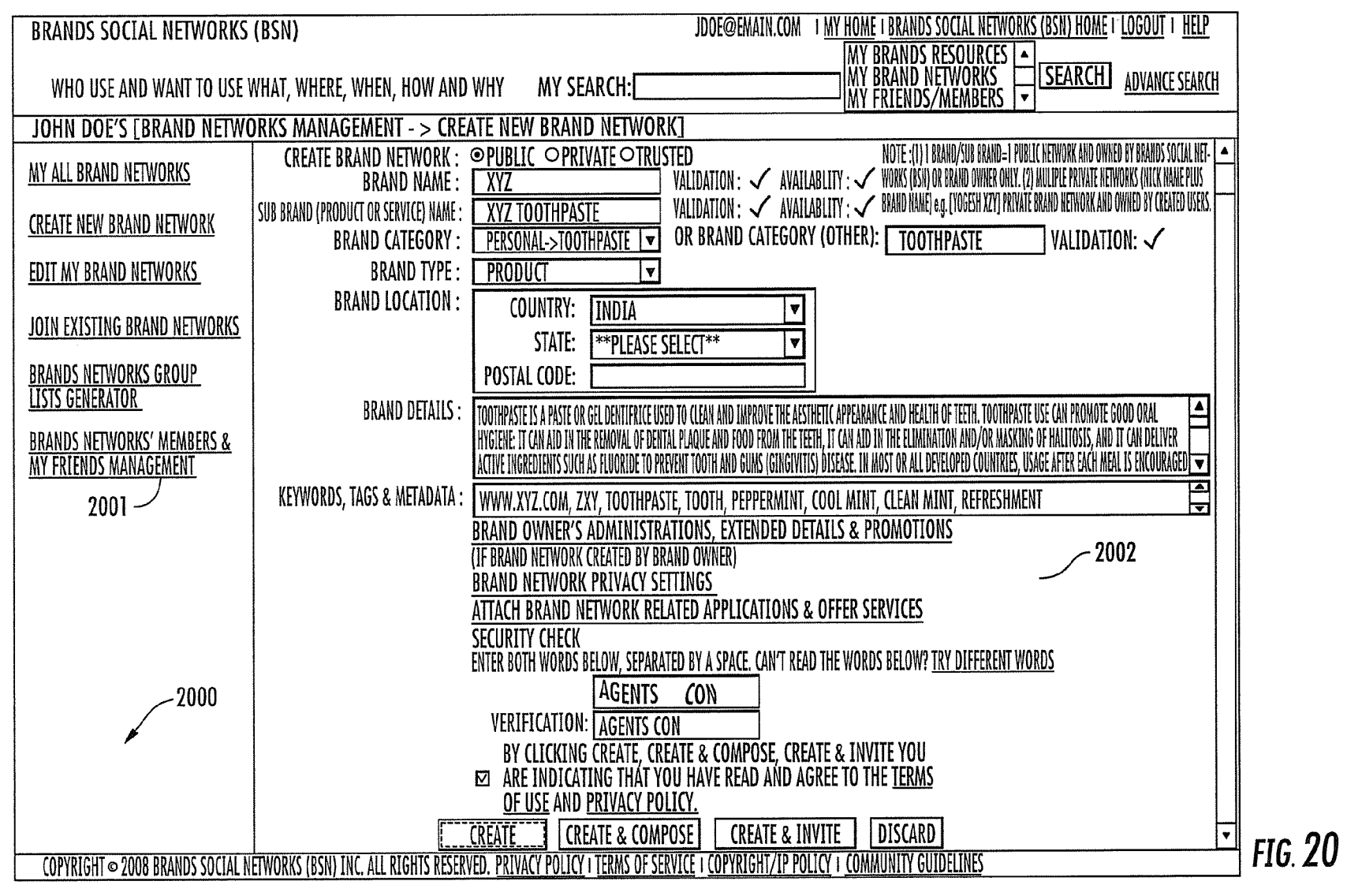

FIG. 20 illustrates embodiments of screens 2000 useable to create new brand network. System provides form 2002 including Brand Name, Brand Category and Sub Category, Brand Type, Brand Location, Brand Details, Brand related keywords, Tags, Taxonomies, Ontology and Metadata. General users can create N numbers of Private Brand Network for a single brand but only one Public Brand Network for a particular Brand. User or Brand Owner's Administrators set privacy settings, attaches applications and services offered for a Brand Network. Before creating Brand Network for particular Brand, BSN system verifies the Brand Name with pre created Brand Name Database or human-mediated including experts or general users of BSN. If public network of brand already exists then user prompts that "already exist. Want to join this network?" Public Brand Network can be owned only by BSN or related Brand Owner.

Figure 21:
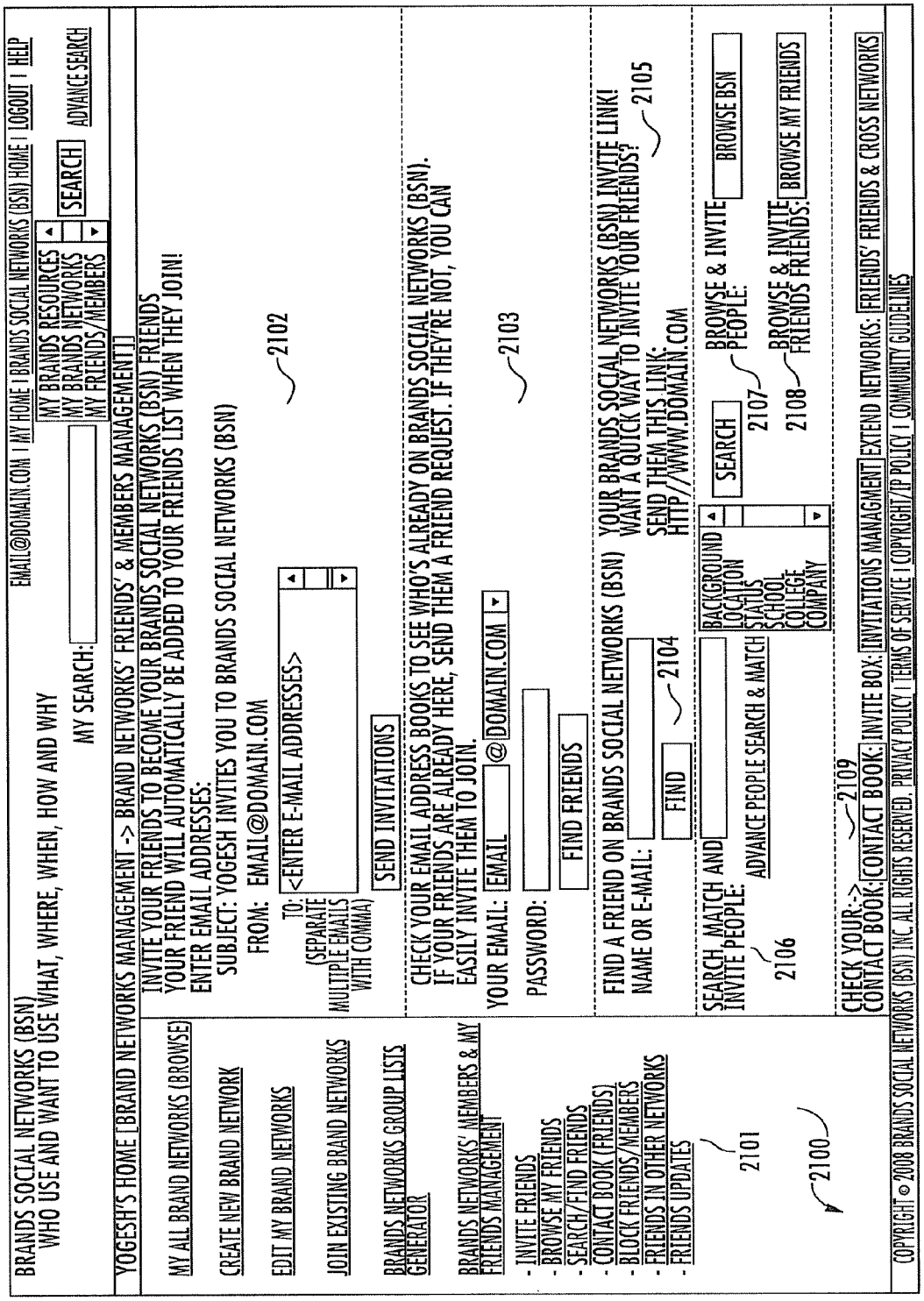

FIG. 21 illustrates embodiments of screens 2100 useable to manage the user's friends or Network members including search and match preference based members and add to friend 2106, find friends already registered on BSN, invite friends or friends' friends 2108 to join BSN or Brand Networks. User can invite one or more friends via email to join the BSN, when they join, automatically added to user's friends list 2102. User can also invite all friends from all contact address list of all email accounts 3103. User can also find already registered friends 2104 and send them link 2105. Further user can browse BSN 2107 and check contact book or invitation box or extended network to invite public members 2109.

Figure 22:
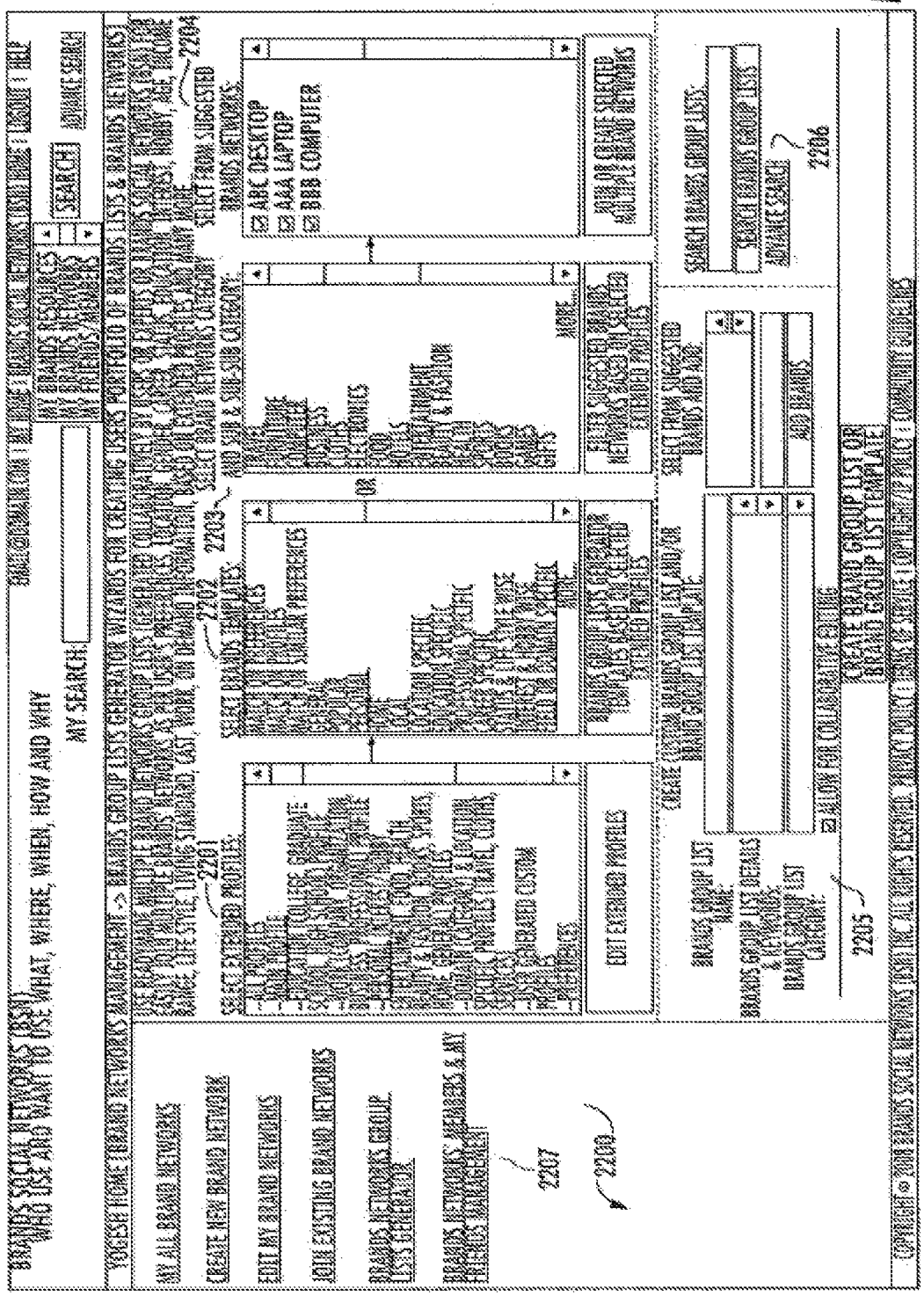

FIG. 22 illustrates embodiments of screens 2200 useable to manage, generate, create, search, share and edit the User's Portfolio of Brands Lists. User can create Brands Group Lists or generate Brands Group Lists via "Brands Group Lists Generator and Templates" or use readymade multiple shared brand networks Group Lists generated collaboratively by users or experts or Brands Social Networks (BSN) for easily joining multiple brands' networks as per user's preferences and location, gender, career, status, education, interest, hobby, age, income range, life style, living standard, cast, work, on demand information, extended profiles and a like. User can edit extended profile which are useful for better understanding user and suggest user brands lists 2201, User can select extended profile and templates 2202 to facilitate user to create new Brands Group List. User can also select Brand Category 2203 and select preferred or used brands from suggested list generated by system based on users profile and selected extended profile 2204 and add to brand group list for creating or joining multiple brands networks. User can manually create Brands Templates and Brands Group List 2205 and search already existing brands Group List for editing or updating or using lists 2206.

Figure 23:
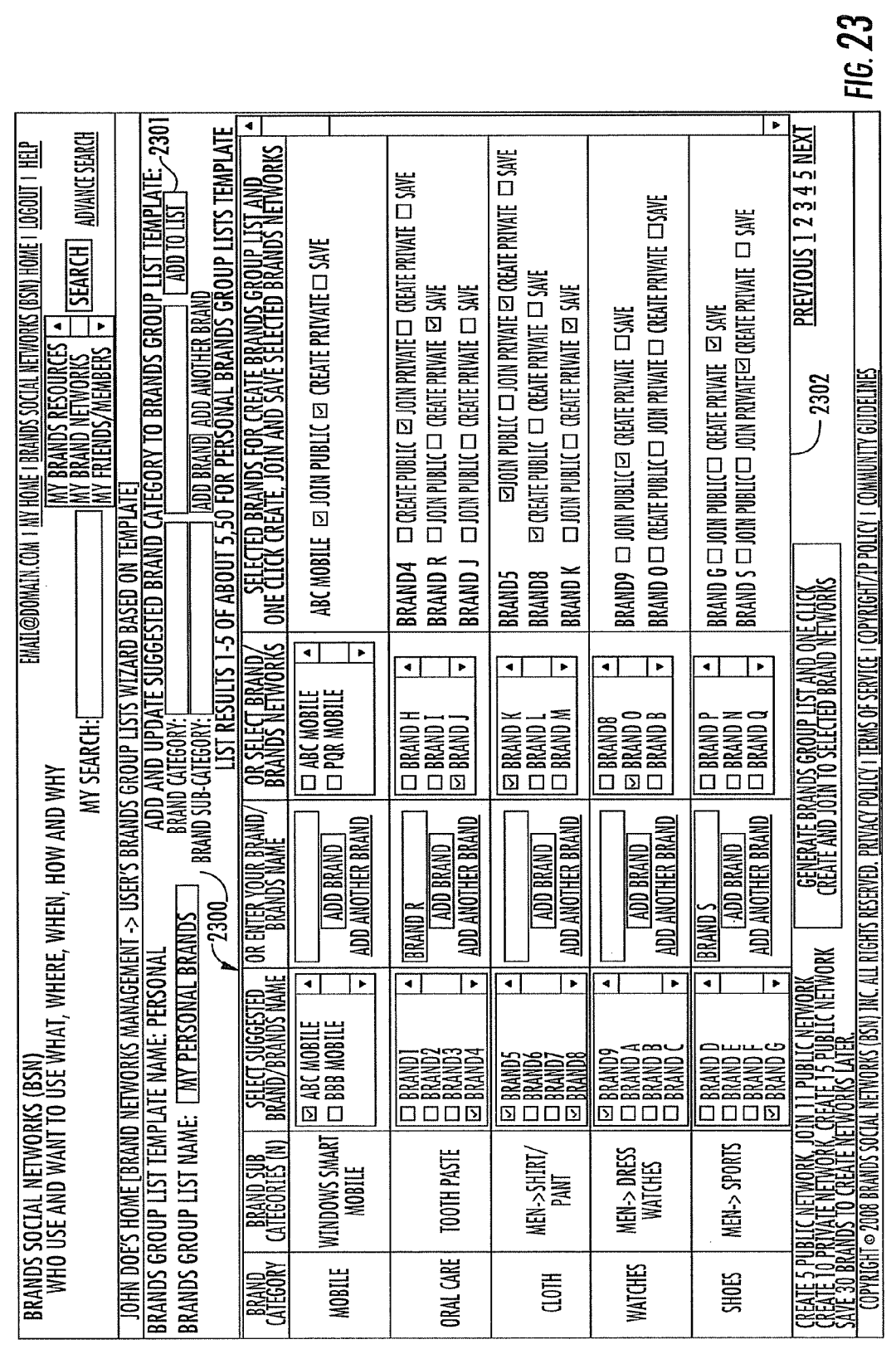

FIG. 23 illustrates embodiments of screens 2300 useable to create or generate Brands Group List based on selected extended profile and Brands Group List Template to create or join multiple Brands Networks. Brands Group List Template includes Brand category and sub category, suggested Brands Name based on user's profile, extended profile, preferences and other details, recorded actions and information. If user's brand name is not matched with suggested brands list then user can manually enter brand for a given category and use. User can also select brand name from brands detail list based on user's location, gender, age and other preferences. After finalizing selection of all Brands Name of selected templates and related categories, user can select Brands Names to create or join public or private brand networks or save full or partial list for later creation or use. System generates final Brands Group List and one click creates multiple public or private brand networks or joins users to already existing multiple public or private brand networks 2302. User can later any time update or modify or change Brands Group Lists. User can also add suggested category, sub-category and related all brands to Brand Group List Template 2301. User can create or generate N number of Brand Group List and edit, modify, set privacy settings including make list public or private or share lists with other friends or users of Brand Networks or BSN.

Figure 24:
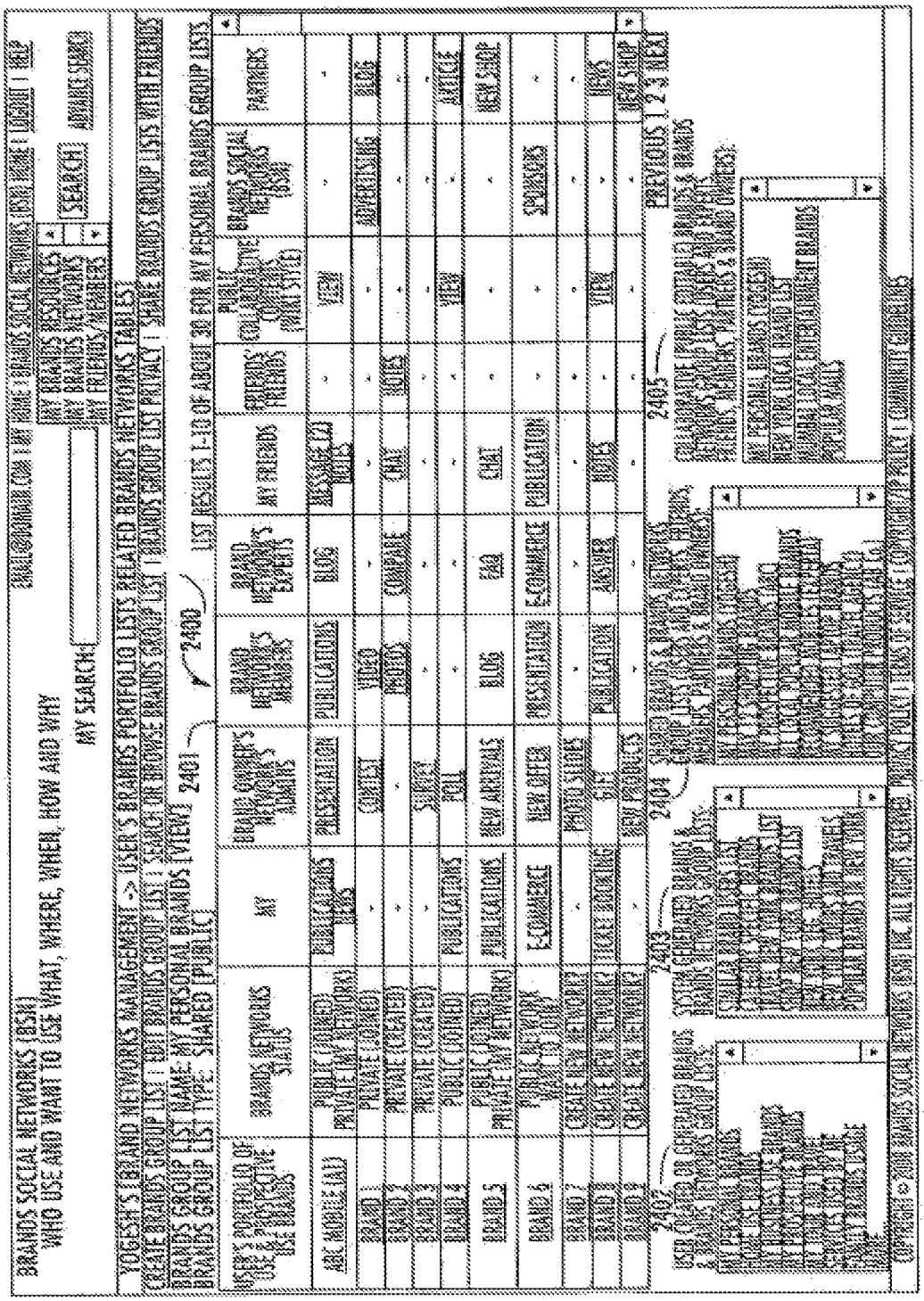

FIG. 24 illustrates embodiments of screens 2400 useable to manage User's Brands Group Lists based Brands Networks including those which user can read, view, and use all publications from all sources including User's own, Brand Owner's administrators or editors, experts, brand network's members, friends, friends' friends, Public content, BSN and $3^{rd}$ party content providers, messaging, news and updates of all brands networks related to particular Brand Group List and take actions or participate with brand networks. User can search products or services, compare them and buy or subscribe them 2401. Brands Groups Lists including private lists 2402, system generated lists 2403, Public editable lists 2405 and shared lists 2404.

FIG. 25 illustrates embodiments of screens 2500 useable to compose brand network specific publication contents including Publication title, select brand network to publish publication, select composition type including structure and pre-created structure specific tags, free form and application specific including Blog, Article, Wiki, News, Slide show, Resource type including text, video, audio, photo or image and like. User can set privacy and control where to publish and who are eligible for subscriptions. User can preview publication and publish it or save publication as draft for later publication or discard composed publication. Published Publications reflect to Users "Publish-Box" and all subscribers "Inbox". Clicking on "Preview" opens the publication in Preview mode. Clicking on "Edit" opens the article in the Publication composition Form with various composition tools and applications. Clicking on "Delete" can prompt the user whether they are sure they want to delete a publication. In one embodiment, "Draft" status indicates a pre-publication version of the publication saved by user. In one embodiment, the user may also be provided with a screen that includes comments, updates, ranks, flag that other users have made against this particular user's publications. Clicking on username link takes the user to user's Profile page. Clicking on the publication title link takes user to published content page. Clicking on "View" takes user to full text of a comment on the published content page. Publications Submission may be performed using several interfaces described next 2501.

As shown in FIG. 25, buttons available at the bottom of Compose Brand Submission Form 2501 include: "Save and Preview," "Save as Draft", "Discard and "Publish." Clicking on "Save and Preview" for an article can save it to a draft to "Draft Box" and open the publications in a separate Preview window. Clicking on "Save as Draft" can save a draft to "Draft Box" and take the user to "Draft Box". "Publish" can be dimmed until the required fields are filled out. "Save and Preview" buttons interspersed at roughly "fold" intervals can have substantially the same function as described above. Clicking on "Save and Preview" anywhere on the form can toggle the user to Preview mode. Navigating away from the form without saving it by clicking on another tab can generate an alerts window that all data may be lost, sure you want to continue? If the answer is yes, they can be returned to User's Home Page. In one embodiment, a popup Javascript confirmation box is provided that includes an "OK" button to discard changes, and a "Cancel" button to stay on form. FIG. 25 provides one embodiment of screen 2501 for use in previewing a page. Prior to publication, a process can be applied to full publication text to scan for HTML and offensive content. If the profile contains HTML, or offensive language/content, an alerts message can appear to the user after they click on "Publish" telling them to check for these two conditions and resubmit after editing. Uploaded images can be reviewed via the Picture Queue. Uploaded images can be published to the public site immediately with the finished article, but if images fail review, a generic placeholder image can be substituted on the published publication page. The user can subsequently upload an image that meets BSN System standards (published in a FAQ). An email can also be sent informing the user that this action took place against their submitted image. FIGS. 13 and 18 provide one embodiment of screen 1309 and 1809 illustrating how a publication might appear when published.

FIG. 26 illustrates one embodiment of a screen 2600 for managing all newly incoming or subscribed publications, application specific contents, alerts and actions, contents, resources, and messages via Inbox from all joined or subscribed brands networks specific publications from all members or experts or brand owner's administrators or editors or 3$^{rd}$ party content providers or from Brands Social Networks (BSN). User can give comments and rank or points, flag publications, remove publications and block publications sources 2604. User can browse list and view or read multiple publications and take actions on one or more selected publications. List includes Brand network name and category, type of brand network, resource publication date, publication author, resource type, including resources category, links and details including brand network number of hits or visits, members, subscribers, authors rank and level and publication points assigned by reader or viewer or subscriber of publication 2601. Inbox tree style explore contains one or more system or user created folders to categorize incoming publication contents. User can do various actions or activities on one or more publications like open, print, forward, filter, categories, search, mark as junk or spam, delete and move publications 2603.

FIG. 27 illustrates one embodiment of a screen 2700 for managing all published publications of user via "Publish-Box" including statistics of subscribed readers, readers or subscribers or brand networks members or participants' hits, actions and pointes assigned by them. As noted, above, The BSN System can initially be used to compose, edit, and publish content across all Brands Networks. The BSN System can support a relatively infinite number of content publications submission forms across a wide variety of website properties including BSN or BSN country specific or BSN local or Brand owners or partners' websites or portals or products or services. User can browse publications list including name and category of brand network, type of brand network, publication date, resource type, resource list and links and details like total number of readers, publication hits or visits, participations, actions and points assigned by readers 2701. "Publish-box" tree style explorer facilitates organization of categories of multiple publications for multiple brand networks 2702. User can block member or subscriber, report abuse for comments given by particular member or reader, set privacy for publications, sort and analyze publications 2703. Users can, with To-Do, open, print, forward, categorize, search, find and move one or more publications 2704.

In addition, a variety of interface tools may be provided by the BSN System for site management. Thus, Published publications can have a button prominently displayed for flagging the publication as objectionable or miscategorized and report abuse, assign vote or rank or points, give comments and e-mail publication. If a given publication accrues some defined number of clicks (such as 2-3) from different IPs in the user community, it stays live on the site but is placed into the Publication Queue for review. Publication status on user's Control Panel may still indicate "Published" and they may not receive email notification of the flag. Users have to be registered or logged in to flag a publication as objectionable, or to rate a publication or comment on publication.

Comments submitted to a publication may have post-processing applied to the text to scan for HTML and offensive content. If the comment contains HTML, or offensive language/content, an alerts message may appear to the user after they click on "Publish" telling them to check for these two conditions and resubmit after editing. Comments can have a button prominently displayed for flagging the comment as objectionable. If a given Comment accrues another defined number of clicks (such as one) from the user community, it remains on the site but is placed into the Comments Queue for processing.

Publications and comments may be rateable from the Publications page. In one embodiment, one rating per content publication per IP address could be allowed (user can rate both publication and comments). The User rating could be based on the average of the ratings other users have placed on that user's publications. Ratings on comments to author's publications may not be factored in. Ratings interface may be as the wireframes shown above. However, other numbers of ratings may also be allowed, without departing from the scope of the invention.

In one embodiment, website pages may be organized based on category, subcategory, and even sub-subcategory pages including metadata, taxonomy, ontology and semantic syntax. In one embodiment, a new page may be developed to free up subcategory pages of, for example, long lists of Brand Networks and Publications. By employing categories and the like, a new opportunity may arise for additional ad units and highly targeted Search Engine Optimizations.

Figure 28:
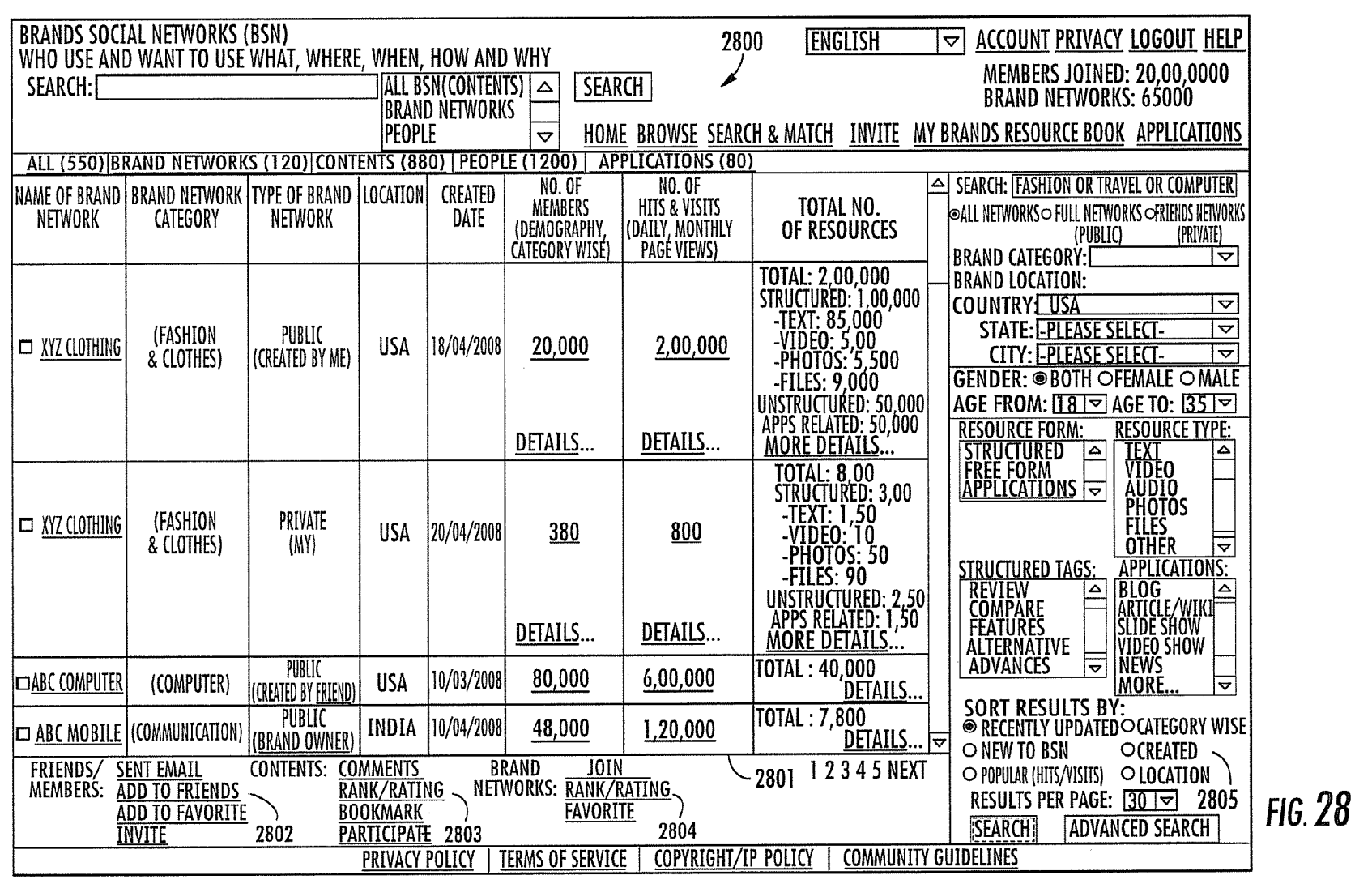

BSN Registered Users or Viewers (Non-Members), Brand Networks Members, Brand Network's Administrators, authors, editors, and other uses may employ a search or browse interface; one embodiment of screen 2800 & 2900 is illustrated in FIG. 28 and FIG. 29 as an example. All types of Users are able to search for People or Users, Brand Networks and Publication Contents by Brand Network Name or Brand Category or Brand Location, Search users by age range, genders and other criteria, search contents by Resource Type, Resource Form and Sort results by Recently updated, Category wise, time & date wise, location wise and popularity wise including hits, visits, ranks. Searches can also allow wildcards. User can click-through entry on search results list, publication can then appear under "Content" tab, Users can appear under "People" tab, Brand Network List appear under "Brand Networks" tab and Application can appear under "Applications" tab. Moreover, administrators, or the like, are able to search for users by username, or by email address (either of these can allow wildcard searches), or by some combination of Type (user, member, expert or admin) and Source, as defined by drop downs, or the like.

BSN Search allows searching for anything on the site, including people on other networks, provided they haven't restricted their privacy settings. They can also specify which network wants to search. Select "Other Network," then begin typing the name of the network, and BSN search engine give possible matches. BSN Search allows searching for anything on the site. This includes names, brands networks, publications, applications, services, groups, events, interests, gender, relationship status, etc. Just type in the names and words want to search—either alone or in combination. User can also filter or further limit what is displayed. Just use the filters available on the right side of the page to target results. Using the filters will limit results to friends and people on brands networks. User can also use Profile Search to search specific profile fields for users that exist in all joined network. User can sort out "Names," "Groups," "Events," or "Profiles."

According to a further aspect of the present invention, there is provided a means of visually displaying the interconnections between the nodes and provides interactive model of Brands Networks and/or user's friend community. It facilitates mapping and measuring brands networks, friends, communication, information flow, and knowledge sharing/re-use.

Preferably, a user's Brands Networks and as, an unique, private personal (Friends), may be visually represented on an electronic display in one or more of the following forms, including: graphical, alphanumeric and/or animated symbols representing nodes joined by lines, or some form of visual link representing the connections between the nodes; a solid line indicating entities who have joined or have consented to join the user's Brands Networks and unique, private personal (Friends) Networks; dotted lines indicating entities who have been invited but they have not joined the user's unique, private personal (Friends) and Brands Networks; different symbols to differentiate between nodes representing different types of entities; different symbols to depict nodes representing entities who are individuals and those representing Brand Owners including company, retailers, organizations, manufacturer, mall, distributer, e-commerce web site or portal, dealers, sellers; symbols at least partially resembling people to depict nodes representing actual individuals; different symbols, colours, animations and/or sounds for a node to indicate the existence of defined information of interest including a particular predetermined activity, identifying characteristic, entity attribute, or other data recorded in a nodes data record; different colours/symbols for different roles in a specific application; displaying further defined information of interest or permitted actions when positioning a cursor or visual indicator over a node depending, and varying the information displayed depending on the user's degree of separation from the node; nodes representing a person or an organized network also showing a numerical indication of the number of direct contacts associated with the node; a indicative rather than literal indication of the number of links to a node if number exceeds a defined value, with a numerical value showing the actual number of connections; user customizable representations for nodes, including images, photographs and figures; different visual appearance of a node symbol to indicate the status of an activity. Any entity within a BSN Visual interface can link to content—text, video, audio, multimedia, documents, links or Web pages—that provides more detail about the entity. In other words, a BSN Visual interface can be designed to display micro and macro views of a data set, side-by-side. BSN visualizations with structured data make the information more intuitive, accessible, manageable and meaningful and can make relationships in the data more apparent than can traditional line or column displays and can improve understanding and discovery. Multiple BSN visual interface can run simultaneously and together to depict different aspects of underlying data and provides real-time views of data, and real-time interaction and helping end-users to find information.

The said system provides a platform for developers to provide the nodes with applications and communication services. The system may also be provided to the user with an initial suite of specific applications and communication services.

According to an alternative aspect, the present invention further provides a tool to map relationship networks. Entities, including the user may be considered as "nodes" in a network.

The invention provides a unique, private personal network with a plurality of number of users or entities represented as nodes, each node being at the origin of an individual unique, private personal (Friends) and Brands Networks consisting of the user and a variable number of additional nodes.

As an individual interacts with a diverse range of people, they are motivated to reveal different aspects of their identity, thereby creating a multi-faceted social identity, whereby different people know different things about the individual. This faceting of one's identity allows them to interact in a socially appropriate way in a wide variety of potential environments. In engaging in this behavior, individuals start to segment their brands social networks into a variety of different clusters, or types of people. Often, these people are only aware of a fraction of the individual's entire social network, those with similar identity information."

Visual BSN is an interactive visualization tool for online Brands Social Networks, allowing exploration of the community structure of Brands Social networking services. Such services provide means by which users can publicly articulate their mutual "friendship" in the form of friendship links, forming an undirected graph in which users are the nodes and friendship links are the edges. These services also allow users to describe themselves in a profile, including attributes such as age, marital status, sexual orientation, and various interests.

Visual BSN provides a visualization of such services, providing an interactive sociogram for exploring the links between network members. In addition to visualizing "friendship" linkages, Visual BSN supports a range of exploratory search features, providing visualization of the rich profile data characteristic of these services, features which traditional sociograms are not designed to communicate.

Figure 30:
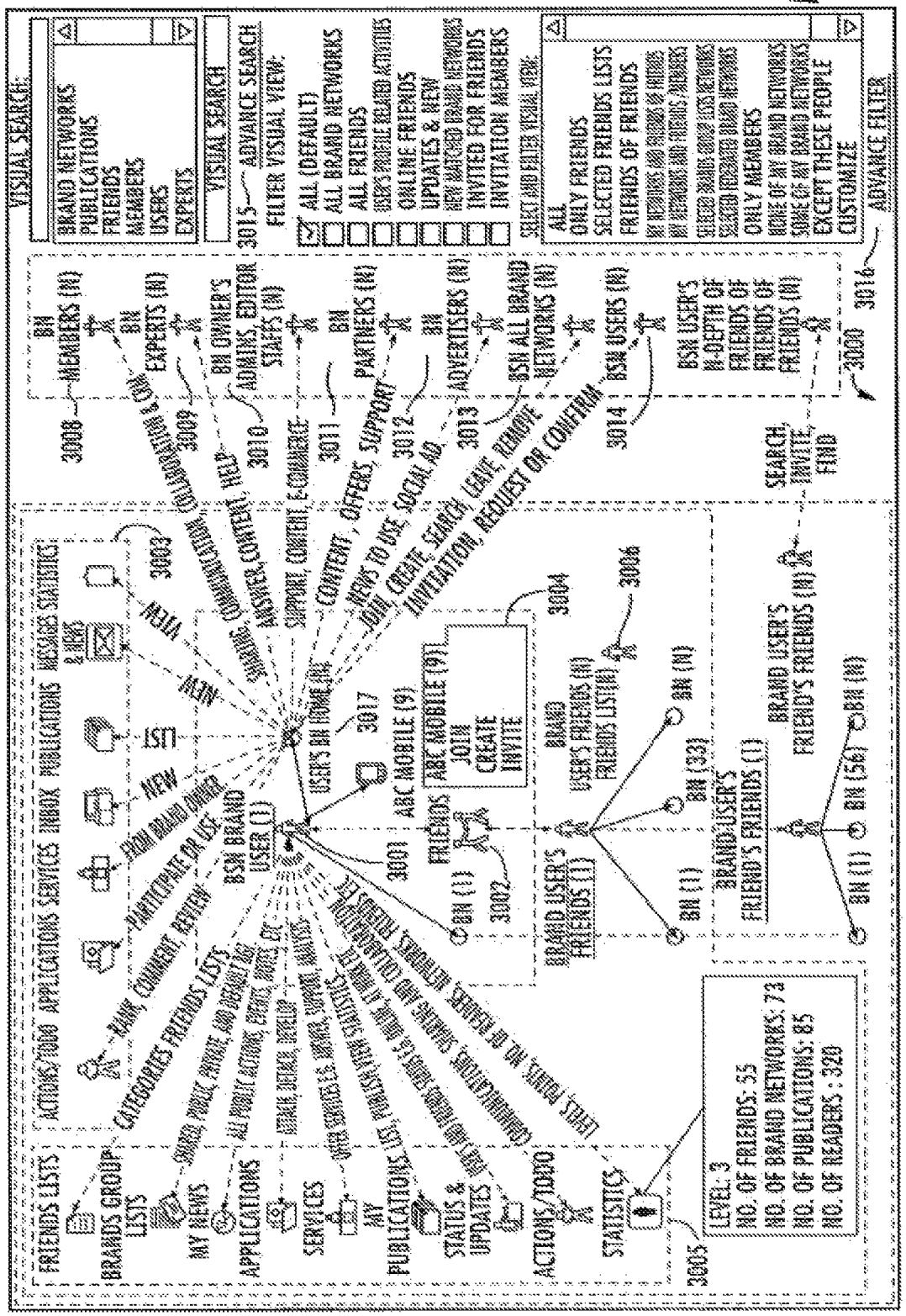
FIG. 30 shows a visual indication of a BSN Brand Networks and Friends Group and related all actions and activities.

FIG. 30 illustrates one embodiment of a screen 3000 for Graphical or Visual interface of BSN registered User for managing user's friends and brands networks including registered BSN User (1) 3001 connected with all joined or created public or private brands networks 3017 and related all BSN entities nodes including multiple Brands Networks related Members node 3008 to share, communicate and collaborate with other network members, Experts 3009 node providing contents and other on demand support like answers etc., Administrators or Editors 3010 node providing quality content, sales, marketing, e-commerce and promotion services to users, Partners 3011 node providing value-added services and content to brand network user, Advertisers 3012 node providing preference based advertising to user, all BSN brand networks 3013 node facilitating user to search brand networks and join them and all public users of BSN 3014 node providing user (1) to invite users to join brand network or add them as friend and all Personal Profile related action and activities nodes 3005 including Friends Group Lists, Brands & Brand Networks Group Lists, My news, attached Applications & Services, My Publications, Status and Updates, Actions or To-do and user's all statistics including levels, rank, no. of publications, brand networks and friends and Brand Network related action and activities nodes 3003 including participating Applications and subscribed Services related activities, Inbox for alerting new publications for related brand networks, Published Publications and related hit statistics, New Messages and updated News from all friends and brand networks, Actions and To-do and statistics and connected all friends 3002 including user's friends, friends' friends and N-Depth of friends' friends 3007 related operations or action or activities. User can use sensitive and contextual menu on nodes e.g. Brand Network "ABC Mobile" 3004 includes on demand menu when click on node which provides brand network related tasks or actions like joining or creating brand network or inviting users to join brand network. Friend node 3002 provides friends management functionality where node explodes to multiple groups of friends and related all activities, actions, To-do and communication and collaboration. Visual BSN provides visual search 3015 facilities where user can search brand networks, publications, friends or BSN public users or members of brand network or experts and like. Search highlights and pinpoints the resulting nodes. Visual BSN provides control for what is displayed in the graph or not by using a wide range of well-organized filters 3016 and settings including view all or specific selected brands networks, all or selected group of online friends, Only updates and new items or contents, activities or actions related with some or all brand networks.

Figure 31:
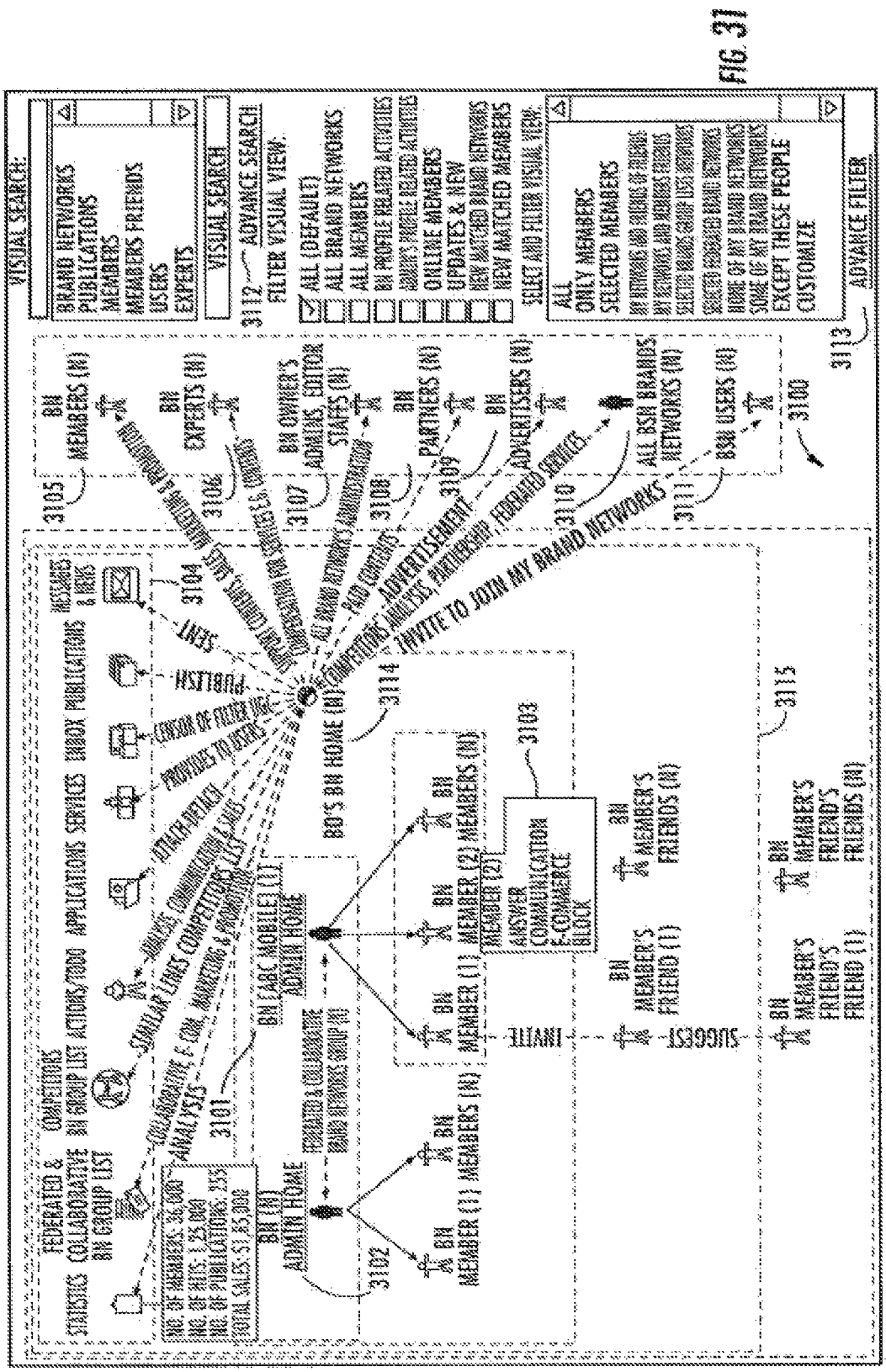
FIG. 31 shows a visual indication of a BSN Brand Owner's Brand Networks and Members and related all actions and activities.

FIG. 31 illustrates one embodiment of a screen 3100 for Graphical or Visual interface of BSN registered Brand Owner's Administrator for managing brand owner's all brands networks including registered BSN Brand owner's super administrator User (1) 3101 connected with all public brands networks 3114 and related all BSN entities nodes including multiple Brands Networks related Members node 3105 to facilitate supports, providing contents, sales, marketing, e-commerce, promotion, communication and collaboration services to brand network members, appointed Experts 3106 node providing contents and other on demand support like answers etc., Administrators or Editors 3107 node managing brand network and providing quality contents, sales, marketing, e-commerce and promotion services to users, Partners 3108 node providing value-added services and content to brand networks, Advertisers 3109 node providing preference based advertising to brand network members, all BSN brand networks 3110 node facilitating administrators to search competitors brand networks or prospective partners for collaborative work and providing analysis services and all public users of BSN 3111 node providing administrators to invite users to join brand network and all Federated and collaborative brand network partners nodes 3102 and Brand Network related action and activities nodes 3104 including attached Applications and Services related activities or actions or participating members or users generated contents, Inbox for filtering or censoring all user generated new content publications for related brand networks, Published Publications and related hit statistics, News and all sent Messages and updated News from all members and brand networks, Actions, To-do, statistics and connected all friends 3115 including member's friends, member's friends' friends and N-Depth of member's friends' friends to invite them to join and promote brand network. Admin can use sensitive and contextual menu on nodes e.g. Brand Network "ABC Mobile" 3103 includes on demand menu when click on node which provides brand network's members related tasks or actions like communicate, give answer or support and e-commerce with particular members. Visual BSN provides visual search 3112 facilities where administrators can search brand networks, publications, members' friends or BSN public users or members of brand network or expert and like. Search highlights and pinpoints the resulting nodes. Visual BSN provides control for what is displayed in the graph or not by using a wide range of well-organized filters 3113 and settings including view all or specific selected brands networks, all or selected group of members, Only updates and new items or contents, activities or actions related with some or all brand networks and like.

Figure 32:
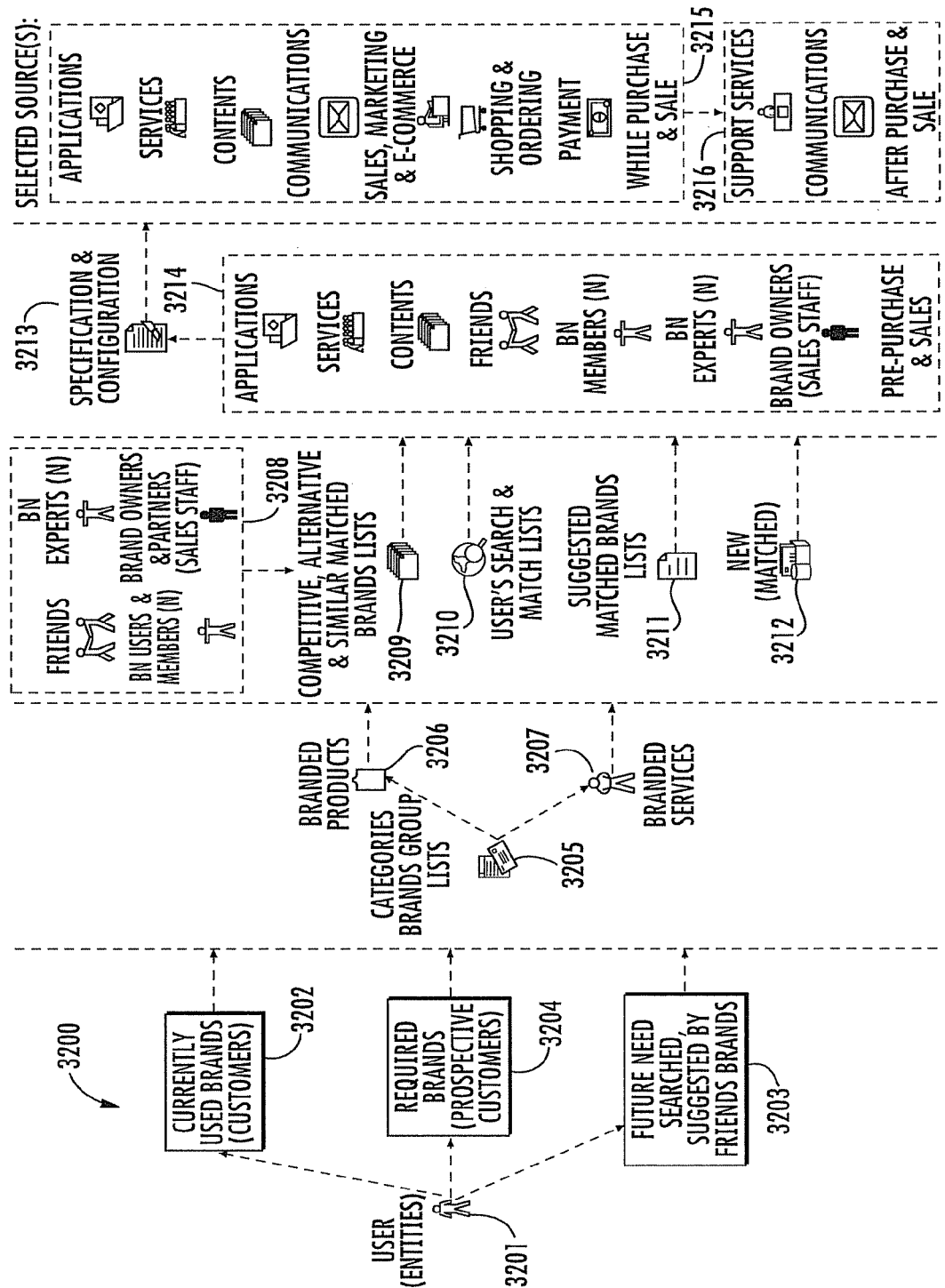
FIG. 32 shows an visual indication of a BSN Multi Brand Customers Services Life Cycle (MCSLC) Platform.

FIG. 32 illustrates one embodiment of a screen 3200 for managing Categorized Brands Group Lists including user's currently used or need to use or future use of multiple branded products and services and related Customers Services Life cycle. Registered user 3201 can be general, premium and expert user includes one or more individual, customer or prospective customer, team or association or group, collaboration of one or more pre-identified individuals and one or more entities including but not limited to company, associations, organization, professional bodies, social bodies, shops, mall, dealers, distributors, retailers, suppliers, web site, portal, governmental bodies and enterprises or an entity that exists as a particular and discrete unit. User can create or generate Categorized Brands Group List and assign related metadata, taxonomy and ontology and disclose Brands currently used by users 3202 and specify requirements or needs or disclose want to use or buy or purchase or subscribe 3202 branded products and services lists via search, research by user, suggested by user's friends and public members, experts and brand owners for future use 3203. All categorized brands lists 3205 of user including branded products 3206 and services 3207 indicating brands portfolio of user disclose branded products and services currently used, want to use or buy or subscribe and future needs. Corresponding to each brand list or group of brands or each Brand of each list, an alternative or suggested or similar categorized branded products and services list 3209, Users searched brands list 3210 and System generated suggested brands lists 3211 and new Brands Lists as per user preferences 3212 are constantly updated from multiple sources including competitor brands' owners or administrators, friends, brands networks members, BSN system and experts 3208. After search, research, enquiry from personal sources (friends), commercial sources (Brand owner's staff), public sources (network members) and personal experience (user) 3214, next step is comparing and negotiating with suppliers, and finalizing selection of needed products and services and specifying or configuring products and services 3213. Customer then selects the reliable, competitive sources of products and services for purchase and pays for purchases 3215. After purchase, customer uses and evaluates the products and services and makes comments or gives suggestions or feedbacks. Customer can also take training for use of products and services, upgrading and maintaining products and services and managing i.e. monitoring and accounting their uses 3215.

From the angle of Brand Owner's sales and marketing department, Customer-service Life-cycle's various Stages include Requirements Stage: In this stage customer establishes a need for the product. Activities in this stage may include educating customers about the purpose of the product or service or helping them see how your offering differs from that of your competitors and provide availability of their products. In this stage customer gets the answer of what is it? Do I need one? In Specification stage, customers specify the characteristics of that product or service to know which particular one to acquire and determine products and services attributes. In this stage customer get the answer of which one? How many? In the specification stage, customers select the product features that best suit their needs. Next Source is Selection stage: customers select or determine source of products and services. After selecting a source for their product or service, in Ordering Stage customers actually place an order. Once the product or service has been ordered it must be paid for. That payment may also need to be authorized through the customer's approval process. Convenience in payment is essential, but so too is security. In the acquisition stage, the customer takes possession of the product or begins to use the service. Testing and Acceptance Stage: After customers have acquired their new product or service they may test it out to verify that it works as expected. When an innovative product or service is introduced, customers may need to be educated about its features and how to maximize the benefits of its use. This is particularly important for products and services that require the customer to undergo a certain degree of process change in using the product or service. Allowing the customer to evaluate and accept the product or service, sometimes even prior to purchase, is an effective way to resolve the education and adoption problems that can stifle an innovation's market penetration. Although the evaluate-and-accept process historically has taken place after purchase, firms in service and information based industries let customers try out products prior to purchase-in particular with virtual tours, sample consulting reports, or demo software. Integration stage: Once the product or service is acquired and accepted for use, the customer must add it to an existing inventory of resources. Often customers must also adjust their internal business processes to take full advantage of the new product or service. In Usage Monitoring Stage, customers must ensure that resources remain acceptable while they are in use or during the time customers receive service. Using the internet, suppliers can provide customers with the facilities to simplify this monitoring stage. Upgrading Stage: Upgrades can also be offered to improve the users' overall experience. Being able to upgrade service in response to important events, such as the customer's reaching certain milestones or having a dissatisfying experience may be a source of increased loyalty and customer retention. Transfer or Disposal Stage: Customers will eventually transfer, resell, return, or dispose of resources. Auditing and Accounting Stage: The final stage of the life cycle focuses on evaluation of and accounting for the experience. This stage is particularly important for large corporations that are constantly attempting to measure, manage, and control their spending budgets. Historical data collected can be used to support future decisions, forecasting, and auditing. Moreover, because the data are available on the internet, they are available in real time and can therefore be used to support decisions immediately.

BSN Platforms facilitate users in each steps or stages or phases of Customers Services Life Cycle, (1) Establish Requirements: Assisting a customer with what product he or she requires, (2) Specify: Helping the customer determine a product's attributes, (3) Source: Where customers will buy a product, (4) Order: Services to help the customer communicate what and how much of a product is desired from the supplier, (5) Pay: Services to transfer funds or extend credit, (6) Obtain: Assisting the customer to take possession of a product, (7) Test & Accept: Services to ensure that a product meets established specifications, (8) Train: Helping the customer to make use of the product to its full extent, (9) Monitor: Helping the customer monitor use and behavior of a product, (10) Maintenance: Repairing a product and keeping it in proper working order, (11) Upgrade: Services that alert the customer to newly available attributes, new products, or automatic upgrades to a product, (12) Replace: Features that assist in providing another product for one that has been consumed or is beyond repair, (13) Resell or Return: Helping the customer move, return, or dispose of a product, (14) Account: Helping the customer track where and how much money has been spent with the company, (15) Evaluate: The final tally by the customer of the experience that the customer has had with the company (e.g., feedback)

Thus, BSN Platform facilitates all users in B2C Customer Service Life Cycle (CSLC) phases; In Requirements phase Search functions, personalized product recommendation, saving a list of products for future purchase, Comparing products. In Acquisition phase Helping customers understand buying process, Order online but pick them up at physical location or via home delivery, One-click mechanisms, Shipment tracking. In Ownership phase return and exchange, Customers write reviews, send emails for product changes or upgrades. In Retirement phase Information on disposal options, Calculate total cost of ownership of product.

According to an alternative aspect, the present invention further provides supports and services to customers or users for all phases of Customers services Life Cycle (CSLC) including, Phase 1: Requirements (1) Requirements Stage: Establish (or recognize) a need for the product or service, (2) Specification Stage: Determine the product or service attributes; Phase 2: Acquisition (3) Source-selection Stage: Determine where to obtain the product or service, (4) Ordering Stage: Order the product of service from a supplier, (5) Authorization and Payment Stage: Transfer funds or arrange credit, (6) Acquisition Stage: Take possession of the product or receive service, (7) Testing and Acceptance Stage: Ensure that the product or service meets specifications; Phase 3: Ownership (8) Integration Stage: Add to an existing inventory or integrate with existing internal business processes, (9) Usage-monitoring Stage: Control access and use of the product or service, (10) Upgrading Stage: Upgrade the product or service if conditions change; Phase 4: Retirement (11) Transfer or Disposal Stage: Move, returns, or disposes of product or service; cease to need the service, (12) Auditing and Accounting Stage: Monitor expenses related to the product or service According to an alternative aspect, the present invention further facilitates Brands Owners to provide supports and services to customers or prospective customers in all phase of Customers Services Life Cycle (CSLC) including Awareness Phase: At this stage of the Customer Buying Cycle the customer identifies a company's value proposition that may match his needs. He develops an awareness that an organization exists and that it might be able to fulfil his requests. The company tries to reach its target customer segments by means of advertising, promotions, public relations and partnerships and also use affiliated Websites to attract customers. Affiliate or associate programs pay commissions to people or companies that refer visitors to their products or services. Thus conclusion is, Get the customer's attention, Attract customers to evaluate the company's value proposition, Get known in the market. In Evaluation Phase: Once a customer has identified a specific firm as a potential solution provider to his problem or his needs he will want to learn more about the organization and the bundle of products and services it offers. Besides traditional sales forces or value added resellers (VAR), companies increasingly make use of multimedia applications to help customers in their evaluation process. Several tools, such as Online Chat, Voice-over-IP or Web cams streamline the consulting process and may make physical face-to-face contact unnecessary. Further, customers may also want to rely on more independent information from user communities or consumer groups. Thus conclusion is, Match customer needs with the company's value proposition, Reduce the customer's search costs—inform and advise him and give him access to user communities, Let the customer test the value proposition. Next Purchase Phase: During the purchase phase the actual transaction takes place. This includes negotiation, decision, contract, order & tracking, billing & payment and fulfillment. Whereas negotiation, decision and contracting are very important in B2B they are less significant in B2C. However, electronic channels may help to streamline the purchasing process and add value through "memorizing" customer information or through real-time order tracking. Thus conclusion is, improve the transaction process, and Make purchase and fulfillment more convenient for the customer, Create additional value through tools, such as order tracking. In After sales Phase: This last phase of the buying cycle has the potential to create loyal customers. After sales services enormously contribute to a customer's satisfaction by helping him maximize profiting from the value proposition and by assisting him in case of problems. It can embrace implementation, use, training, maintenance, monitoring, troubleshooting and reverse logistics (i.e. disposal). Thus conclusion is, Don't' "forget" the customer after the transaction, Provide additional value through tools, such as electronic manuals, FAQs and customer support.

Several other interfaces may be provided to enable management of various Brand Network Page promotions, various embodiments of which are illustrated in FIGS. 13-18. In one embodiment, screen 1701 of FIG. 17 may be employed to manage alerts. That is, a mechanism can be provided for the Brand Network's Administrators to broadcast system wide, e.g., members and administrators, or targeted, e.g., BSN wide users, alert messages. When text is typed into Alerts interface, it will immediately publish to user Brand Network Pages and Administrator's Home. If no text is typed in, no alert will appear.

The above specification, examples, example interface screens, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented graphical user interface comprising: instructions stored in a non-transitory computer-readable storage medium and executable on one or more processors to:

a. displaying a graphical user interface for preparing post, wherein post comprises plurality types of content including photo, video, location information, audio, link, text, message, icon, contact, file, object, and any combination thereof;
   b. displaying the graphical user interface for selecting and associating tags with post, wherein tags collaboratively created and published by users of network in a network environment comprises:
      i. receiving, by the system, request to access tags;
      ii. serving, by the system, one or more tags;
      iii. presenting the graphical user interface that includes said served tags;
      iv. enabling the user to select one or more tags from said displayed tags for associating or relating or assigning said selected one or more tags with post;
      v. displaying the graphical user interface for enabling the user to create one or more tags for associating or relating or assigning said created one or more tags with post;
      vi. receiving input from the user indicating an association between post and at least one of the tags and
      vii. in response to the input representing the association, associating the post and at least one of the tags;
   c. displaying the graphical user interface for publishing or sharing post and tags comprising:
      i. receiving input from the user indicating publishing or sharing or sending of said post and associated tags;
   d. in response to receiving input from the user indicating publishing or sharing or sending of said post and tags, storing, by a server system, post, tags and association data representing the association between the post and at least one of the tags; and
   e. displaying the graphical user interface for viewing published or shared or received posts and tags comprises:
      i. in response to receiving input from the user indicating selection of tag, displaying selected tag associated one or more posts or in response to receiving request, displaying one or more tags associated corresponding one or more posts or in response to receiving request, displaying one or more posts and associated corresponding tags.

2. The computer-implemented graphical user interface of claim 1 wherein receiving input from the user indicating selection of privacy settings to select target recipients or limit viewing users of published or shared or send posts, wherein privacy settings includes limiting accessing and viewing of said posts and tags to all users of network or public, save as draft or private, members, subscribers and all or selected contacts, contacts of contacts, mutual connections and groups.

3. The computer-implemented graphical user interface of claim 1 wherein displaying a graphical user interface that includes tags for enabling user of network to select tag; receiving, from the graphical user interface, input from the user indicating selection of a tag; identify selected tag; retrieving identified tag associated posts from the storage medium by accessing stored posts, tags and association data representing the association between the post and at least one of the tags; and serving retrieved posts; displaying said served posts in graphical user interface.

4. The computer-implemented graphical user interface of claim 1 wherein present a graphical user interface that includes the one or more tags based on search query; and enabling the user to select one or more tags from searched tags for associating or relating or assigning selected one or more tags with one or more posts.

5. The computer-implemented graphical user interface of claim 1 wherein enabling to input and send search query to search query specific tags from the graphical user interface; searching search query specific tags; retrieving search query specific tags; serving said retrieved tags; and displaying said served tags in graphical user interface, wherein tags created and published or provided by users of network.

6. The computer-implemented graphical user interface of claim 1 wherein receiving request from user to view selected tag related or associated posts; identify selected tag associated posts; retrieving identified tag associated posts from the storage medium; generating or updating tag related or associated feed graphical user interface; serving retrieved posts in generated or updated feed graphical user interface; and displaying said served posts in generated or updated feed graphical user interface for enabling viewing user to view selected tag associated one or more posts.

7. The computer-implemented graphical user interface of claim 1 wherein receiving request from user to view received post and associated tags; identify received post and associated tags; retrieving identified received post and associated tags from the storage medium; generating or updating feed graphical user interface; serving retrieved post and associated tags in generated or updated feed graphical user interface; and displaying said served posts in generated or updated feed graphical user interface for enabling viewing user to view received one or more posts and associated tags.

8. The computer-implemented graphical user interface of claim 1 wherein enabling the user to save as draft, one or more types of content of post and associated one or more tags.

9. The computer-implemented graphical user interface of claim 8 wherein enabling users to publish said save as draft one or more types of content of post and associated one or more tags.

10. The computer-implemented graphical user interface of claim 1 wherein enabling users to collaboratively prepare one or more types of content of post and associate one or more tags.

11. The computer-implemented graphical user interface of claim 1 wherein enabling the user to select an application for preparing and editing a particular type of content.

12. The computer-implemented graphical user interface of claim 11 wherein type of application comprises blog, article, story, wiki, photo, video, audio, slide show, podcasting, news, offer, advertisement, presentation, post, message, notes, survey, comments including review, suggestion, feedback.

13. The computer-implemented graphical user interface of claim 1 wherein enabling a user to select, capture, record, edit and prepare one or more types of contents, wherein one or more types of content comprises text, audio, video, photo, file, location information and any combination thereof.

14. The computer-implemented graphical user interface of claim 1 wherein tag comprises structured tags, a keyword(s), a group name including a public or a private group, one or more types of entity name, an application, an action, an user name, a category, a label, a phrase, an image, a file name, an Uniform Resource Locator (URL), a location, a node of network.

15. A server, comprising: one or more processors with executable instructions configured for: serving the one or more tags, wherein tags collaboratively created and published by users of network in a network environment; enabling the user to create one or more tags or select one or more tags from said served tags for associating or relating said tags with post, wherein post comprises plurality types of content including photo, video, location information, audio, link, text, message, icon, contact, file, object, and any combination thereof; receiving input from the user indicating an association between post and at least one of the tags and in response to the input representing the association, associating the post and at least one of the tags; storing post, tags and association data representing the association between the post and at least one of the tags; receiving request from the user to display posts and each post associated corresponding tags; retrieving requested posts and each retreived post associated corresponding tags from the storage medium; and serving retrieved posts and each retrieved post associated corresponding tags.

16. A server, comprising: one or more processors with executable instructions configured for: serving the one or more tags collaboratively created and published by users of network in a network environment; enabling the user to create one or more tags or select one or more tags from said served tags for associating or relating said tags with post, wherein post comprises plurality types of content including photo, video, location information, audio, link, text, message, icon, contact, file, object, and any combination thereof; receiving input from the user indicating an association between post and at least one of the tags and in response to the input representing the association, associating the post and at least one of the tags; storing post, tags and association data representing the association between the post and at least one of the tags; receiving request from the user to display selected one or more tags associated or related posts; retrieving selected one or more tags associated or related posts from the storage medium; and serving retrieved selected one or more tags associated or related posts.

17. A server, comprising: one or more processors with executable instructions configured for: serving the one or more tags collaboratively created and published by users of network in a network environment; enabling the user to create one or more tags or select one or more tags from said served tags for associating or relating said created or selected one or more tags with post, wherein post comprises plurality types of content including photo, video, location information, audio, link, text, message, icon, contact, file, object, and any combination thereof; receiving input from the user indicating an association between post and at least one of the tags and in response to the input representing the association, associating the post and at least one of the tags; storing post, tags and association data representing the association between the post and at least one of the tags; enabling user to publish, share, send and allow to view said post or tags or post with associated tags to all users of network or public, subscribers, all or selected one or more contacts, mutual connections and groups and enable to make private and save as draft.

* * * * *

UNITED STATES PATENT AND TRADEMARK OFFICE
CERTIFICATE OF CORRECTION

| | |
|---|---|
| PATENT NO. | : 11,334,897 B2 |
| APPLICATION NO. | : 17/001874 |
| DATED | : May 17, 2022 |
| INVENTOR(S) | : Yogesh Rathod |

It is certified that error appears in the above-identified patent and that said Letters Patent is hereby corrected as shown below:

On the Title Page

Related U.S. Application Data item (60) Delete "PCT/IB2008/000425" and Insert --PCT/IN2008/000425--

Signed and Sealed this
Twentieth Day of December, 2022

Katherine Kelly Vidal
*Director of the United States Patent and Trademark Office*